US00RE40400E

(19) United States
(12) Reissued Patent
Bass et al.

(10) Patent Number: US RE40,400 E
(45) Date of Reissued Patent: *Jun. 24, 2008

(54) CAPACITY MODULATED SCROLL MACHINE

(75) Inventors: Mark Bass, Wilder, KY (US); Roy J. Doepker, Lima, OH (US); Jean-Luc M. Caillat, Dayton, OH (US); Wayne R. Warner, Piqua, OH (US)

(73) Assignee: Emerson Climate Technologies, Inc., Sidney, OH (US)

( * ) Notice: This patent is subject to a terminal disclaimer.

(21) Appl. No.: 10/678,052

(22) Filed: Sep. 30, 2003

Related U.S. Patent Documents

Reissue of:
(64) Patent No.: 5,741,120
Issued: Apr. 21, 1998
Appl. No.: 08/486,118
Filed: Jun. 7, 1995

(51) Int. Cl.
*F04B 49/00* (2006.01)

(52) U.S. Cl. ..... 417/44.2; 417/214; 418/55.5
(58) Field of Classification Search ..... 418/55.5, 418/57; 417/44.11, 44.2, 212, 214
See application file for complete search history.

(56) References Cited

U.S. PATENT DOCUMENTS 4,505,651 A * 3/1985 Terauchi et al. ..... 417/440
4,575,318 A * 3/1986 Blain ..... 418/14
4,604,036 A 8/1986 Sutou et al.
4,610,610 A * 9/1986 Blain ..... 418/14

(Continued)

FOREIGN PATENT DOCUMENTS

DE 34 22 398 A 12/1985
EP 0 351 690 A1 1/1990
EP 0 557 023 A1 8/1993
JP 55-57683 10/1978

(Continued)

OTHER PUBLICATIONS

European Search Report for Application No. EP 95 30 7811; Dec. 1, 1998; 3 Pages.
English–language Abstract and English–language Summary for Japanese Application No. 59–117895; Aug. 1984; 5 Pages.
English–language Abstract for Japanese Publication No. 61046485; Jun. 3, 1986; 1 Page.

*Primary Examiner*—Charles G Freay
(74) *Attorney, Agent, or Firm*—Harness, Dickey & Pierce, P.L.C.

(57) ABSTRACT

A scroll-type machine is disclosed which is particularly well suited for use as a compressor in refrigeration and air conditioning systems and incorporates a unique arrangement for modulating the capacity thereof. In one group of embodiments the capacity of the scroll-type machine is modulated by relative axial movement between the scroll members so as to form a leakage path across the wrap tips and opposed end plates. In another group of embodiments, modulation is achieved by reducing the orbital radius of one of the scroll members to thereby form a leakage path across the flank surfaces of the wraps. Both types of scroll separation may be accomplished in a time pulsed manner to thereby enable a full range of modulation with the duration of the loading and unloading periods being selected to maximize the efficiency of the overall system. A motor control arrangement is also disclosed which may be used with either of the modulation methods mentioned above to increase the efficiency of the motor during periods of reduced load. Additionally, either of the modulation arrangements mentioned above may be combined with a delayed suction form of capacity modulation with or without the motor control feature to thereby achieve better operating efficiency under certain conditions.

122 Claims, 28 Drawing Sheets

U.S. PATENT DOCUMENTS

| | | | | | |
|---|---|---|---|---|---|
| 4,744,733 | A | | 5/1988 | Terauchi et al. | |
| 4,747,756 | A | | 5/1988 | Sato et al. | |
| 4,764,096 | A | | 8/1988 | Sawai et al. | |
| 4,774,816 | A | * | 10/1988 | Uchikawa et al. | 62/324.1 |
| 4,846,633 | A | * | 7/1989 | Suzuki et al. | 417/310 |
| 5,059,098 | A | | 10/1991 | Suzuki et al. | |
| 5,263,822 | A | * | 11/1993 | Fujio | 418/55.4 |
| 5,277,563 | A | | 1/1994 | Wen-Jeu et al. | |
| 5,282,728 | A | | 2/1994 | Swain | |
| 5,282,729 | A | | 2/1994 | Swain | |
| 5,290,161 | A | * | 3/1994 | Swain | 418/55.1 |
| 5,336,058 | A | * | 8/1994 | Yokoyama | 417/299 |
| 5,342,185 | A | * | 8/1994 | Anderson | 418/55.4 |
| 5,342,186 | A | * | 8/1994 | Swain | 418/55.5 |
| 5,366,359 | A | | 11/1994 | Bookbinder et al. | |
| 5,366,360 | A | | 11/1994 | Bookbinder et al. | |
| 5,411,384 | A | * | 5/1995 | Bass et al. | 418/55.1 |
| 5,435,707 | A | * | 7/1995 | Hirano et al. | 418/55.5 |
| 5,447,420 | A | | 9/1995 | Caillat et al. | |
| 5,520,527 | A | | 5/1996 | Kim | |
| 5,531,577 | A | | 7/1996 | Hayase et al. | |

FOREIGN PATENT DOCUMENTS

| | | | |
|---|---|---|---|
| JP | 59-117895 | | 1/1983 |
| JP | 60-224987 | | 4/1984 |
| JP | 59-117895 | * | 8/1984 |
| JP | 5-187370 | | 7/1985 |
| JP | 62-116187 | | 1/1986 |
| JP | 1-240316 | | 3/1988 |
| JP | 2-23279 | | 7/1988 |
| JP | 6-26470 | | 7/1992 |
| JP | 7-12062 | | 6/1993 |
| JP | 7-103159 | | 10/1993 |
| WO | WO 86 01262 A | | 2/1986 |

* cited by examiner 76
82
74
68
80
64
66
42
54
62
60
50
40
56
48
58
78
24
32
52
51
46
34
26
36
70
28
38
30
44
20
72
10
16
14
18
12
22

Control Module
Sensor
80
82
74
68
74
12
46
102
20
42
98
78
18
50
48
96
56
60
58
32
26
40
44

CAPACITY MODULATED SCROLL MACHINE

Matter enclosed in heavy brackets [ ] appears in the original patent but forms no part of this reissue specification; matter printed in italics indicates the additions made by reissue.

BACKGROUND AND SUMMARY OF THE INVENTION

The present invention is related to capacity modulation of compressors and more particularly to capacity modulation of scroll-type compressors.

Capacity modulation is often a desirable feature to incorporate in air conditioning and refrigeration compressors in order to better accommodate the wide range of loading to which the systems may be subjected. Many different approaches have been utilized for providing this capacity modulation feature ranging from controlling of the suction inlet to bypassing discharge gas back to the suction inlet. With scroll-type compressors, capacity modulation has often been accomplished via a delayed suction approach which comprises providing ports at various positions which, when opened, allow the compression chambers formed between the intermeshing scroll wraps to communicate with the suction gas supply thereby delaying the point at which compression of the suction gas begins. This method of capacity modulation actually reduces the compression ratio of the compressor. While such systems are effective at reducing the capacity of the compressor, they are only able to provide a predetermined amount of compressor unloading, the amount of unloading being dependent upon the positioning of the unloading ports along the wraps. While it is possible to provide multiple step unloading by incorporating a plurality of such ports at different locations, this approach becomes costly and requires additional space to accommodate the separate controls for opening and closing each set of ports.

The present invention, however, overcomes these deficiencies in that it enables virtually a continuous range of unloading from 100 percent or full capacity down to virtually zero capacity utilizing only a single set of controls. Further, the system of the present invention enables the operating efficiency of the compressor and/or refrigeration system to be maximized for any degree of compressor unloading desired.

In the present invention, compressor unloading is accomplished by cyclically effecting axial or radial separation of the two scroll members for predetermined periods of time during the operating cycle of the compressor. More specifically, the present invention provides an arrangement wherein one scroll member is moved axially or radially toward and away from the other scroll member in a pulsed fashion to cyclically provide a leakage path across the tips or flanks of the wraps from higher pressure compression pockets defined by the intermeshing scroll wraps to lower pressure pockets and ultimately back to suction. By controlling the relative time between sealing and unsealing of the scroll wrap tips or flanks, virtually any degree of compressor unloading can be achieved with a single control system. Further, by sensing various conditions within the refrigeration system, the duration of compressor loading and unloading for each cycle can be selected for a given capacity such that overall system efficiency is maximized. For example, if it is desired to operate the compressor at 50 percent capacity, this can be accomplished by operating the compressor alternately in a loaded condition for five seconds and unloaded for five seconds or loaded for seven seconds and unloaded for seven seconds, one or the other of which may provide greater efficiency for the specific operating conditions being encountered.

The various embodiments of the present invention described below provide a wide variety of arrangements by which one scroll member may be axially or radially reciprocated with respect to the other to accommodate a full range of compressor unloading. The ability to provide a full range of capacity modulation with a single control system as well as the ability to select the duration of loaded and unloaded operation cooperate to provide an extremely efficient system at a relatively low cost.

Additionally, in order to even further improve system efficiency in some applications, it may be desirable to combine a delayed suction type of capacity modulation with the pulsed unloading approach mentioned above. For example, when operating conditions are such that system pressures just downstream of the discharge valve are at a level below the full load design level, the compression ratio of the compressor will result in pressure of the compressed fluid as it is discharged from the compression chamber being too high, a condition known as over-compression. The most efficient way to reduce capacity under these conditions is to reduce the compression ratio of the compressor and hence the pressure of the compressed fluid exiting the compression chamber such that it is equal to or only slightly above the system pressure just downstream of the discharge valve thus eliminating the lost work due to over-compression. However, if a further reduction in capacity is indicated by system condition once the over-compression condition has been eliminated, the use of a pulsed type of capacity modulation will be more efficient as it will avoid creation of a condition known as under-compression, that being a situation where the pressure of the compressed fluid as it leaves the compression chamber being below that of the system just downstream of the discharge valve. Thus, the present invention also includes a system in which both pulsed and delayed suction capacity modulation approaches are combined which result in even greater efficiencies for systems likely to encounter such operating conditions than could be achieved by either of the two capacity modulation approaches alone.

Additionally, the present invention may also incorporate a motor control module which will operate to control various operating parameters thereof to enhance its operating efficiency during periods when the motor load is reduced due to unloading of the compressor.

Additional advantages and features of the present invention will become apparent from the subsequent description and the appended claims taken in conjunction with the accompanying drawings.

DESCRIPTION OF THE PREFERRED EMBODIMENTS

Figure 1:
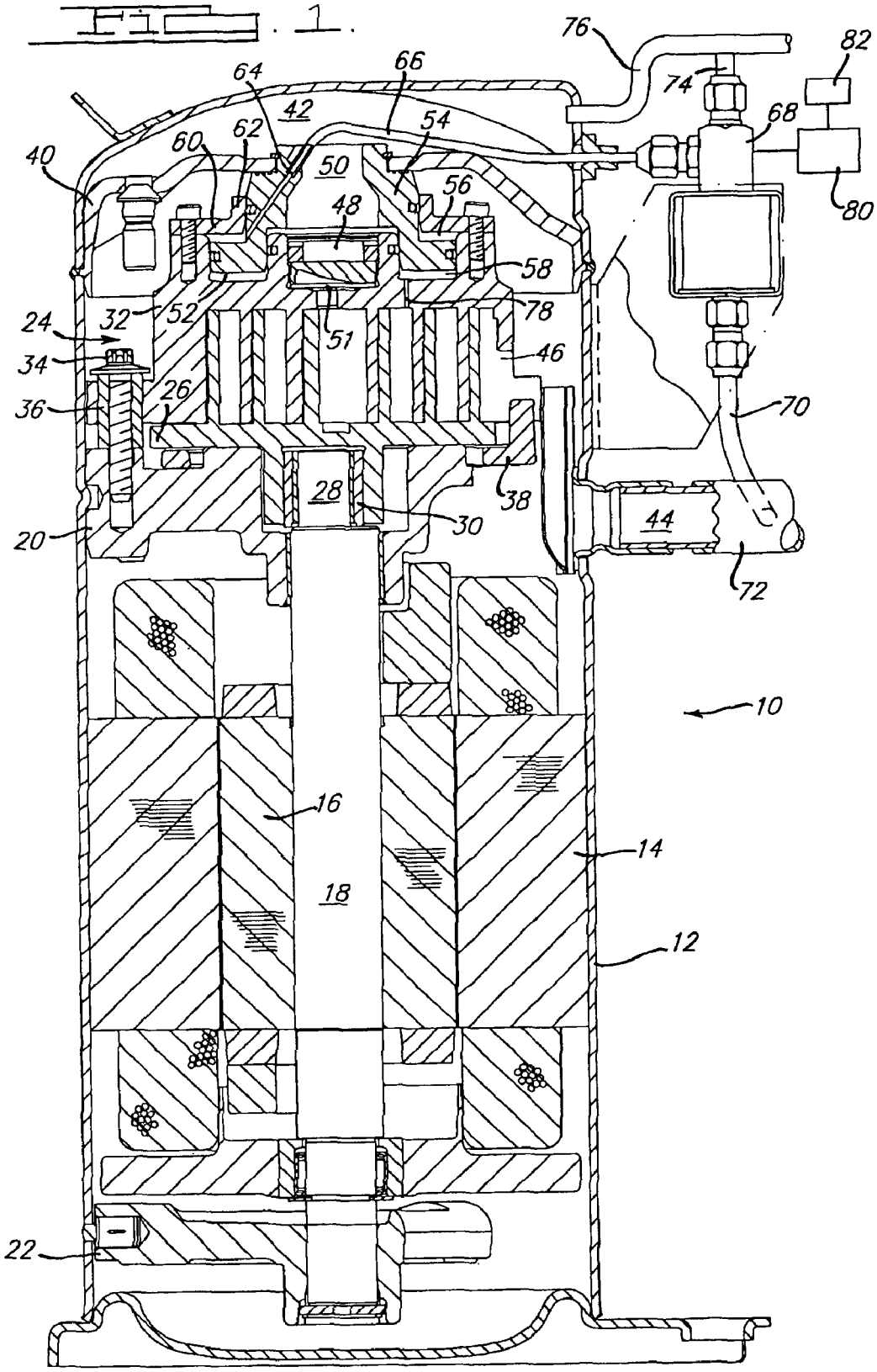
FIG. 1 is a section view of a scroll-type refrigeration compressor in accordance with the present invention.

Referring now to the drawings and in particular to FIG. 1, there is shown a hermetic scroll compressor in accordance with the present invention indicated generally at 10. Scroll compressor 10 is generally of the type described in assignee's U.S. Pat. No. 5,102,316, the disclosure of which is incorporated by reference, and includes an outer shell 12 within which is disposed a driving motor including stator 14 and rotor 16, a crankshaft 18 to which rotor 16 is secured, upper and lower bearing housings 20, 22 for rotatably supporting crankshaft 18 and compressor assembly 24.

Compressor assembly 24 includes an orbiting scroll member 26 supported on upper bearing housing 20 and drivingly connected to crankshaft 18 via crank pin 28 and drive bushing 30. A second non-orbiting scroll member 32 is positioned in meshing engagement with scroll member 26 and axially movably secured to upper bearing housing 20 by means of a plurality of bolts 34 and associated sleeve members 36. An Oldham coupling 38 is provided which cooperates between scroll members 26 and 32 to prevent relative rotation therebetween.

A partition plate 40 is provided adjacent the upper end of shell 12 and serves to define a discharge chamber 42 at the upper end thereof.

In operation, as orbiting scroll member 26 orbits with respect to scroll member 32, suction gas is drawn into shell 12 via suction inlet 44 and thence into compressor 24 through inlet 46 provided in non-orbiting scroll member 32. The intermeshing wraps provided on scroll members 26 and 32 define moving fluid pockets which progressively decrease in size and move radially inwardly as a result of the orbiting motion of scroll member 26 thus compressing the suction gas entering via inlet 46. The compressed gas is then discharged into discharge chamber 42 via discharge port 48 provided in scroll member 32 and passage 50. A suitable pressure responsive discharge valve 51 is preferably provided seated within discharge port 48.

Scroll member 32 is also provided with an annular cylindrical recess 52 formed in the upper surface thereof. One end of a generally irregularly shaped cylindrical member 54 within which passage 50 is provided projects into cylinder 52 and divides same into upper and lower chambers 56 and 58. The other end of cylindrical member 54 is sealingly secured to partition plate 40. An annular ring 60 is secured to the upper end of scroll member 32 and includes an axially extending flange 62 slidingly engageable with cylinder member 54 to thereby seal off the open upper end of chamber 56.

Cylindrical member 54 includes a passage 64 having one end which opens into upper chamber 56. A fluid line 66 is connected to the other end of passage 64 and extends outwardly through shell 12 to a solenoid operated valve 68. A second fluid line 70 extends from valve 68 to suction line 72 connected to suction inlet 44 and a third fluid line 74 extends from valve 68 to a discharge line 76 extending outwardly from discharge chamber 42.

In order to bias scroll member 32 into sealing engagement with scroll member 26 for normal fully loaded operation, a bleed hole 78 is provided in scroll member 32 communicating between chamber 58 and a compression pocket at an intermediate pressure between suction and discharge pressure. Thus, chamber 58 will be at an intermediate pressure which together with the discharge pressure acting on the upper surface of scroll member 32 in the area of discharge port 48 will exert a biasing force on scroll member urging it axially into sealing engagement with orbiting scroll member 26. At the same time, solenoid valve 68 will be in a position so as to place upper chamber 56 in fluid communication with suction line 72 via fluid lines 66 and 70.

In order to unload compressor 24, solenoid valve 68 will be actuated in response to a signal from control module 80 to interrupt fluid communication between lines 66 and 70 and to place fluid line 66 in communication with discharge line 76 thus increasing the pressure within chamber 56 to that of the discharge gas. The biasing force resulting from this discharge pressure will overcome the sealing biasing force thereby causing scroll member 32 to move axially upwardly away from orbiting scroll member 26. This axial movement will result in the creation of a leakage path between the respective wrap tips and end plates of scroll members 26 and 32 thereby substantially eliminating continued compression of the suction gas. When unloading occurs, discharge valve 51 will move to a closed position thereby preventing the backflow of high pressure fluid from discharge chamber 42 or the downstream system. When compression of the suction gas is to be resumed, solenoid valve 68 will be actuated to a position in which fluid communication between upper chamber 56 and discharge line 76 via lines 66 and 74 is interrupted and upper chamber 56 is placed in communication with suction line 72 via fluid lines 66 and 70 thereby relieving the axially directed separating force. This then allows the cooperative action of the intermediate pressure in chamber 58 and discharge pressure acting in passage 50 to again move scroll member 32 into sealing engagement with scroll member 26.

Preferably, control module 80 will have one or more appropriate sensors 82 connected thereto to provide the required information for control module 80 to determine the degree of unloading required for the particular conditions existing at that time. Based upon this information, control module 80 will send appropriately timed sequential signals to solenoid valve 68 to cause it to alternately place fluid line 66 in communication with discharge line 76 and suction line 72. For example, if conditions indicate that it is desirable to operate compressor 24 at 50 percent of full capacity, control module 80 may actuate solenoid valve to a position to place fluid line 66 in communication with suction line 72 for a period of say 10 seconds whereupon it is switched to place fluid line 66 in fluid communication with discharge line 76 for a like period of 10 seconds. Continued switching of solenoid valve 68 in this manner will result in compression occurring during only 50 percent of the operating time thus reducing the output of compressor 24 to 50 percent of its full load capacity. As the sensed conditions change, control module will vary the relative time periods at which compressor 24 is operated in a loaded and unloaded condition such that the capacity of compressor 24 may be varied between fully loaded or 100 percent capacity and completely unloaded or 0 percent capacity in response to varying system demands.

Figure 2:
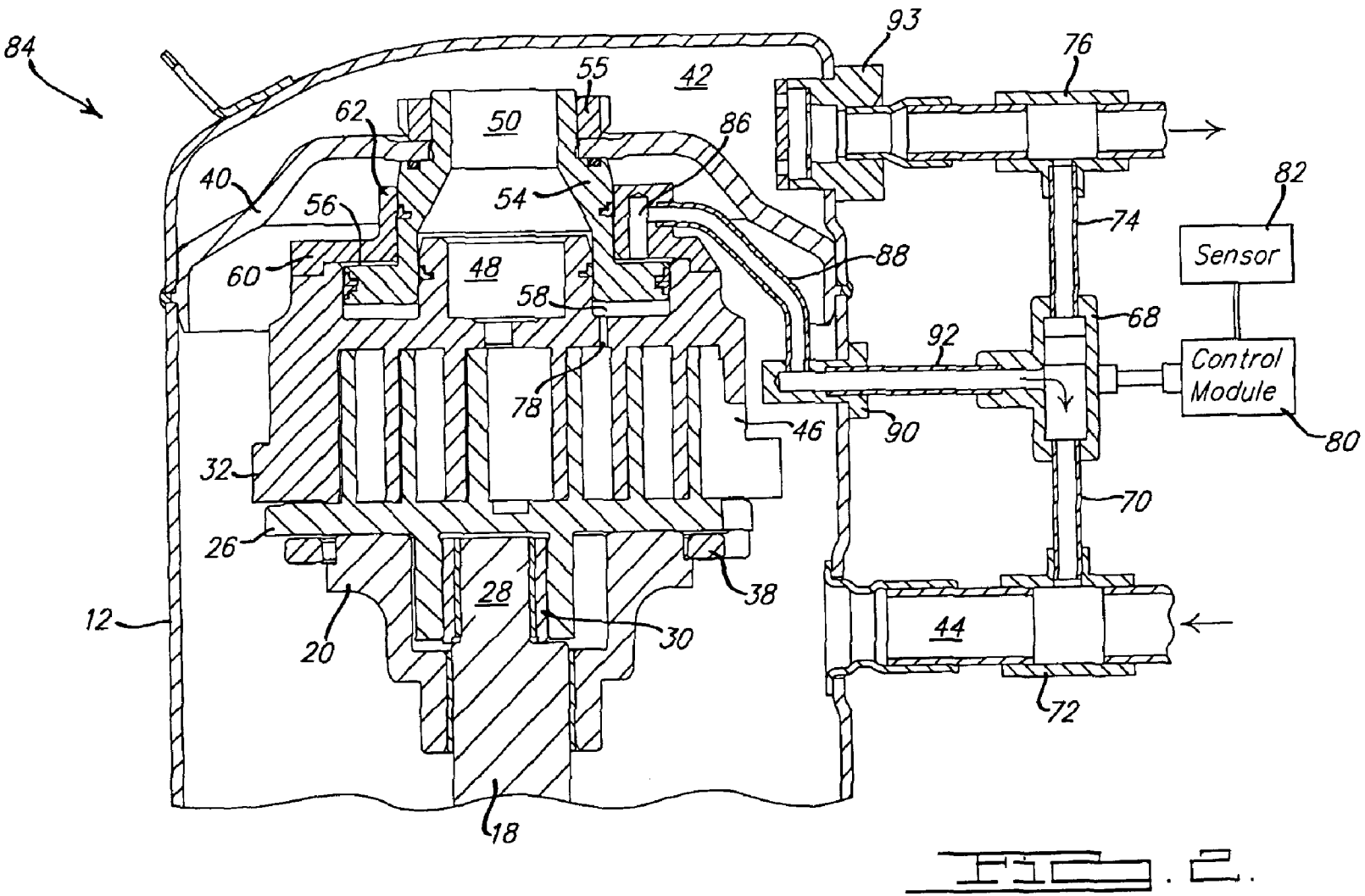
FIG. 2 is a fragmentary section view of a scroll-type refrigeration compressor showing another embodiment of the present invention.
Figure 3:
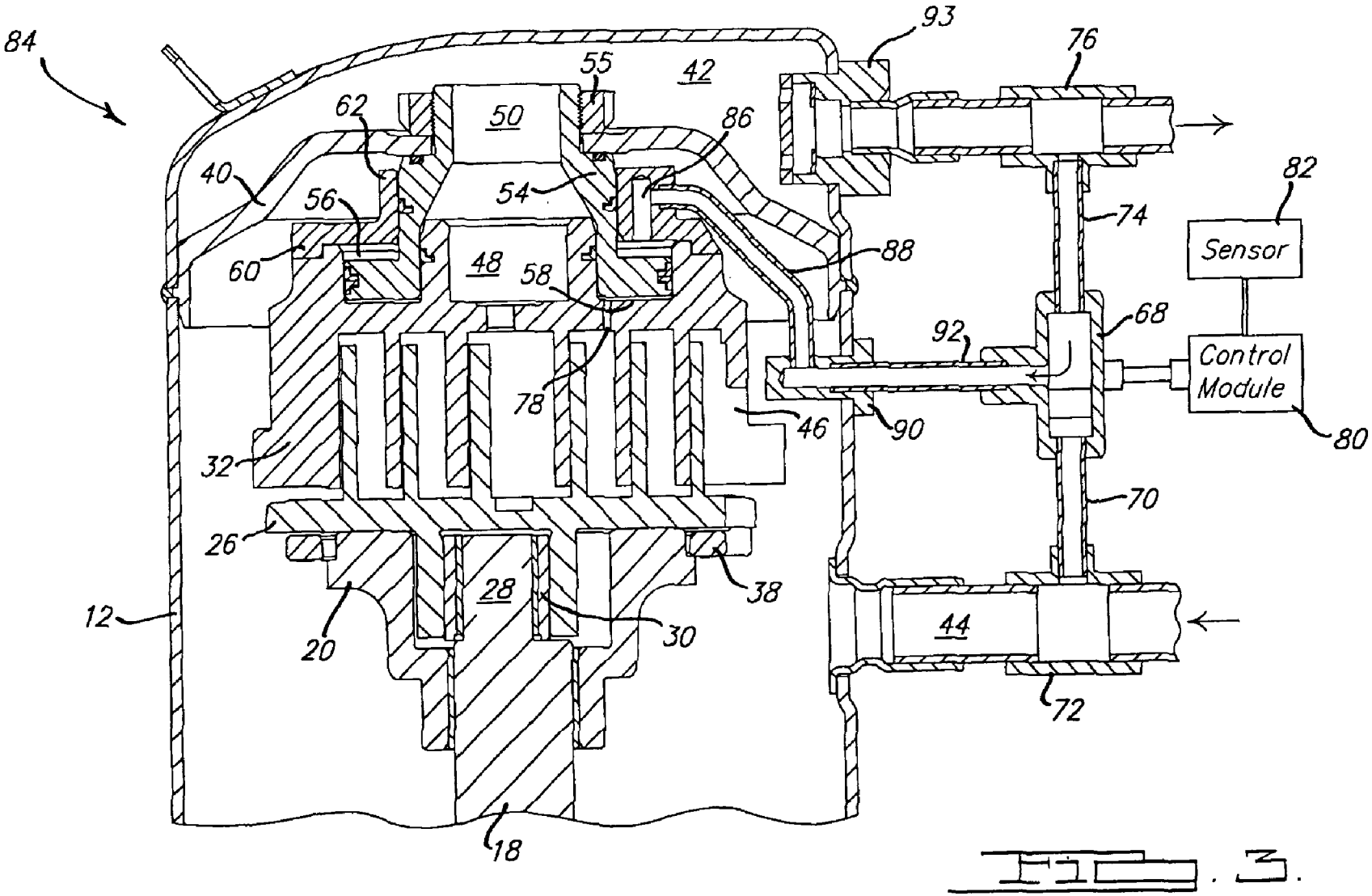
FIG. 3 is a view similar to that of FIG. 2 but showing the compressor in an unloaded condition.

FIGS. 2 and 3 show an axial unloading scroll compressor 34 similar to that of FIG. 1 with the primary exception being the arrangement for placing upper chamber 56 in fluid communication with suction and discharge lines. Accordingly, like portions have been indicated by the same reference numbers. As shown therein, passage 64 has been replaced by a passage 86 provided in annular member 60 which opens at one end into upper chamber 56 and at the other end through a radially outwardly facing sidewall. A flexible fluid line 88 extends from the outer end of passage 86 to a fitting 90 extending through shell 12 with a second line 92 connecting fitting 90 to solenoid valve 68. As with FIG. 1, solenoid valve 68 has fluid lines 70 and 74 connected to suction line 72 and discharge line 76 and is controlled by control module 80 in response to conditions sensed by sensor 82 to effect movement of non-orbiting scroll member 32 between the positions shown in FIGS. 2 and 3 in the same manner as described above with respect to the embodiment of FIG. 1. While this embodiment eliminates the need for an extra fitting extending outwardly from the high pressure discharge chamber 42, it requires that fluid conduit 88 be flexible so as to accommodate axial movement of scroll member 32 and associated annular member 60. It should also be noted that in this embodiment cylindrical member 54 is sealingly secured to partition plate 40 by means of nut 55 which threadedly engages the upper end thereof. Also in this embodiment, discharge valve 51 has been replaced by a discharge check valve 93 secured to the outer shell. It should be noted that the provision of a check valve some place along the discharge flowpath is highly desirable in order to prevent back flow of compressed gas from the system when the compressor is in an unloaded condition.

Figures 4, 5:
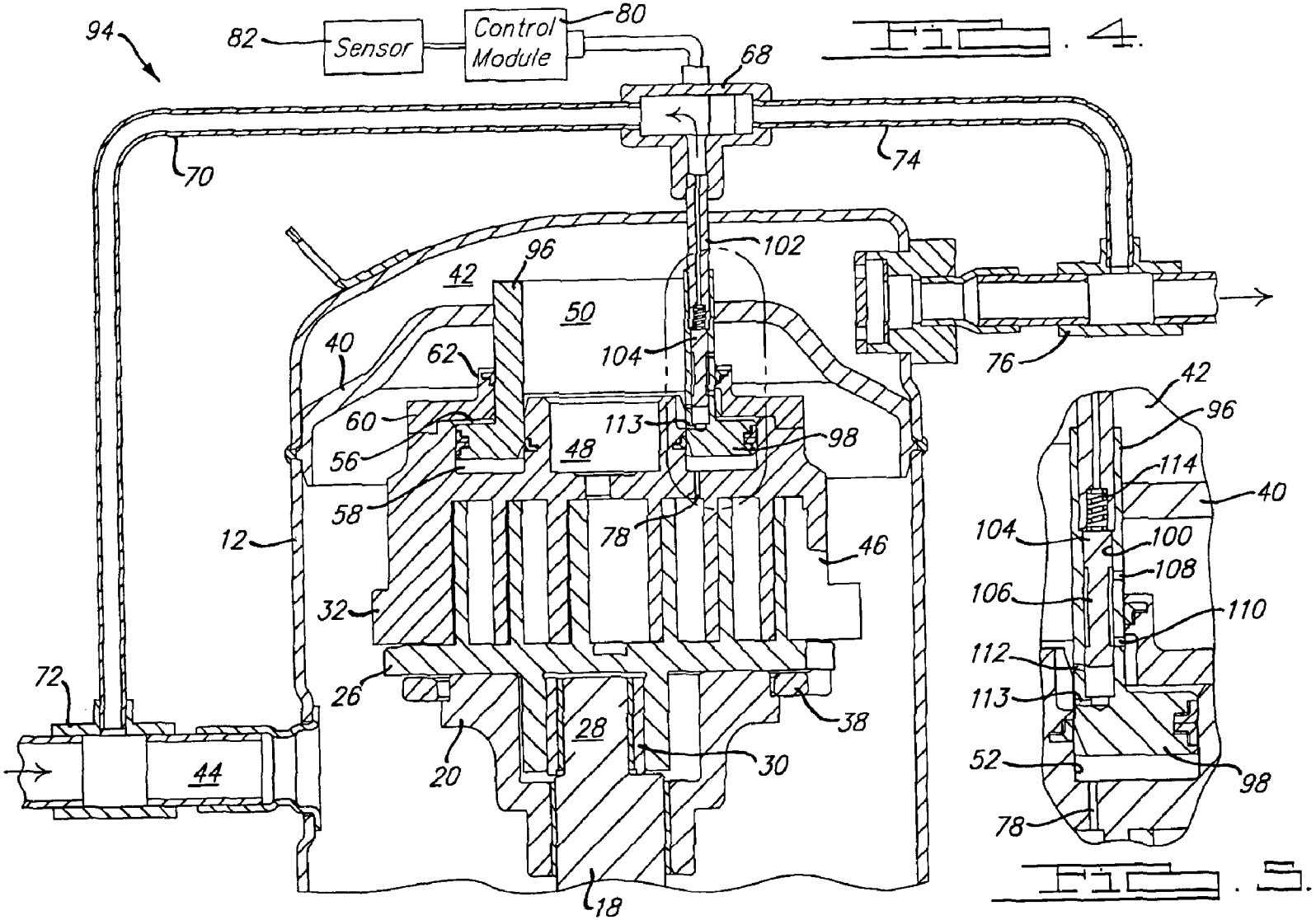
FIG. 4 is a fragmentary section view of a scroll-type refrigeration compressor showing a further embodiment of the present invention.
FIG. 5 is an enlarged view of the valve arrangement incorporated in the embodiment shown in FIG. 4.

FIGS. 4 and 5 show another embodiment 94 of the present invention in which axial unloading separating pressure fluid is provided directly from the discharge gas exiting the compressor. In this embodiment, a tubular member 96 is suitably secured to partition member 40 and includes a radially outwardly extending flange 98 which is positioned in and separates cylindrical recess into upper and lower chambers 56 and 58. Tubular member 96 also defines passage 50 for directing compressed discharge gas from port 48 to discharge chamber 42. An axial extending bore 100 is provided in tubular member which opens outwardly through the upper end thereof and is adapted to receive a fluid conduit 102. Fluid conduit 102 extends outwardly through the top of shell 12 and is connected to solenoid valve 68. Solenoid valve also has fluid conduits 70 and 74 connected to respective suction and discharge lines 72, 76 and is controlled by control module 80 in response to signals from appropriate sensors 82 in the same manner as described above.

A valve member 104 is axially movably disposed within bore 100. Valve member 104 includes a reduced diameter portion 106 operative to place radially extending passages 108 and 110 provided in member 96 in fluid communication when in a first position so as to vent upper chamber 56 to suction and to place radial fluid passage 110 in fluid communication with radial fluid passage 112 when in a second position so as to admit discharge gas from discharge flowpath 50 to upper chamber 56. A vent passage 113 is also provided which communicates between the bottom of bore 100 and passage 50 to vent gas from the area below valve 104 during operation thereof. A spring 114 is also provided which serves to aid in biasing valve 104 into its second position whereas pressurized discharge fluid entering bore 100 via passage 112 and passage 113 serves to bias valve member 104 into its first position.

As shown, valve member 104 and solenoid valve 68 are both in a position for fully loaded operation wherein solenoid valve 68 is in position to place fluid conduit 102 in communication with the suction line 72 and valve member 104 is in a position to vent upper chamber 56 to the interior of shell 12 which is at suction pressure. When it is desired to unload the compressor, solenoid valve 68 will be actuated to a position to place fluid line 102 in communication with fluid line 74 thereby enabling pressurized discharge fluid to act on the upper end of valve member 104. This pressurized fluid together with spring 114 will cause valve member 104 to move downwardly thereby closing off communication of radial passage 110 with radial passage 108 and opening communication between radial passage 110 and radial passage 112. Discharge pressure fluid will then flow into upper chamber 56 thus overcoming the intermediate pressure biasing force resulting from the communication of chamber 58 with a compression chamber at intermediate pressure via passage 78 and causing scroll member 32 to move axially upwardly away from orbiting scroll member 26. It should be noted that the relatively short flowpath for supplying discharge pressure fluid to upper chamber 56 ensures rapid unloading of the compressor.

Figure 6:
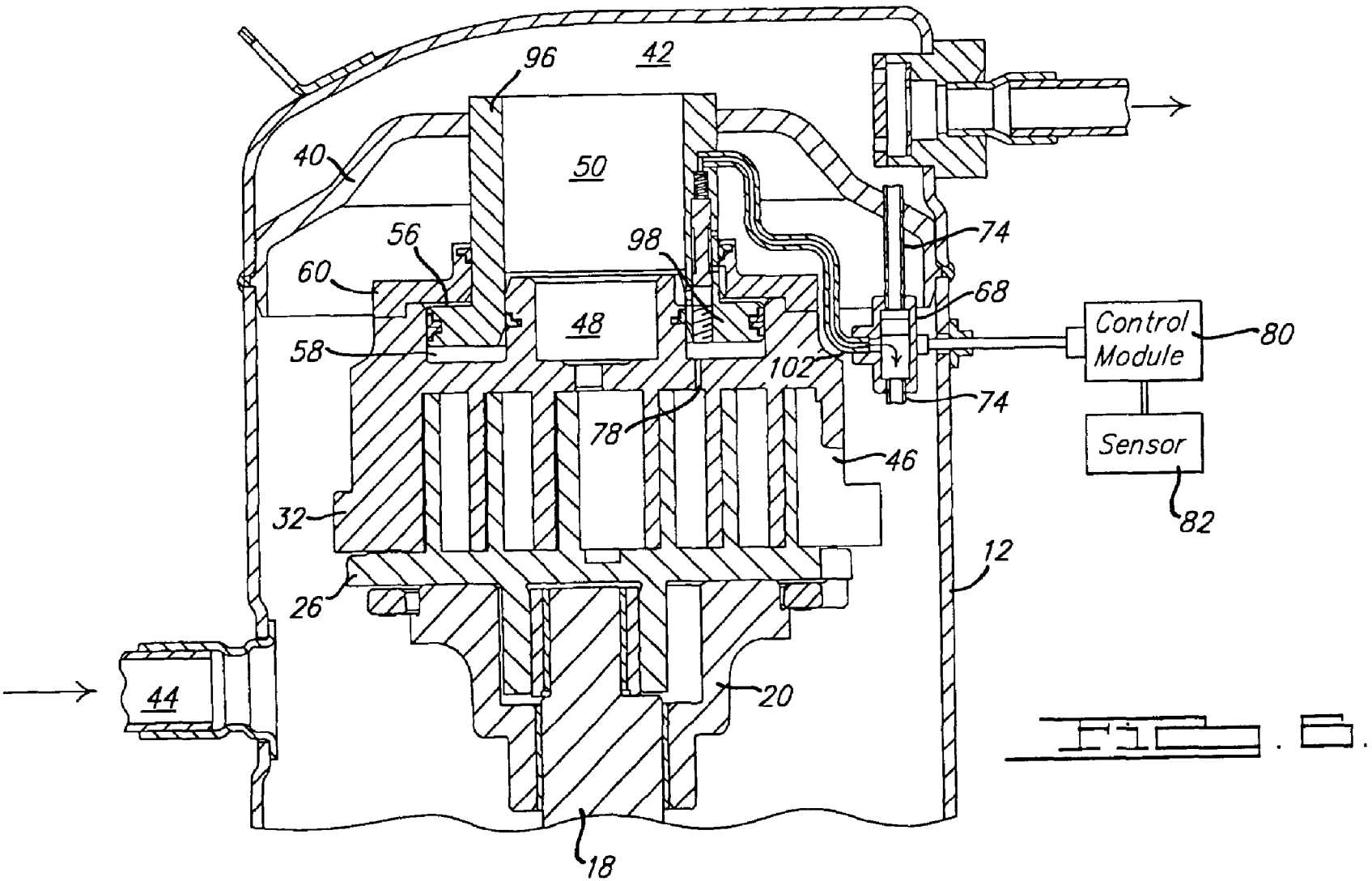
FIG. 6 is also a fragmentary section view of a scroll-type refrigeration compressor showing another embodiment of the present invention.

FIG. 6 shows a modified embodiment similar to that of FIGS. 4 and 5 except that solenoid valve 68 is positioned within shell 12. This embodiment eliminates the need for an additional fluid conduit through the high pressure portion of the shell, requiring only an electrical feed for actuating solenoid valve 68. In all other respects, construction and operation of this embodiment is substantially the same as that described above with respect to the embodiment shown in FIGS. 4 and 5 and accordingly corresponding portions are indicated by the same reference numbers.

While the previously described embodiments have been directed to unloading arrangements wherein the non-orbiting scroll has been moved axially away from the orbiting scroll, it is also possible to apply these same principles to the orbiting scroll. FIGS. 7 through 15 described below illustrate such a series of embodiments.

Figure 7:
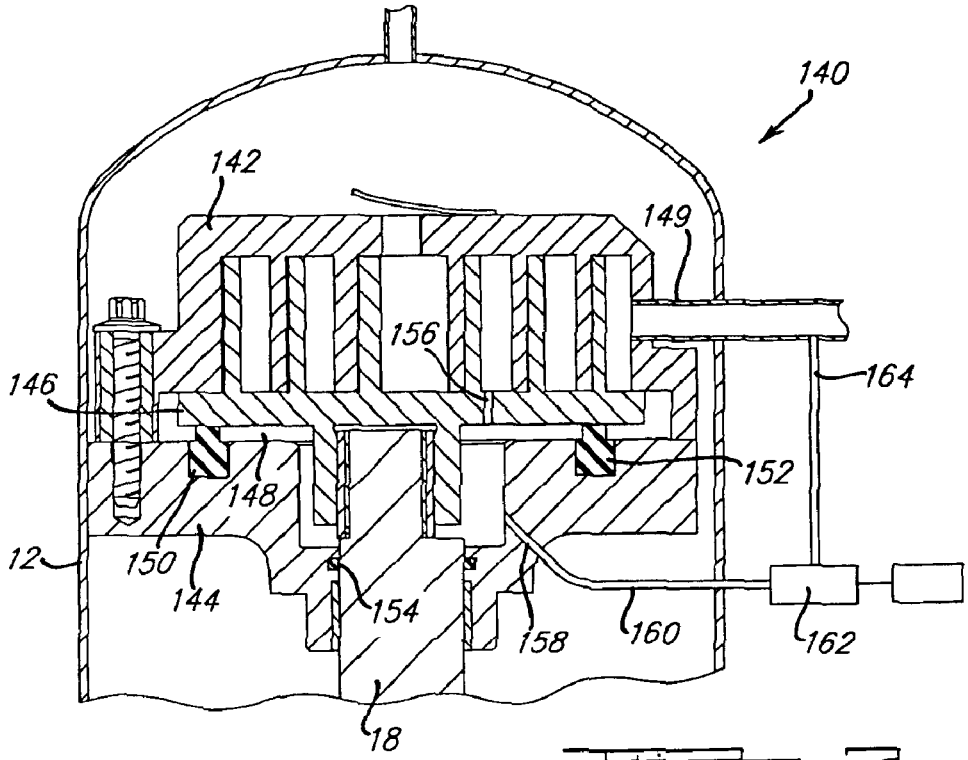
FIGS. 7 through 15 are all fragmentary section views of refrigeration compressors in accordance with the present invention in which the orbiting scroll member is axially reciprocated to accomplish compressor unloading.

Referring now to FIG. 7, a scroll compressor 140 is shown which is similar to the scroll compressors described above except that non-orbiting scroll member 142 is non-movably secured to bearing housing 144 and orbiting scroll member 146 is axially movable. It is also noted that compressor 140 is a high side machine, that is, the suction inlet 149 is directly connected to the non-orbiting scroll member 142 and the interior of the shell 12 is at discharge pressure. In this embodiment, orbiting scroll member 146 is axially movable and is biased into engagement with non-orbiting scroll 142 by means of a pressure chamber 148 defined between orbiting scroll member 146 and main bearing housing 144. An annular recess 150 is provided in main bearing housing 144 in which is disposed a suitable annular resilient seal member 152 which sealingly engages the lower surface of orbiting scroll member 146 so as to prevent fluid communication between chamber 148 and the interior of shell 12 which is at discharge pressure. A second annular seal 154 is provided on main bearing housing 144 surrounding shaft 18 to prevent fluid leakage therealong. A small passage 156 is provided through the end plate of orbiting scroll member 146 to place chamber 148 in fluid communication with a compression chamber at a pressure intermediate suction and discharge pressure. Additionally, a passage 158 in main bearing housing extends outwardly from chamber 148 and has one end of fluid line 160 connected thereto. The other end of fluid line 160 extends outwardly through shell 12 and is connected to solenoid valve 162. A second fluid line 164 extends between solenoid valve 162 and suction line 148.

In operation, chamber 148 will be supplied with fluid at intermediate pressure to thereby bias orbiting scroll 146 into sealing engagement with non-orbiting scroll 142. At this time, solenoid valve 162 will be in a position to prevent fluid communication between lines 160 and 164. In order to unload compressor 140, solenoid valve 162 is actuated to a position to place line 160 in fluid communication with fluid line 164 thereby venting the intermediate pressure in chamber 148 to suction. The pressure within the compression pockets will then cause orbiting scroll member 146 to move axially downwardly as shown compressing resilient seals 152 and thereby forming a leakage path across the respective wrap tips and associated end plates of the orbiting and non-orbiting scroll members 146, 142. While passage 156 may continue to provide fluid at a pressure somewhat higher than suction pressure to chamber 148, the relative sizing of passage 158, fluid lines 160 and 164 and passage 158 will be such that there will be insufficient pressure in chamber 148 to bias orbiting scroll member 146 into sealing engagement with non-orbiting scroll member 142 so long as solenoid valve 162 is in a position to maintain fluid communication between suction line 149 and chamber 148. Solenoid valve 162 will be cycled between open and closed positions so as to cyclically load and unload compressor 140 in substantially the same manner as described above.

Figure 8:
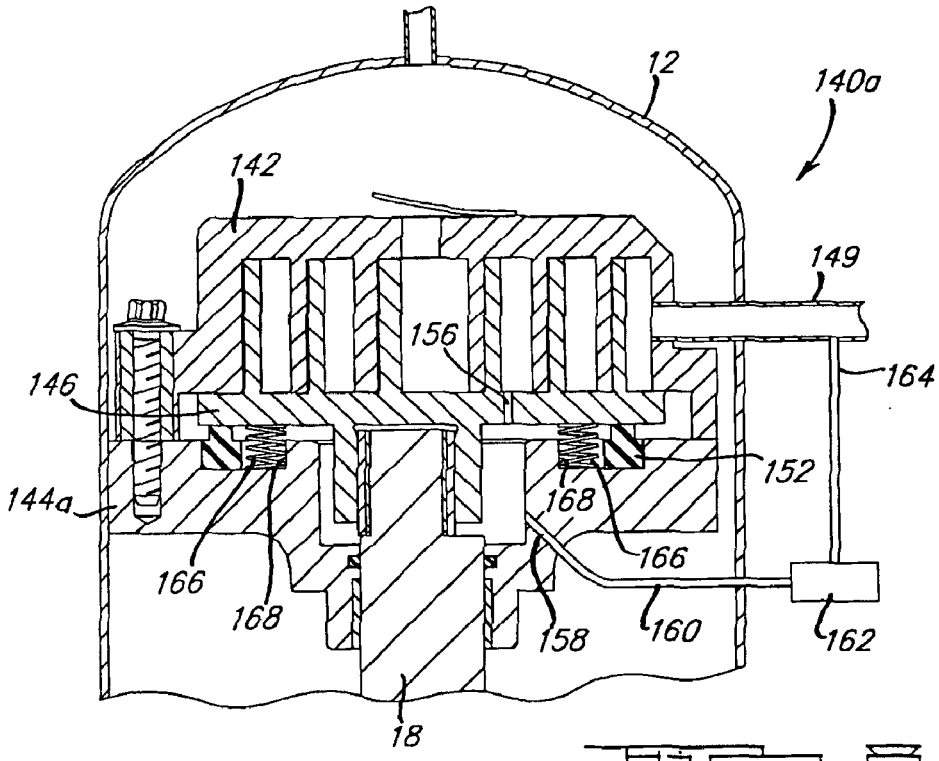

FIG. 8 shows a modified version 140a of the embodiment of FIG. 7 wherein a plurality of springs 166 are provided. Springs 166 are seated in recesses 168 provided in bearing housing 144a and bear against the end plate of orbiting scroll 146 so as to assist in urging orbiting scroll into sealing engagement with non-orbiting scroll 142. Springs 166 serve primarily to provide an initial biasing force for orbiting scroll member 146 on initial start up of compressor 140a but will also assist in providing more rapid loading of compressor 140a upon closing of solenoid valve 162 during operation.

Figure 9:
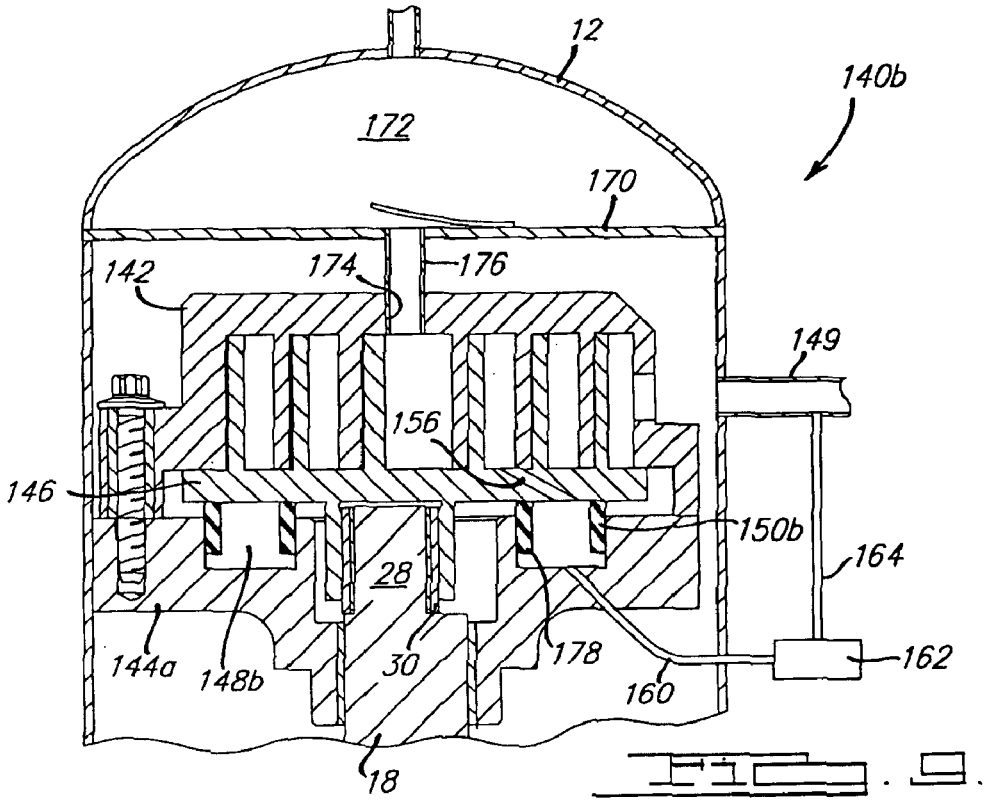

FIG. 9 shows a further modification 140b of the embodiments of FIGS. 7 and 8. In this embodiment shell 12 is provided with a partition member 170 to separate the interior thereof into a high pressure discharge chamber 172 to which discharge port 174 is connected via conduit 176 and a low suction pressure chamber therebelow within which the compressor is disposed. Additionally, in this embodiment shaft seal 154 has been replaced with a second annular seal 178 positioned radially inwardly and concentric with seal 150b. Thus the area in which crank pin 28 and drive bushing 30 are located will be at suction pressure to thereby avoid any problems associated with providing lubrication thereto from the oil sump which is also at suction pressure. It should be noted that the oil sump in the embodiments of FIGS. 7 and 8 was at discharge pressure and hence do not present any problems with respect to supplying of lubricant to these drive components.

Figure 10:
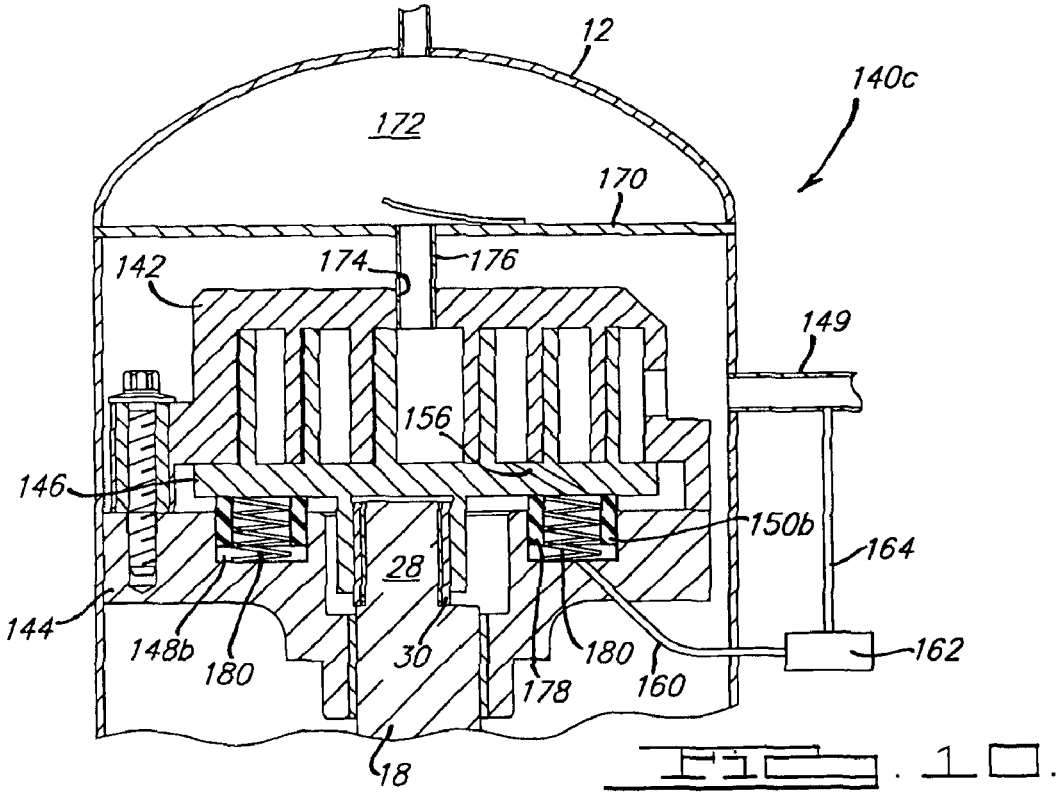

The embodiment 140c of FIG. 10 is substantially identical to that of FIG. 9 with the exception that in addition to the biasing force resulting from intermediate fluid pressure in chamber 148b, a plurality of springs 180 are also provided being positioned between orbiting scroll member 156 and main bearing housing 144 and functioning primarily to assist during start up but also to assist in reloading of compressor 140c similar to that described above with reference to FIG. 8.

Figure 11:
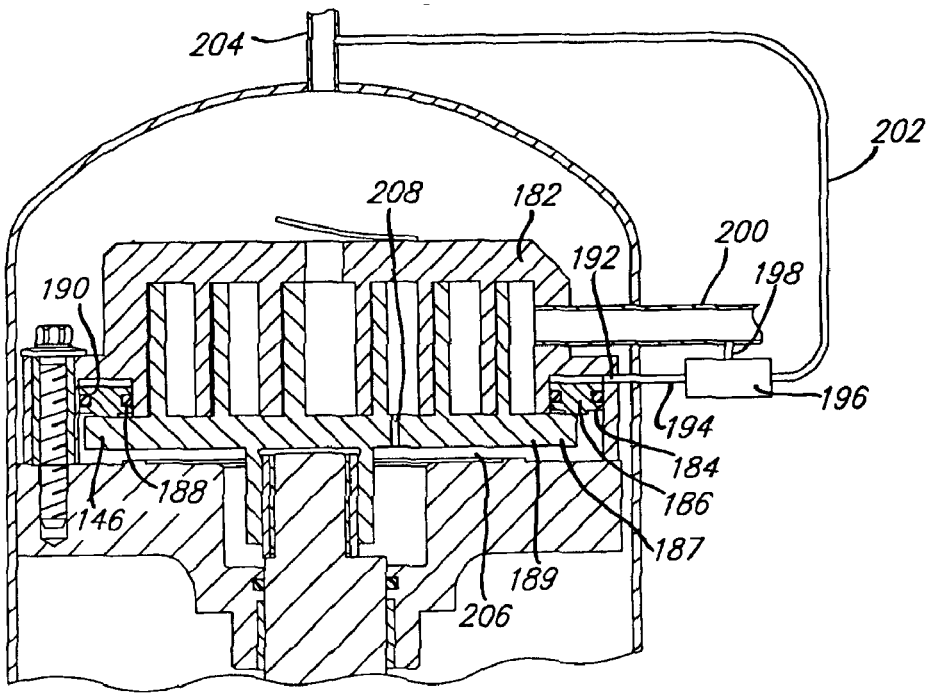

In the embodiment of FIG. 11, non-orbiting scroll member 182 is provided with an annular recess 184 within which an annular ring-shaped piston member 186 is movably disposed. The lower surface of annular piston member 186 bears against a radially outwardly extending portion 187 of end plate 189 of orbiting scroll member 146 and radially inner and outer annular seals 188, 190 are provided thereon which sealingly engage radially inner and outer walls of recess 184. A radially extending passage 192 provided in non-orbiting scroll member 182 communicates with the upper portion of recess 184 and has fluid conduit 194 connected to the outer end thereof. Fluid conduit 194 extends outwardly through shell 12 to solenoid valve 196. A second fluid conduit 198 connects solenoid valve 196 to suction line 200 whereas a third fluid conduit 202 connects solenoid valve 196 to discharge line 204.

Under normal fully loaded operating conditions, orbiting scroll member 146 will be axially biased into sealing engagement with non-orbiting scroll member 182 by intermediate fluid pressure in chamber 206 admitted thereto via bleed passage 208. At this time, the area of recess 184 disposed above annular piston member 186 will be vented to suction via solenoid valve 196 and conduits 194 and 198. When conditions indicate partial unloading of the compressor is desirable, solenoid valve 196 will be actuated to place fluid conduit 194 in fluid communication with discharge line 204 via conduit 202. The area above annular piston 186 will then be pressurized by fluid at discharge pressure thereby causing orbiting scroll member 146 to be biased axially downwardly as shown. As noted above, cyclical switching of solenoid valve 196 will result in repetitive loading and unloading of the compressor with the degree of unloading being determined by associated sensors and control module (not shown). It should be noted that in this embodiment, the compressor is shown as a high side machine and thus suction inlet 200 is directly connected to the suction inlet of non-orbiting scroll 182.

Figure 12:
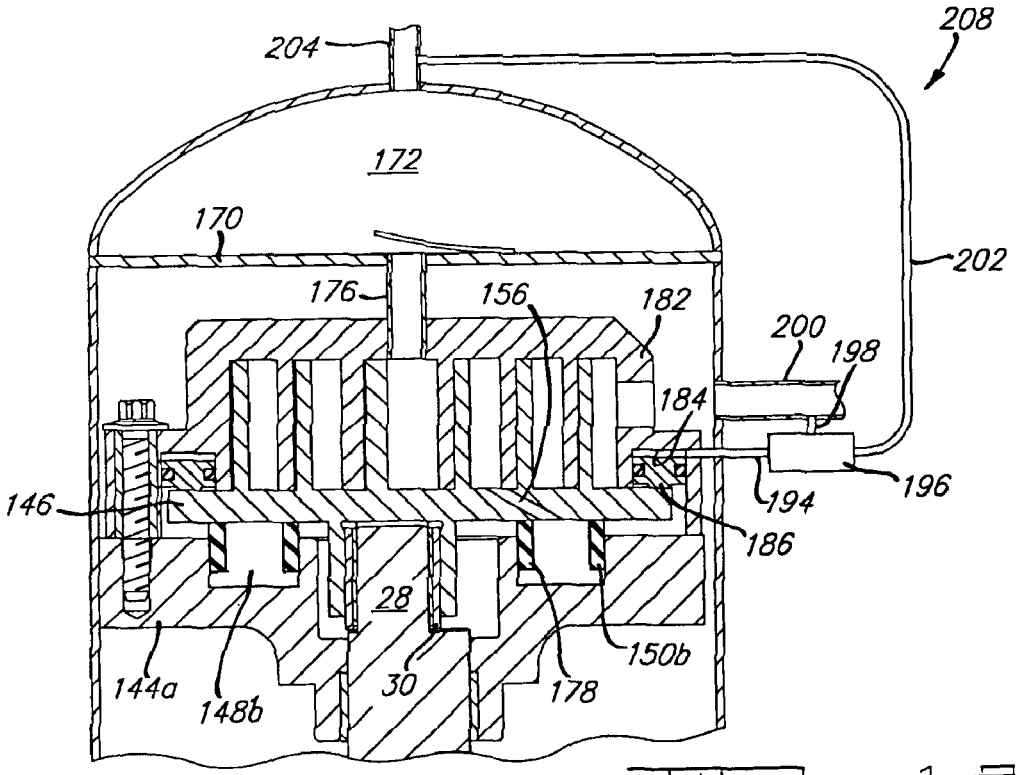

The embodiment 208 of FIG. 12 represents a combination of the axial unloading arrangement of FIG. 11 and the orbiting scroll biasing arrangement of FIG. 9 both described above. Accordingly, elements corresponding to like elements shown in and described with reference to FIGS. 9 and 11 are indicated by the same reference numbers. In this embodiment, the intermediate pressure axial biasing chamber 148b for the orbiting scroll is completely separate from the unloading discharge pressure biasing chamber defined by recess 184 and annular piston 186.

Figure 13:
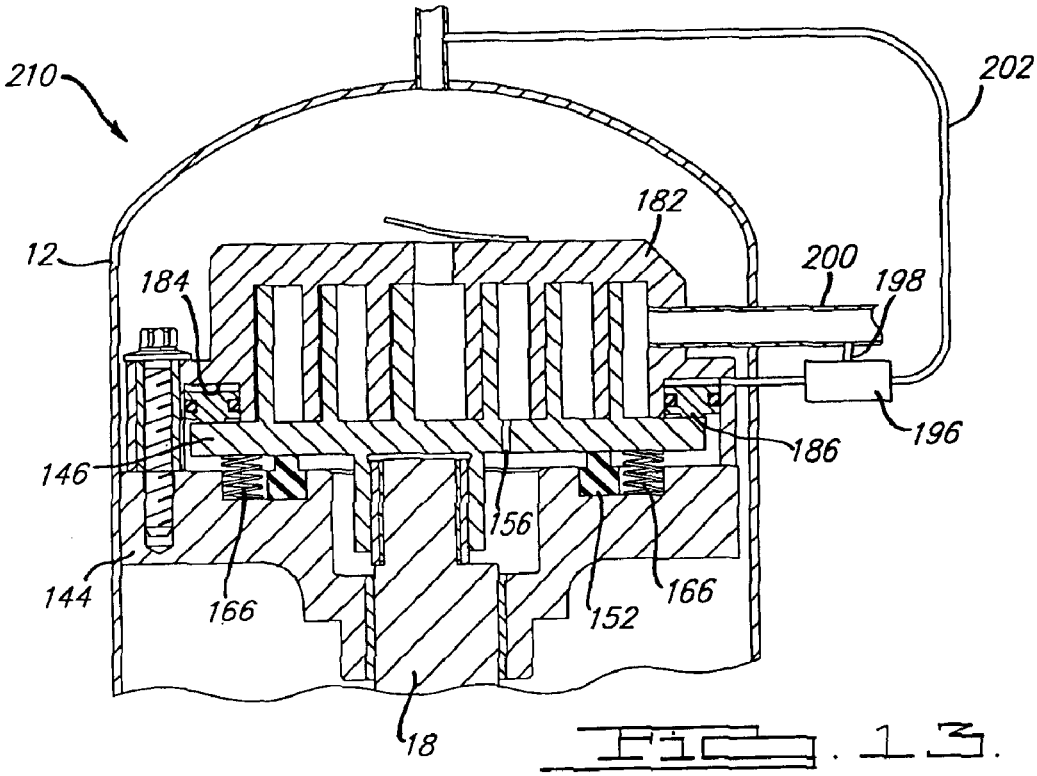

In like manner, the embodiment 210 of FIG. 13 represents a combination of the intermediate pressure biasing arrangement of FIG. 8 described above and the axial unloading pressure biasing arrangement of FIG. 11. Accordingly, corresponding elements have been indicated by the same reference numbers used in these respective figures.

Figure 14:
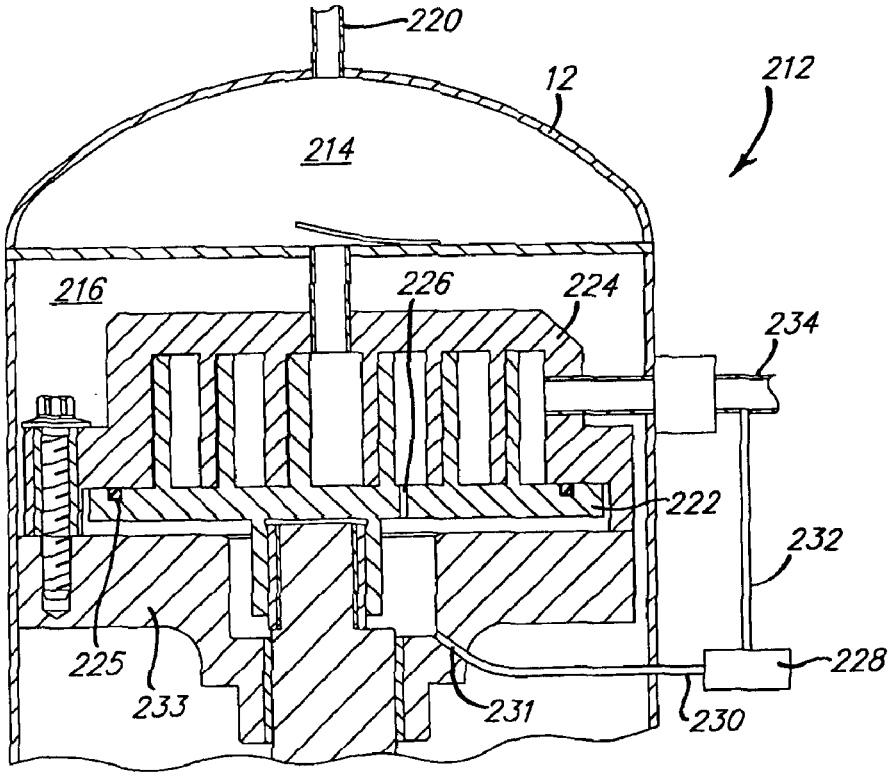

FIG. 14 shows an embodiment 212 wherein shell 12 includes an upper chamber 214 at discharge pressure and a lower portion 216 at a pressure intermediate suction and discharge. Accordingly, suction line 234 is directly connected to non-orbiting scroll member 224. Additionally, a suitable annular seal 225 may be provided between orbiting scroll 222 and non-orbiting scroll 224 around the outer periphery thereof. Orbiting scroll 222 is biased into sealing relationship with non-orbiting scroll 224 by intermediate pressure in chamber 216 supplied via passage 226. In order to unload compressor 212, a solenoid valve 228 is provided having a first fluid line 230 extending through shell 12 and being connected to one end of a passage 231 provided in lower bearing housing 233. A second fluid line 232 is connected between the suction inlet 234 and solenoid valve 228. When solenoid valve 228 is opened, the intermediate pressure acting on the lower surface of orbiting scroll 222 will be vented to suction via passage 231, fluid line 230, solenoid valve 228 and fluid line 232. Because passage 231, fluid lines 230 and 232 and solenoid valve 228 will be sized to provide a flow volume greater than that through passage 226 plus the leakage into the area defined between the bearing housing and end plate of orbiting scroll 222, the biasing force acting on orbiting scroll 222 will be relieved thus allowing the force of the fluid within the compression chamber to move orbiting scroll 222 axially away from non-orbiting scroll 224. As soon as solenoid valve 228 is closed, leakage flow of intermediate pressure fluid within lower portion 216 of shell 12 combined with flow from passage 226 will quickly restore the biasing force on orbiting scroll 222 whereby full compression will resume. Again, as with each of the above embodiments, cyclical actuation of solenoid valve 228 in response to a signal from a control module (not shown) resulting from appropriate sensed system conditions will result in cyclical loading and unloading of compressor thereby enabling modulation of capacity from 100 percent down to 0 percent capacity.

Figure 15:
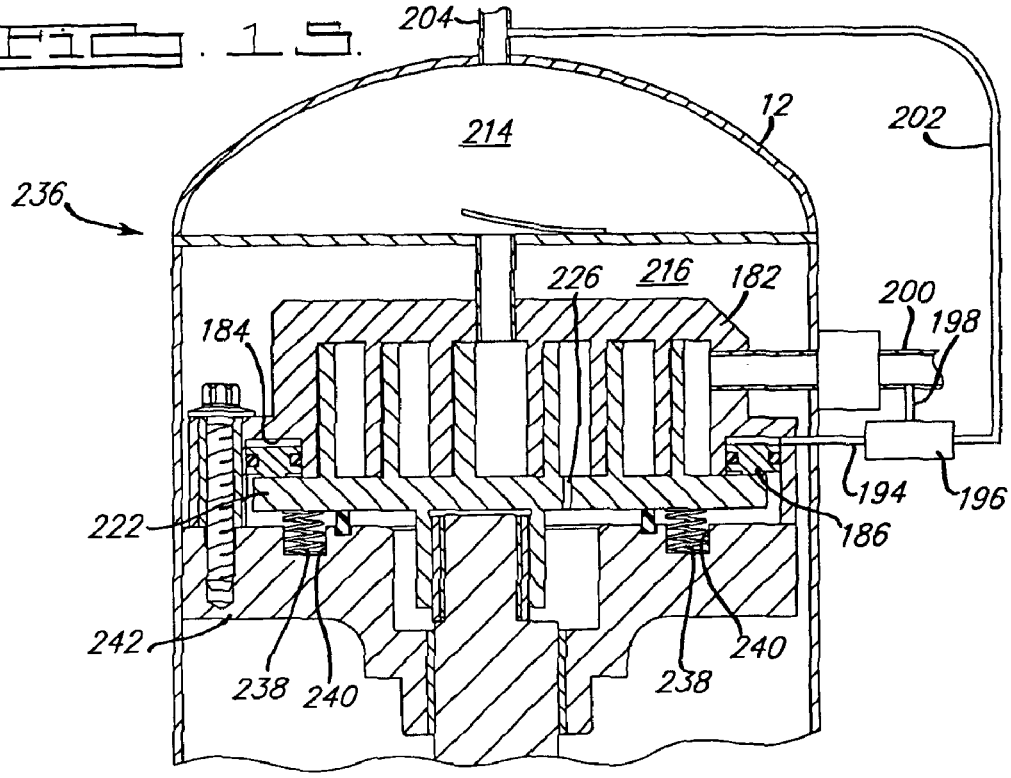

FIG. 15 shows an embodiment 236 which combines the features of an intermediate pressure lower shell and biasing arrangement for the orbiting scroll as shown in FIG. 14 with the discharge pressure unloading arrangement of FIG. 11. Accordingly, corresponding portions thereof are indicated by the same reference numbers. Additionally, as described with reference to FIGS. 8, 10, and 13, a plurality of springs 238 are provided being positioned in recess 240 provided in main bearing housing 242 and acting on the lower surface of the end plate of orbiting scroll member 222. As noted above, springs 238 serve primarily to bias orbiting scroll member 222 into sealing engagement with non-orbiting scroll member 182 during initial start up and also aid in reloading of compressor 236. Again, full and reduced loading of compressor 236 will be accomplished in the same manner as described above by means of cyclic actuation of solenoid valve 196.

Figure 16:
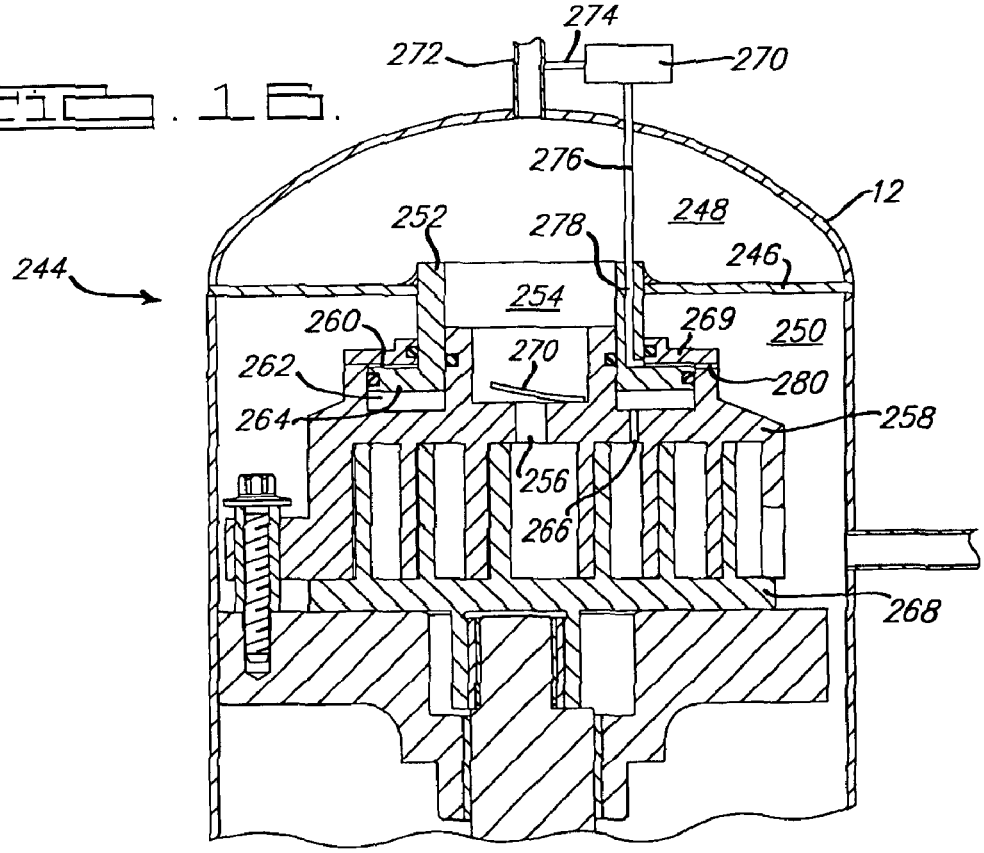
FIGS. 16 through 22 are all fragmentary section views of refrigeration compressors in accordance with the present invention in which the non-orbiting scroll member is axially reciprocated to accomplish compressor unloading.

Referring now to FIG. 16, yet another embodiment 244 of the present invention is shown which is generally similar to that of FIG. 1 and includes a shell 12 having a separating plate 246 dividing the interior thereof into a discharge chamber 248 and a lower chamber 250 at suction pressure. A cylindrical member 252 is secured to plate 246 and defines a flow path 254 for conducting compressed fluid from discharge port 256 of axially movable non-orbiting scroll 258. Non-orbiting scroll 258 has an annular recess provided in the upper surface thereof which is separated into upper and lower chambers 260, 262 respectively by a radially outwardly extending annular flange 264 provided on cylindrical member 252. A passage 266 places lower chamber 262 in fluid communication with a compression pocket at intermediate pressure to provide a biasing force for urging non-orbiting scroll 258 into sealing engagement with orbiting scroll 268. An annular plate member 269 is secured to non-orbiting scroll 258, sealingly and slidingly engages tubular member 252 and serves to close off the top of chamber 260. A pressure responsive discharge check valve 270 is also provided on non-orbiting scroll 258.

A two way solenoid valve 270 is provided being connected to discharge conduit 272 via fluid line 274 and to upper separating chamber 260 via fluid line 276 and passage 278 in tubular member 252. A vent passage 280 is provided between non-orbiting scroll 258 and plate 269 and extends between separating chamber 260 and the lower interior 250 of shell 12 which is at suction pressure. Vent passage 280 serves to continuously vent separating chamber 260 to suction pressure. When solenoid valve 270 is in a closed position, compressor 244 will be fully loaded as shown. However, when solenoid valve 270 is actuated to an open position by the control module (not shown) in response to selected sensed conditions, separating chamber 260 will become pressurized to substantially discharge pressure thereby overcoming the combined force of discharge pressure and suction pressure acting to bias non-orbiting scroll member 258 toward orbiting scroll member 268. Thus, non-orbiting scroll member 258 will move axially upwardly as shown thereby unloading compressor 244. It should be noted that in this embodiment, the size of lines 274 and 276 and passage 278 must be selected relative to the size of vent passage 280 to enable build up of sufficient pressure in separating chamber 260 to effect unloading. Additionally, the relative size of these packages will affect the speed at which compressor 244 may be cycled between loaded and unloaded conditions as well as the volume of discharge gas required to accomplish and maintain unloading.

Figure 17:
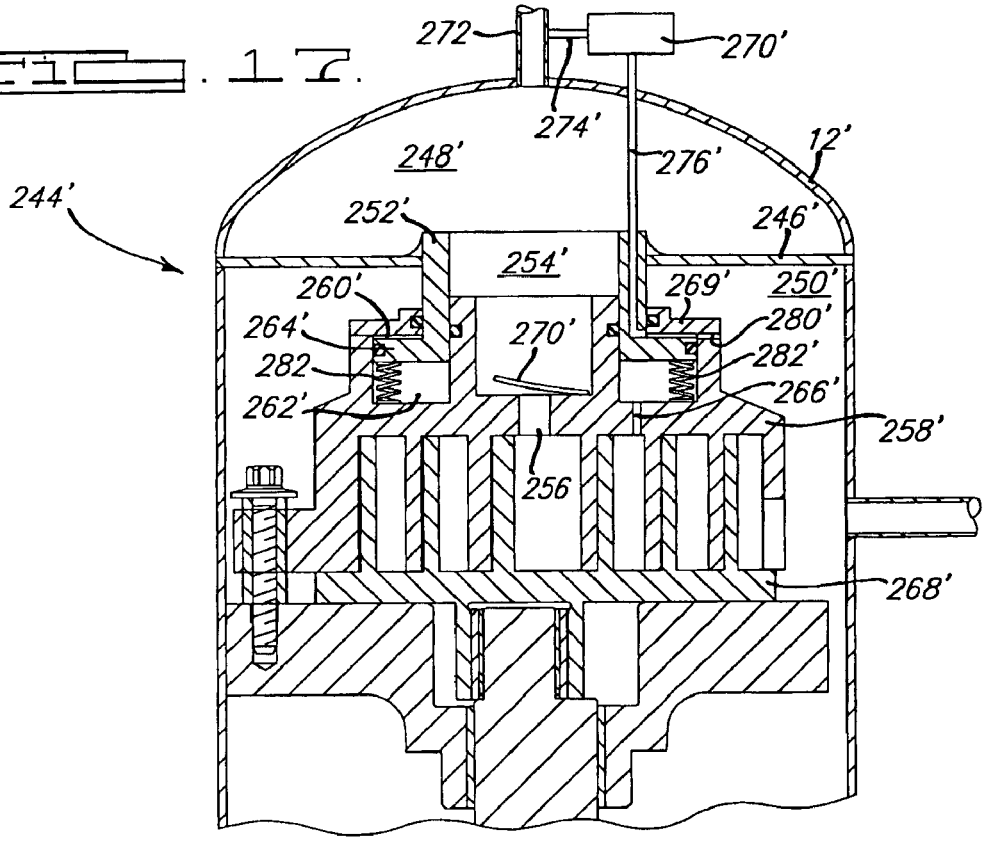

The embodiment of FIG. 17 is generally similar to that of FIG. 16 described above except that spring biasing members 282 are included in the intermediate pressure chamber. Accordingly, corresponding elements are indicated by the same reference numbers primed. As noted above, springs 280 serve primarily to assist in biasing non-orbiting scroll member 258 into sealing relationship with orbiting scroll member 268 during start up but will also function to assist in reloading compressor 244. In all other respects, the operation of compressor 244 will be substantially identical to that described with reference to FIGS. 1 and 16 above.

Figure 18:
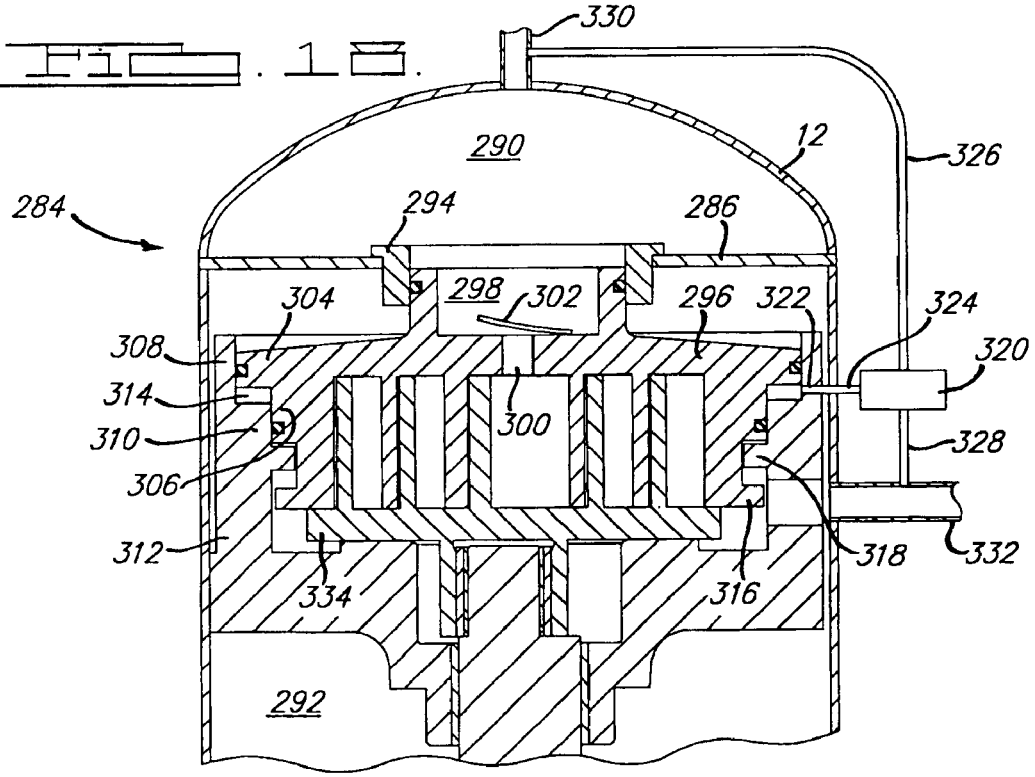

Referring now to FIG. 18, a further embodiment of the present invention is shown being indicated generally at 284. Compressor 284 includes an outer shell 12 having a separating plate 286 dividing the interior thereof into a discharge chamber 290 and a lower chamber 292 at suction pressure. A cylindrical member 294 is suitably secured to plate 286 and slidingly sealingly engages a cylindrical portion of axially movable non-orbiting scroll member 296 so as to define a discharge fluid flow path 298 from discharge port 300. A pressure responsive discharge check valve 302 is also provided being secured to non-orbiting scroll 296 and operative to prevent back flow of discharge fluid from chamber 290 into the compression chambers. Non-orbiting scroll 296 includes a pair of annular stepped portions 304, 306 on its outer periphery which cooperate with complementary portions 308, 310 on main bearing housing 312 to define a generally annular separating chamber 314. Additionally, non-orbiting scroll 296 includes a radially outwardly projecting flange portion 316 which cooperates with a radially inwardly projecting flange portion 318 on main bearing housing 312 to limit axially separating movement of non-orbiting scroll 296.

A solenoid valve 320 is also provided being connected in fluid communication with chamber 314 via passage 322 in main bearing housing 312 and fluid line 324. Fluid lines 326 and 328 serve to interconnect solenoid valve 320 with discharge line 330 and suction line 332 respectively.

Similarly to that described above, when compressor 284 is operating under a normal fully loaded condition as shown, solenoid valve 320 will be in a position to place chamber 314 in fluid communication with suction line 332 via passageway 322 and fluid lines 324 and 328. Under these conditions, the biasing force resulting from discharge pressure fluid in chamber 290 acting on the upper surface of non-orbiting scroll 296 within flow path 298 will operate to urge non-orbiting scroll 296 into sealing engagement with orbiting scroll 334. When it is desired to unload compressor 284, solenoid valve 320 will operate to place chamber 314 in fluid communication with discharge pressure fluid via fluid lines 326, 324 and passageway 322. The resulting pressure in chamber 314 will then operate to overcome the biasing force being exerted on non-orbiting scroll 296 thus causing it to move axially upwardly as shown and out of sealing engagement with orbiting scroll 334 thus unloading compressor 284. To reload compressor 296, solenoid valve 320 will operate to vent the discharge pressure fluid in chamber 314 to suction line 332 via passage 322 and fluid lines 324, 328 thereby allowing the biasing force acting on non-orbiting scroll 296 to move it axially downwardly back into sealing engagement with orbiting scroll 334. In like manner, as noted above, operation of solenoid valve 320 will be controlled by a suitable control module (not shown) in response to system conditions sensed by one or more sensors in cyclically load and unload compressor 284 as needed.

Figure 19:
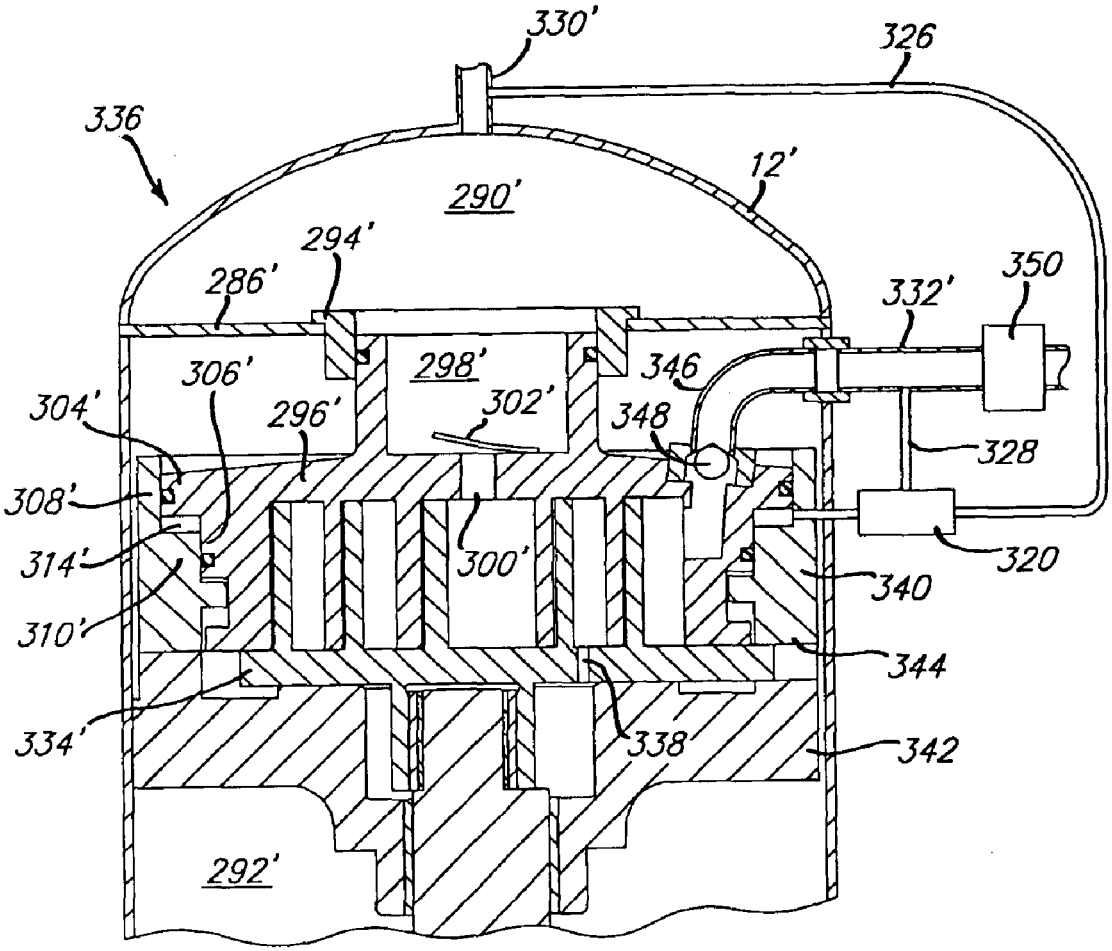

A further embodiment of the present invention is shown in FIG. 19 being indicated generally at 336 which is similar to the embodiment shown in FIG. 18. Accordingly, corresponding portions thereof have been indicated by the same reference numbers primed. In this embodiment, lower portion 292' of shell 12' is at intermediate pressure supplied via passage 338 in orbiting scroll 334' which also acts to exert an upwardly directed biasing force thereon. Additionally, ring member 340 which includes stepped portions 308', 310' is separately fabricated and secured to main bearing housing 342. Ring member 340 also includes a portion 344 which extends into overlying relationship with the end plate of orbiting scroll member 334' and operates to limit upward movement thereof when compressor 336 is in an unloaded condition. Additionally, an internal flexible suction line 346 is provided being connected to suction line 332' and to non-orbiting scroll 296'. A check valve 348 is provided at the connection of line 346 with non-orbiting scroll 296' and serves to prevent back flow of fluid under compression when compressor 336 is unloaded. A suction control device 350 is also optionally provided in suction line 332' upstream of the point at which fluid line 328 is connected. Suction control device 350 will be controlled by control module (not shown) and will operate to restrict suction gas flow through suction line 332' so that the reduced pressure downstream thereof will assist in evaluating chamber 314' during transition from unloaded operation to loaded operation or also on initial start up of compressor 336. In all other respects the operation including the cyclical loading and unloading of compressor 336 will be substantially the same as described above.

Figure 20:
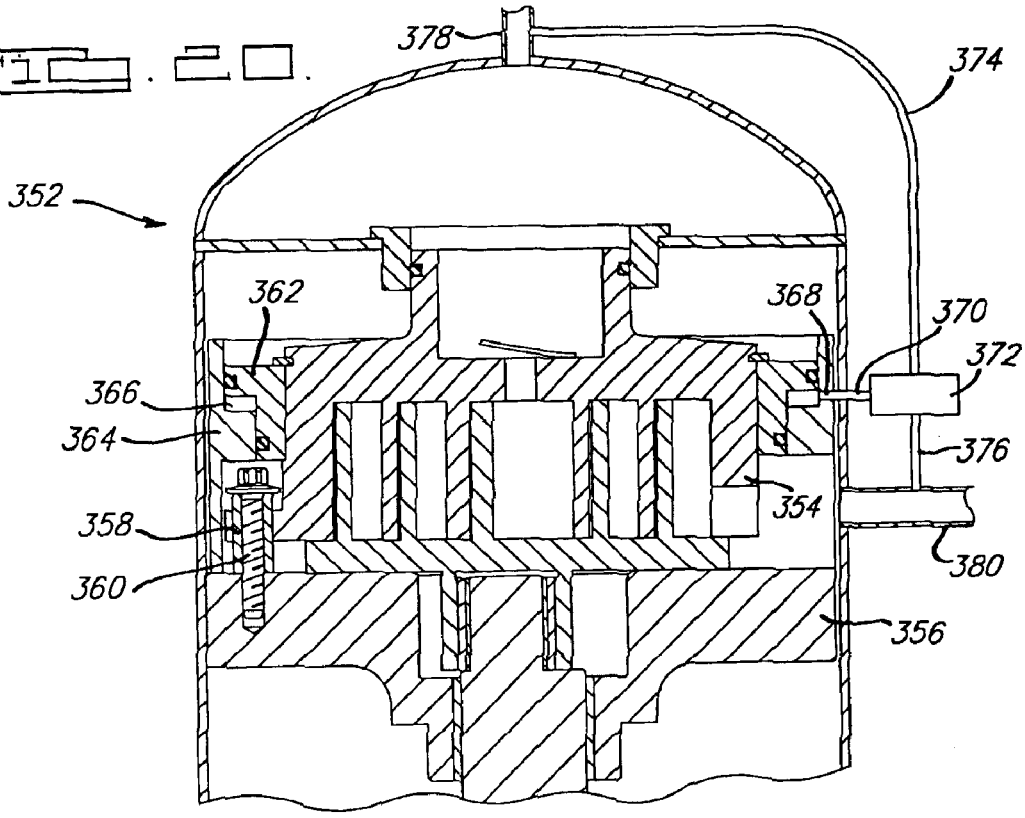

Yet another embodiment is illustrated in FIG. 20 being indicated generally at 352. Compressor 352 includes non-orbiting scroll member 354 which is axially movably secured to main bearing housing 356 by means of a plurality of bushings 358 secured in position by fasteners 360. Bushings 358 and fasteners 360 cooperate to accurately and non-rotatably position non-orbiting scroll 354 while allowing limited axial movement thereof. A separate annular flanged ring 362 is secured to non-orbiting scroll 354 and cooperates with a radially outwardly disposed stationary flanged ring member 364 to define a sealed separating chamber 366 therebetween. Ring member 364 includes a passage 368 to which one end of a fluid line 370 is connected, the other end of which is connected to solenoid valve 372. Similar to that described above, solenoid valve 372 includes fluid lines 374 and 376 connected to discharge line 378 and suction line 380 respectively. The operation of compressor 352 will be substantially identical to that described above with solenoid valve 372 operating to cyclically place chamber 366 in fluid communication with discharge pressure fluid and suction pressure fluid to thereby cyclically load and unload compressor 352.

Figure 21:
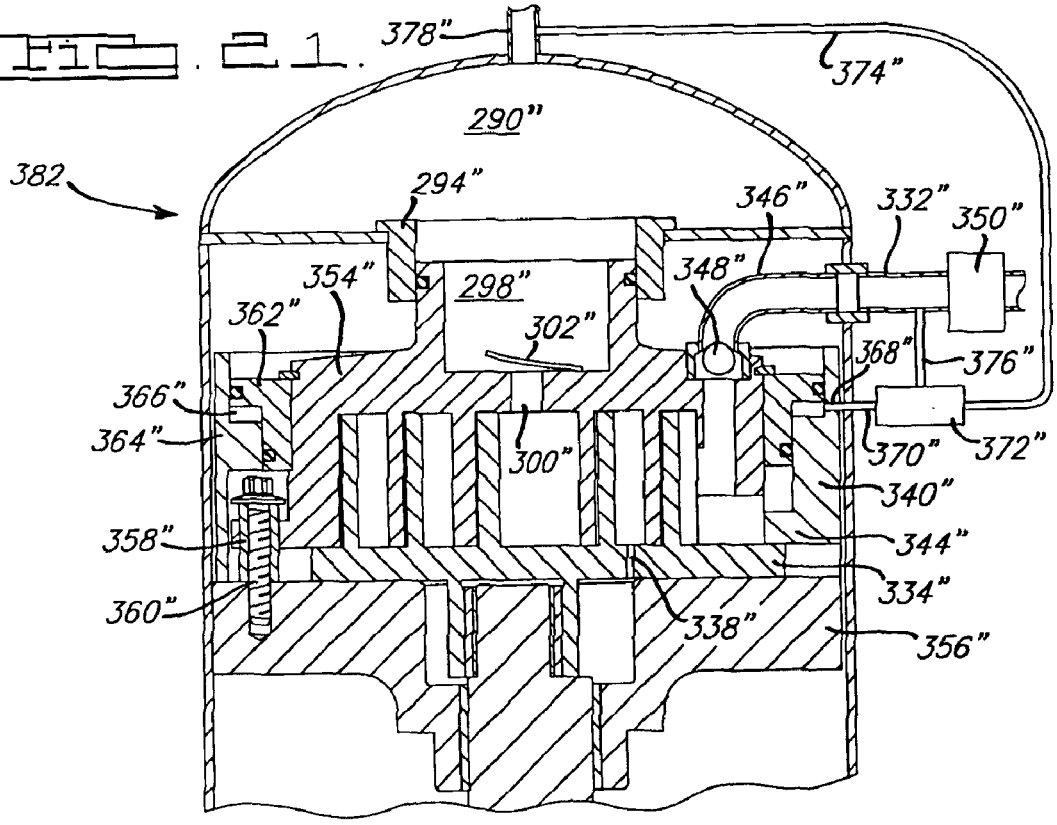

FIG. 21 represents yet a further embodiment 382 of the subject invention. Compressor 382 combines the separating chamber arrangement of compressor 352 with the suction gas supply arrangement and intermediate pressure shell of compressor 336 shown in FIG. 19. Accordingly, corresponding portions thereof are indicated by like numbers double primed and the operation thereof will be substantially the same as described above.

Figure 22:
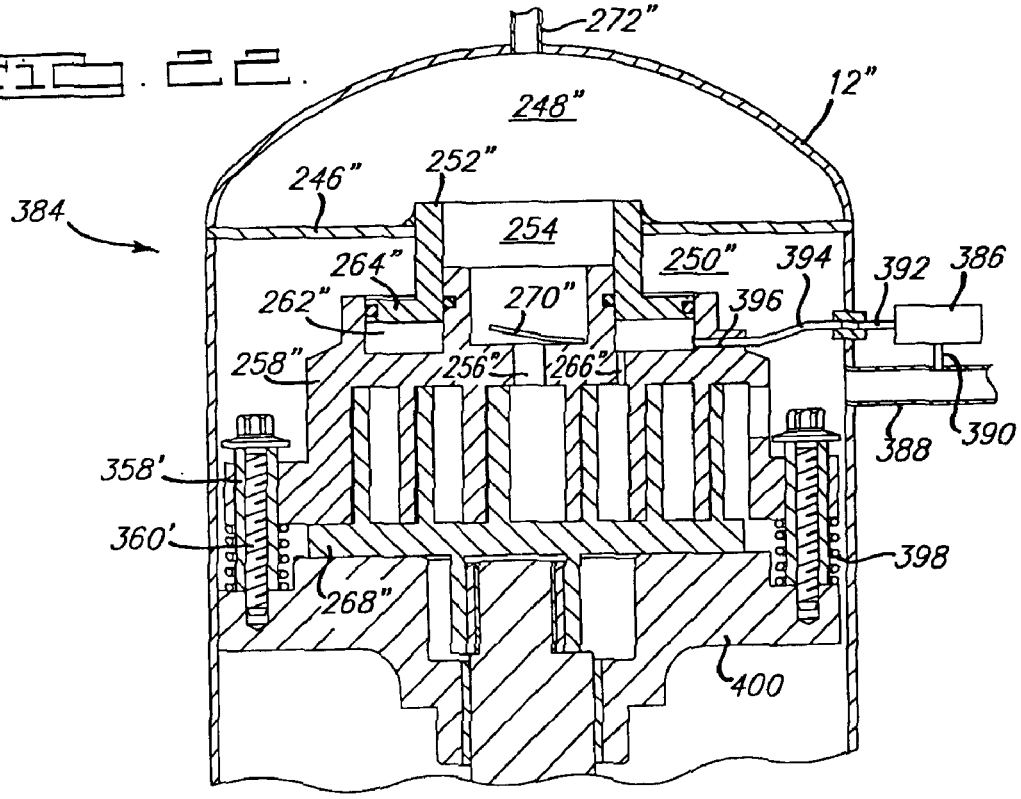

FIG. 22 shows a further modification of the present invention. Compressor 384 is substantially the same as that shown in FIG. 16 with the exception that compressor 384 includes a two way solenoid valve 386 connected to suction line 388 via fluid conduit 390, a modified passage arrangement as described below and omits cover member 269 defining upper chamber 260. Accordingly, portions corresponding to like portions of compressor 244 are indicated by like numbers double primed. Additionally, the mounting arrangement for axially movable non-orbiting scroll 258" is substantially identical to that described with reference to FIG. 20 and hence corresponding portions thereof are indicated by like numbers primed. In this embodiment solenoid valve is also connected to chamber 262" via first fluid line 392, a second internal flexible fluid line 394 and radially extending passage 396 provided in non-orbiting scroll 258". Additionally, a plurality of separating strings 398 are provided being positioned coaxially with bushings 358' and extending between main bearing housing 400 and the lower surface of non-orbiting scroll 258".

Under normal fully loaded operation, non-orbiting scroll 258" will be biased into sealing engagement with orbiting scroll 268" by the combined force resulting from discharge pressure acting on the upper surface of non-orbiting scroll 258" within passage 254" and intermediate pressure fluid within chamber 262" conducted thereto via passage 266". Under these conditions solenoid valve 386 will be in a closed position thereby preventing fluid communication between chamber 262" and suction line 388. When sensed system conditions indicate it is desired to unload compressor 384, solenoid valve 386 will open to thereby vent chamber 262" to suction line 388 via passage 396, and fluid lines 394, 392 and 390 thereby relieving the intermediate biasing force on non-orbiting scroll 258". As this biasing force is relieved, the combined force from the fluid under compression between the scroll members and the force exerted by springs 398 will operate to move non-orbiting scroll 258" axially away from and out of sealing engagement with orbiting scroll 268" thereby unloading compressor 384. Of course, passageway 396, fluid lines 394, 392 and 390, and solenoid valve 386 must all be sized relative to the size of passage 266" to ensure adequate venting of chamber 262". Cyclical unloading and loading of compressor 384 will be accomplished in substantially the same manner in response to system conditions as described above.

The present invention is also well suited for application to dual rotating scroll-type compressors. Such embodiments are illustrated in FIGS. 23 through 28.

Figure 23:
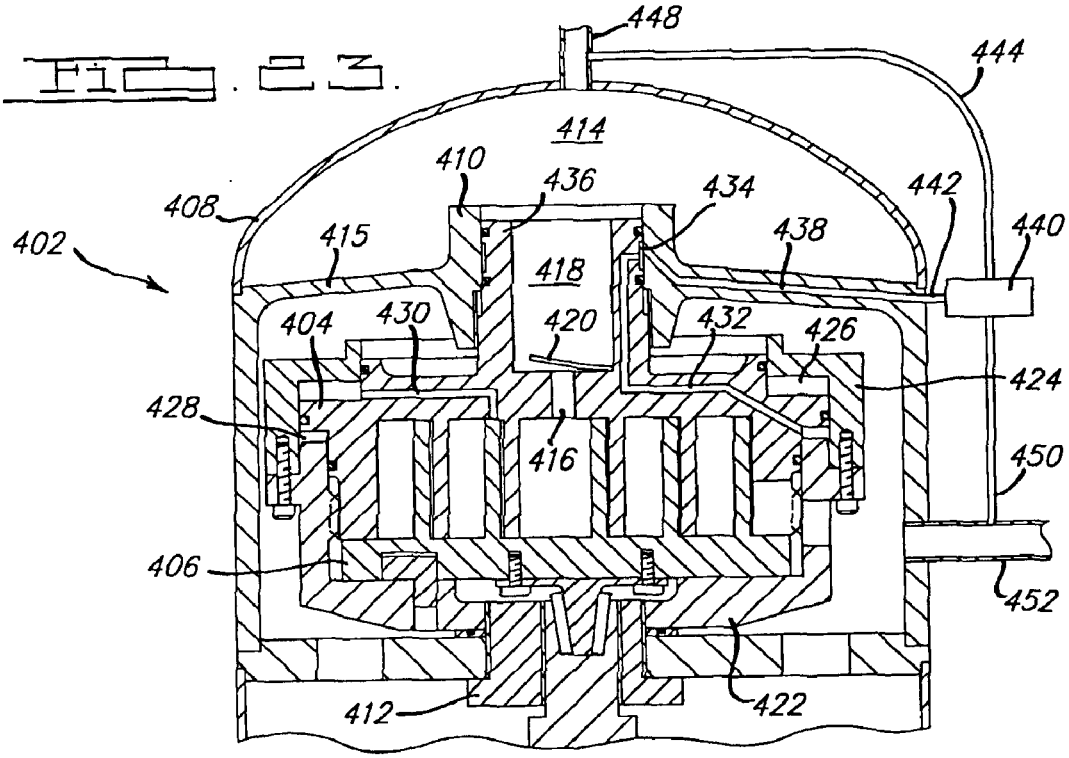
FIGS. 23 through 28 are all fragmentary section views of refrigeration compressors in accordance with the present invention in which the scroll members are co-rotating.

Referring first to FIG. 23, a dual rotating scroll-type compressor is shown being indicated generally at 402. Compressor 402 includes first and second scroll members 404, 406 rotatably supported within an outer shell 408 by upper and lower bearing members 410, 412, axially offset from each other. Upper bearing member 410 is formed in a plate member 415 which also serves to define a discharge chamber 414 into which compressed fluid exiting discharge port 416 in upper scroll 404 is directed via passage 418. A discharge check valve 420 is also provided overlying discharge port 416. Lower scroll member 406 is supported within and rotatable with a lower housing 422. An upper housing 424 surrounds upper scroll member 404, is secured to lower housing 422 and cooperates with lower housing 422 and upper scroll member 404 to define an intermediate pressure biasing chamber 426 and a separating chamber 428. A fluid passage 430 is provided in upper scroll member 404 extending from a compression pocket at intermediate pressure to biasing chamber 426 to supply fluid pressure thereto which in combination with discharge pressure fluid acting on upper scroll member 404 within passage 418 will serve to bias upper scroll 404 into sealing engagement with lower scroll member 402 during fully loaded operation.

A second passage 432 is also provided in upper scroll member 404 extending from separating chamber 428 to an annular recess 434 formed in the outer periphery of an upper cylindrical hub portion 436 of upper scroll 404. Annular recess 434 is in fluid communication with a passage 438 provided in bearing 410 and extending radially outwardly through plate 415.

A solenoid valve 440 is also provided the operation of which is designed to be controlled by a control module (not shown) in response to system conditions sensed by appropriate sensors (also not shown). Solenoid valve 440 includes a first fluid conduit 442 connected to passage 438, a second fluid line 444 connected to discharge line 448 and a third fluid line 450 connected to suction line 452.

When compressor 402 is operating under fully loaded conditions, solenoid valve 440 will be in a position to place separating chamber 428 in fluid communication with suction line 452 via passage 432, recess 434, passage 438 and fluid lines 442 and 450. In order to unload compressor 402, solenoid valve will operate to connect chamber 428 to discharge line 448 thereby pressurizing same to discharge pressure. The force resulting from discharge pressure fluid in chamber 428 will operate to move scroll member 404 axially away from and out of sealing engagement with scroll member 402 thereby unloading the compressor. Cyclic operation of solenoid valve will result in cyclic unloading of compressor 402 in substantially the same manner as discussed above.

Figure 24:
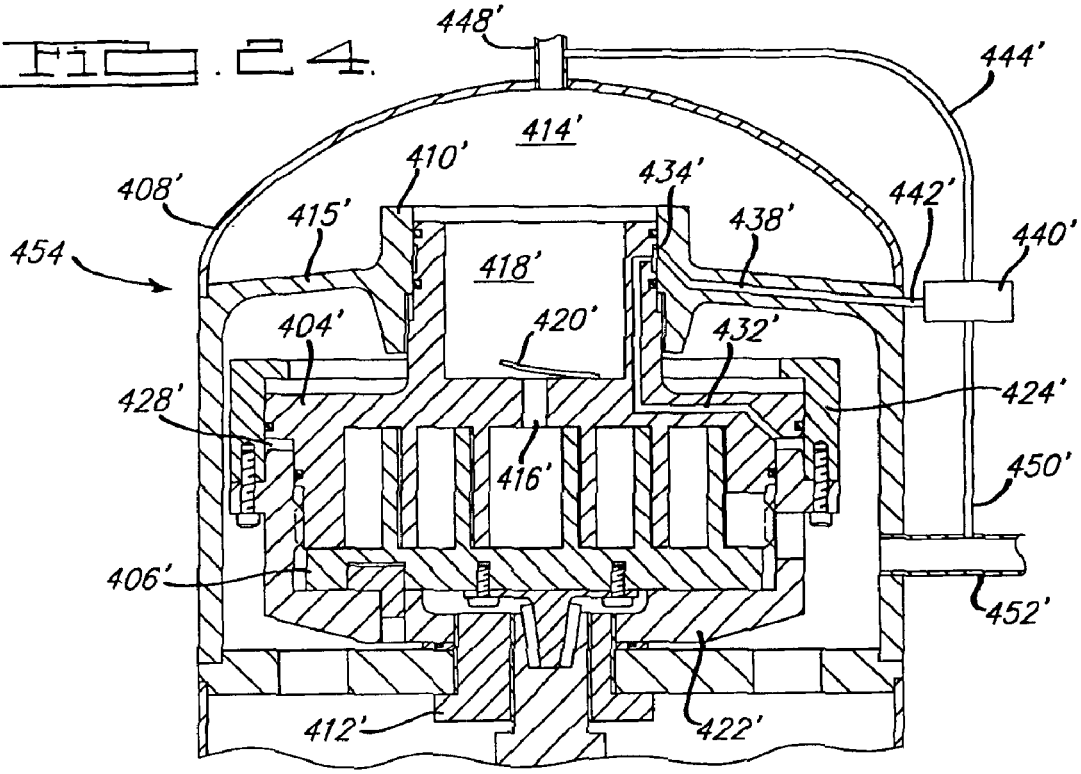

FIG. 24 illustrates another embodiment of a dual rotating scroll-type compressor 454 in accordance with the present invention. Compressor 454 is substantially identical in construction and operation to compressor 402 with the exception that compressor 454 does not incorporate an intermediate pressure biasing chamber but rather utilizes only discharge pressure to bias the upper axially movable scroll member into sealing engagement with the lower scroll member. Accordingly, corresponding portions thereof are indicated by the same reference numbers primed.

Figure 25:
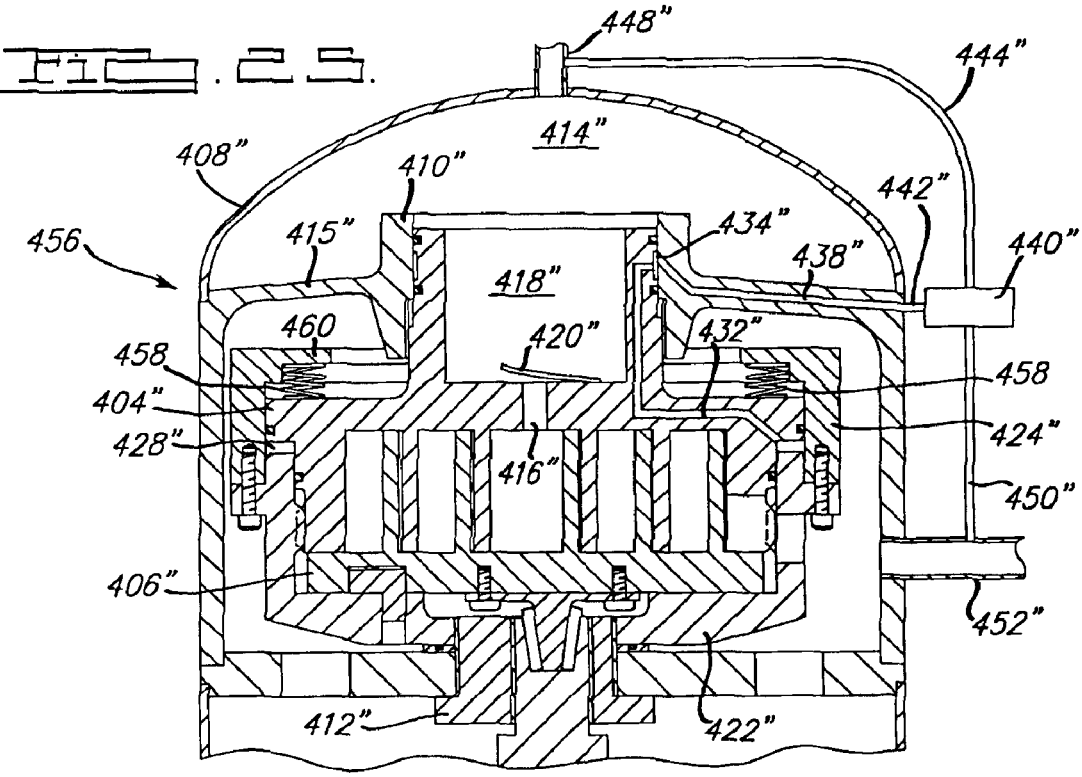

A further embodiment of a dual rotating scroll-type compressor 456 is shown in FIG. 25. Compressor 456 is substantially identical to compressors 402 and 454 with the exception that in place of the intermediate pressure biasing chamber provided in compressor 402, compressor 456 employs a plurality of springs 458 extending between a radially inwardly extending portion 460 of upper housing 424" and an upper surface of upper scroll member 404". Accordingly, portions corresponding to like portions of compressor 402 are indicated by the same reference numbers double primed. Springs 458 serve to cooperate with the discharge pressure in passage 418" to bias upper scroll member 404" axially into sealing engagement with lower scroll member 402". In all other respects the operation of compressor 456 is substantially identical to that described above.

Figure 26:
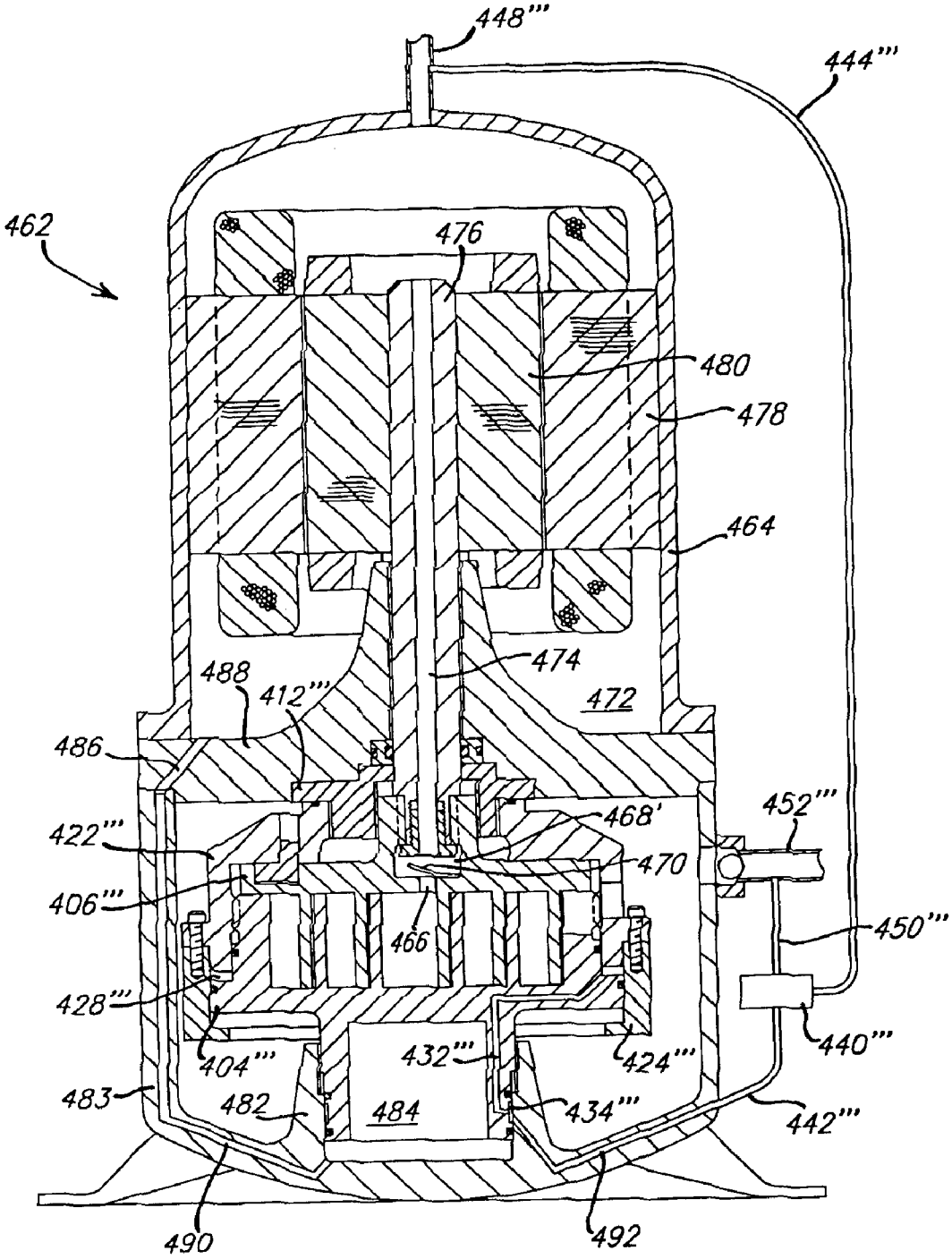

FIG. 26 shows a further embodiment of a dual rotating scroll-type compressor 462. Compressor 462 is very similar to compressors 402, 454, and 456 except as noted below and accordingly, like portions thereof are indicated by the same reference numbers triple primed.

Compressor 462 as shown is mounted in the bottom portion of a hermetic shell 464 and in an inverted position as compared to compressors 402, 454 and 456. A discharge port 466 is provided in scroll member 406'" and serves to discharge compressed fluid to a chamber 468 via check valve 470 from which it is directed to the motor compartment 472 disposed in the upper portion of shell 464 via a passage 474 extending through drive shaft 476. A driving motor is provided in motor compartment 472 and includes a stator 478 and rotor 480 secured to crankshaft 476. Axially movable scroll member 404'" is rotatably supported in a cylindrical bearing housing 482 formed in the lower end portion 483 of housing 464 and cooperates therewith to define a discharge pressure biasing chamber 484. In order to supply discharge pressure fluid to chamber 484, a passage 486 is provided in main bearing housing 488 which is connected to a second passage 490 in lower housing portion 483. Passage 490 opens into chamber 484 and thus conducts high pressure discharge fluid from motor compartment 472 to chamber 484 to bias scroll member 404''' into sealing engagement with scroll member 406''' during normal full load operation. A second passage 432 extends through lower housing portion 483 from recess 434'' to fluid conduit 442'''. It should be noted that chamber 484 could alternatively be pressurized with intermediate pressure fluid by providing a passage through the end plate of scroll 404''' from a compression pocket at a pressure between suction and discharge to chamber 484 thus eliminating the need for passages 486 and 490. Alternatively, discharge pressure fluid could be provided to chamber 484 by means of a passage through the end plate of scroll 404'' extending thereto from the control pocket into which port 466 opens.

Operation of compressor 462 will be substantially identical to that of compressor 454 including the cyclical loading and unloading thereof in response to actuation of solenoid valve 440''' as controlled by a control module and associated sensors (not shown).

Figure 27:
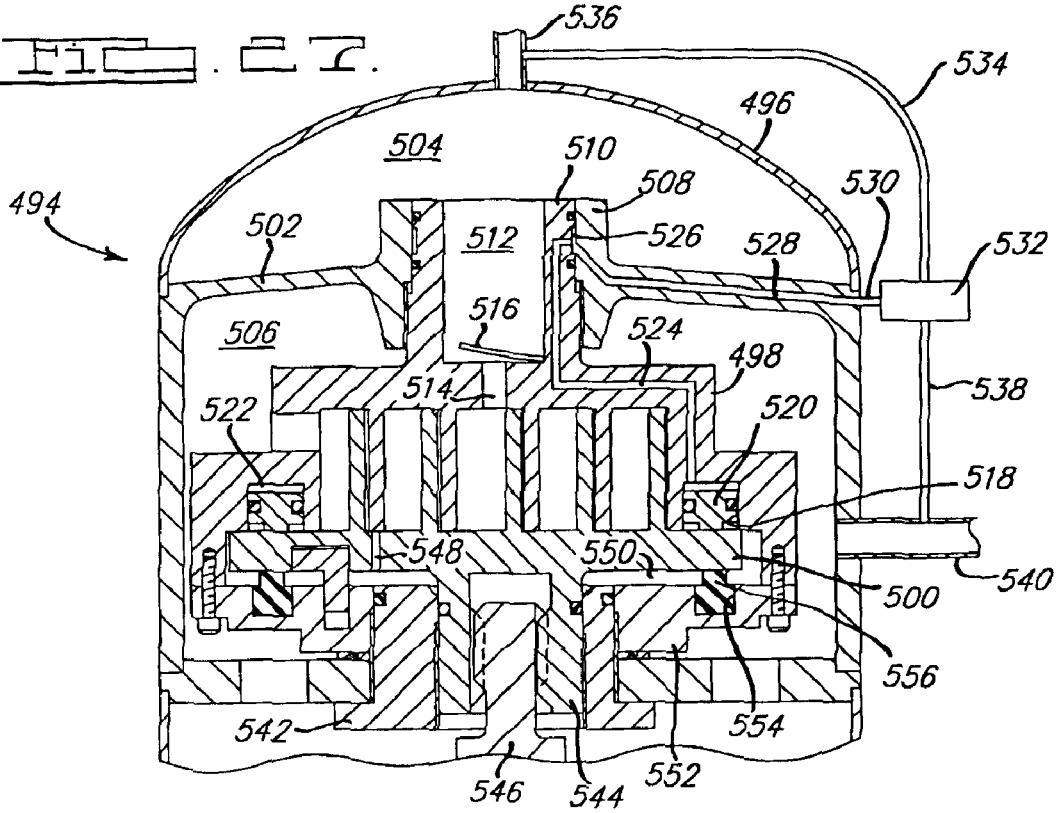

FIG. 27 is directed to another embodiment of a dual rotating scroll-type compressor 494 in which the lower driving scroll member is axially movable. Compressor 494 includes an outer housing 496 within which upper and lower scroll members 498, 500 are rotatably supported. A partition plate 502 is provided which separates the discharge chamber 504 from the lower suction pressure chamber 506 and also includes a cylindrical bearing portion 508 for rotatably supporting upper scroll member 498 by means of cylindrical portion 510, the interior which also defines a discharge fluid flow path 512 from discharge port 514 past discharge check valve 516 to discharge chamber 504. Upper scroll member 498 includes an annular cavity 518 which opens outwardly in facing relationship to lower scroll 500. An annular ring shaped piston member 520 is movably disposed therein and operative to exert a separating force on lower scroll 500 in response to pressurization of the separating chamber 522 disposed above piston member 520. In order to supply discharge pressure fluid to chamber 522, a passage 524 is provided in scroll member 498 extending upwardly from chamber 522 through cylindrical portion 510 and opening radially outwardly therefrom into an annular recess 526. A second passage 528 extends generally radially outwardly through plate 502 and connects to fluid line 530 which in turn is connected to solenoid valve 532. Solenoid valve 532 also has a fluid line 534 extending therefrom to discharge conduit 536 and another fluid line 538 extending therefrom to suction line 540.

Lower scroll member 500 is rotatably supported via lower bearing 542 and includes an internally splined center hub portion 544 adapted to axially movably receive a complementarily splined drive shaft 546. An intermediate pressure bleed passage 548 is formed in the end plate of lower scroll member 500 and serves to conduct biasing pressure fluid from an intermediate pressure compression pocket to a biasing chamber 550 therebelow. A plate member 552 is secured to upper scroll 498 and includes an annular recess 554 in which an annular seal 556 is disposed. Seal 556 engages the lower surface of lower scroll 500 so as to seal chamber 550 from the suction pressure chamber 506.

Under fully loaded operation, lower scroll 500 will be biased axially upwardly into sealing engagement with upper scroll 498 due to the force from intermediate pressure fluid in chamber 550. Under these conditions, solenoid valve will be in a position to place chamber 522 in fluid communication with suction line 540. When system conditions indicate a lower capacity output is desired, solenoid valve will be actuated to a position to place chamber 522 in fluid communication with discharge line 536 thereby pressurizing chamber 522 and effecting an axial downward movement of piston 520. Piston 520 in turn will move lower scroll 500 axially downwardly out of sealing engagement with upper scroll 498. When solenoid valve is cycled back to a position to vent chamber 522 to suction line 540, the biasing force resulting from intermediate pressure in chamber 550 will return lower scroll member 500 to sealing engagement with upper scroll member 498. The cyclic operation between loaded and unloaded operation will then be controlled in like manner similar to that described above by a control module and associated sensors.

Figure 28:
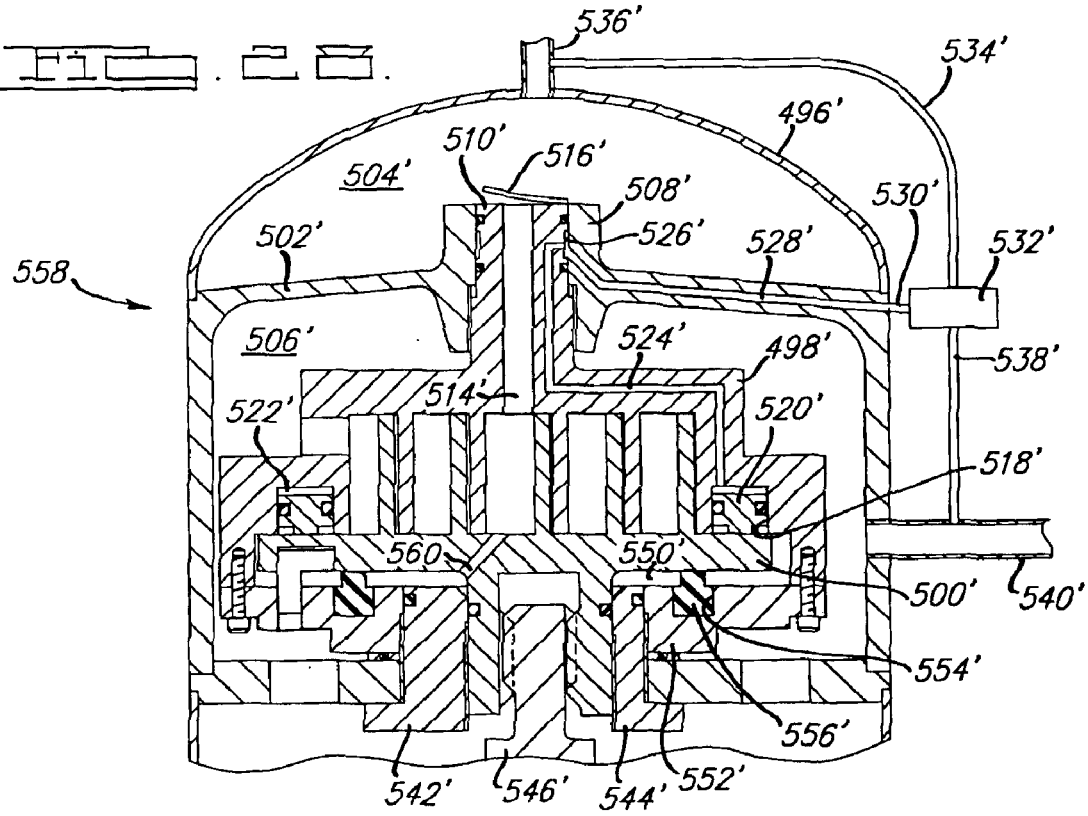

FIG. 28 shows another embodiment of a dual rotating compressor 558 which is substantially the same as that described with reference to FIG. 27 except as noted below. Accordingly, like portions thereof are indicated by the same reference numbers primed. Compressor 558 utilizes discharge pressure fluid supplied to chamber 550' via passage 560 to bias lower scroll member 500' into sealing engagement with upper scroll member 498'. Otherwise the operation of compressor 558 is substantially identical to that described above.

Figure 29:
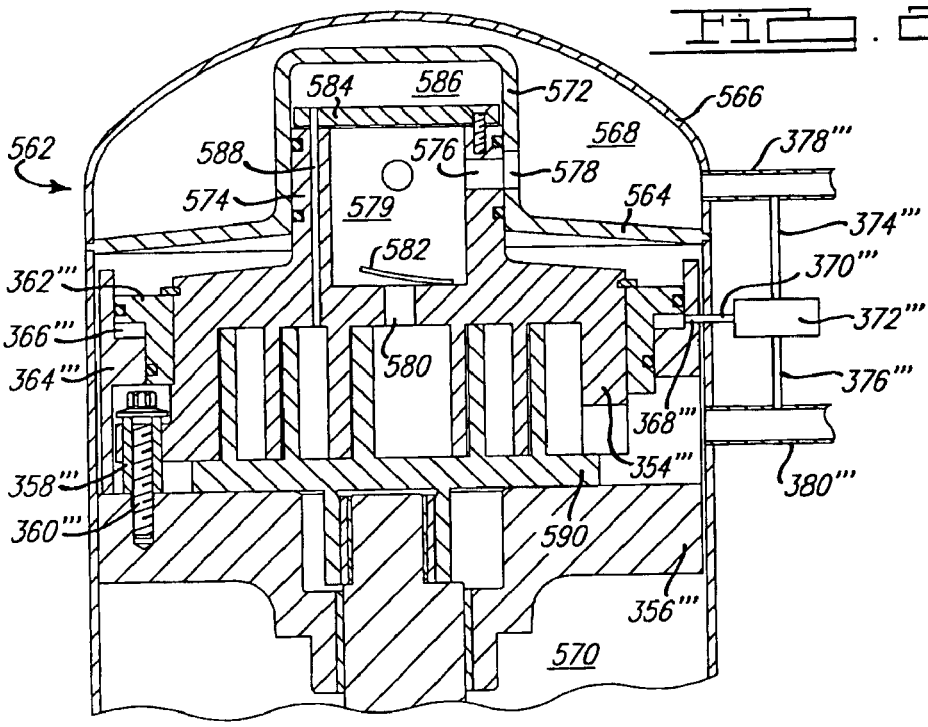
FIGS. 29 through 30 are both fragmentary section views of additional embodiments of refrigeration compressors all in accordance with the present invention in which the non-orbiting scroll member is reciprocated.

Another compressor 562 incorporating a further embodiment of the present invention is shown in FIG. 29. Compressor 562 is similar to compressor 352 shown in FIG. 20 except as noted below and accordingly like portions thereof are indicated by the same reference numbers triple primed. Compressor 562 incorporates a partition plate 564 which forms a part of outer shell 566 and separates the interior thereof into a high pressure discharge chamber 568 and a low pressure suction portion 570. Partition plate 564 includes a central cylindrical portion 572 which is adapted to sealingly movably receive a cylindrical portion 574 of non-orbiting axially movable scroll member 354'''. Cylindrical portion 574 includes a plurality of radial openings 576 which are aligned with openings 578 in portion 572 to define a discharge gas flow path 579 from discharge port 580 past discharge check valve 582 to discharge chamber 568. A cover plate 584 is secured to cylindrical portion 574 to close off the upper end of passage 579 and also cooperates with cylindrical portion 572 to define an intermediate pressure biasing chamber 586 therebetween. A fluid passage 588 extends from a compression pocket at intermediate pressure to chamber 586 and serves to provide fluid pressure for biasing axially movable scroll member 354''' into sealing engagement with orbiting scroll 590. The operation including cyclical loading and unloading of compressor 562 is substantially identical to that described with reference to compressor 352 and the other embodiments described above.

Figure 30:
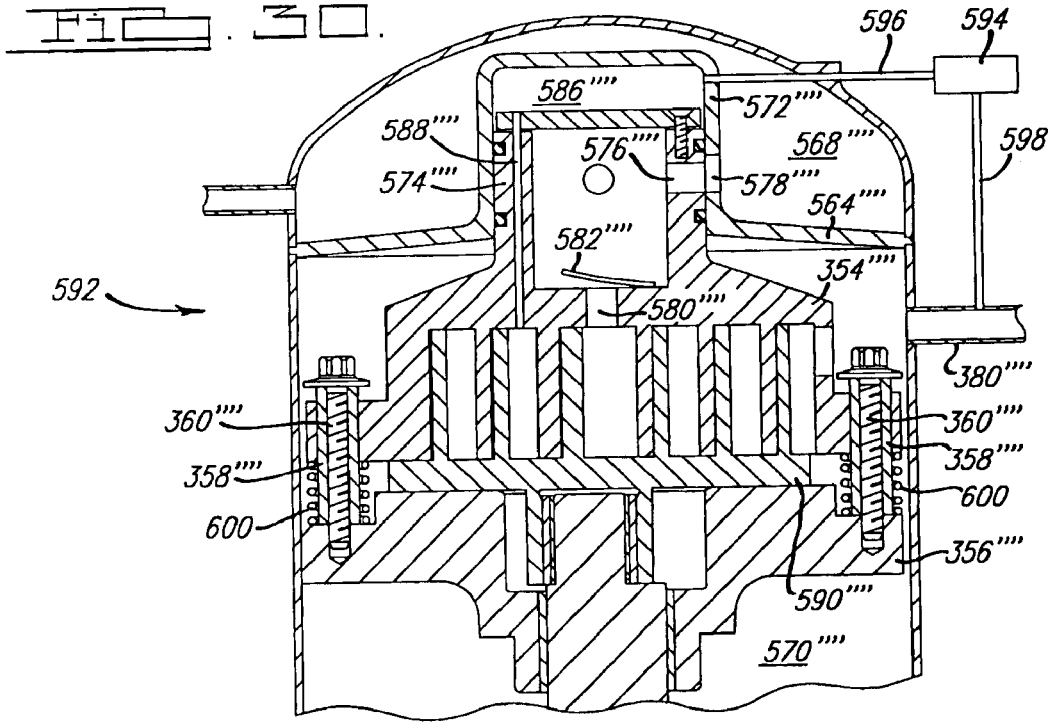

FIG. 30 illustrates a compressor 592 incorporating a further modification of the present invention. Compressor 592 is substantially identical to compressor 562 of FIG. 29 except as noted below and accordingly like portions thereof are indicated by the same reference numbers quadruple primed. Compressor 592 incorporates a two way solenoid valve 594 having a fluid line 596 connected to chamber 586'''' and a second fluid line 598 connected to suction line 380''''. Additionally, member 362''' and 364''' are omitted and in lieu thereof biasing springs 600 are provided being positioned in coaxial surrounding relationship to bushings 358''''.

Under fully loaded operating conditions, the biasing force resulting from intermediate fluid pressure in chamber 586'''' will bias axially movable non-orbiting scroll 354"" downwardly into sealing engagement with orbiting scroll 590"" in the same manner as discussed above and will overcome the separating force resulting from springs 600. When conditions indicate unloading is desired, solenoid valve 594 will switch from a closed condition (which prevented venting of chamber 586"" to suction during fully loaded operation) to an open position thereby venting chamber 586"" to suction line 380"" and relieving the biasing force exerted on scroll 354"". As this biasing force is relieved, the force from springs 600 together with the pressure of the fluid under compression will operate to move axially movable scroll member 354"" upwardly out of sealing engagement with orbiting scroll 590"". As before, solenoid valve 594 will be operated in a cyclic manner by control means in response to associated sensors to cyclically load and unload compressor 592 so as to achieve the desired degree of capacity modulation.

While the previous embodiments have been primarily directed to hermetic motor compressors, the present invention is also well suited for use with compressors employing an external drive such as for example automotive air conditioning system compressors. The use of the present invention in such an environment can eliminate the need for the expensive clutch systems commonly utilized in today's systems.

Figure 31:
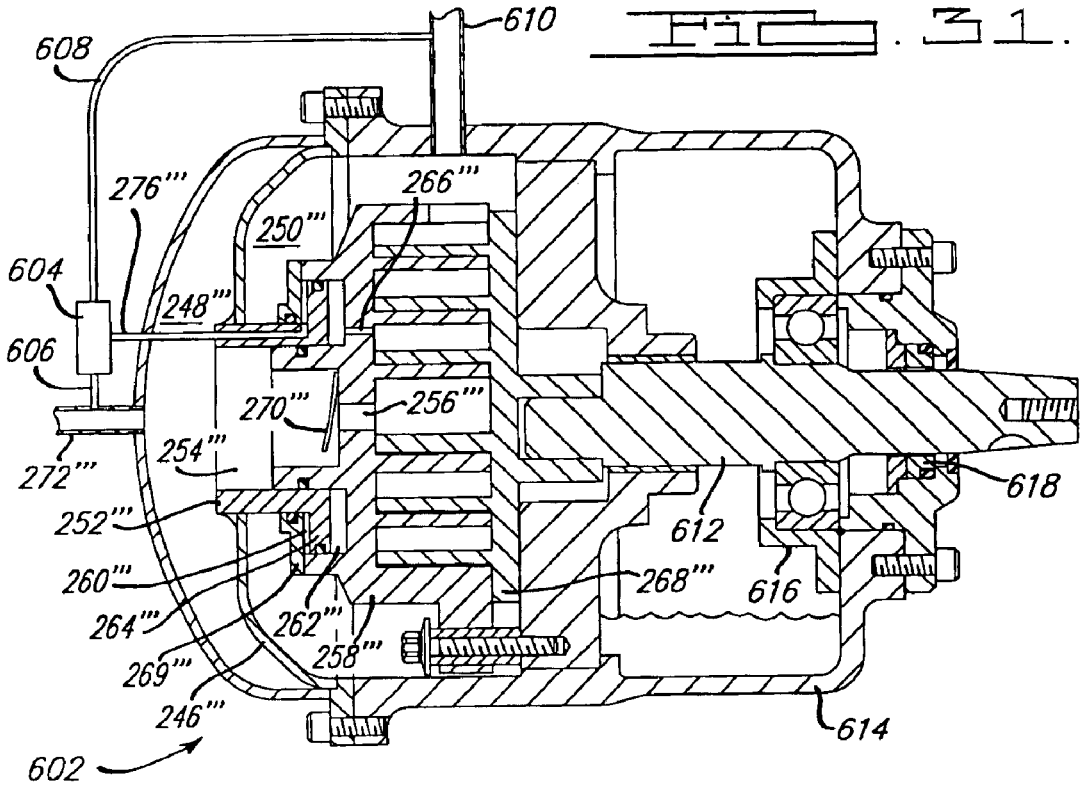
FIG. 31 is a section view of yet another embodiment of a scroll-type compressor in accordance with the present invention adapted to be driven by an external power source.

FIG. 31 illustrates a compressor 602 which is specifically directed for use with an external power source. Compressor 602 is similar in construction to compressor 244 of FIG. 16 except as noted below and accordingly like portions thereof are indicated by the same reference numbers triple primed.

Compressor 602 incorporates a three way solenoid valve 604 as opposed to the two way solenoid valve of compressor 244 and hence includes fluid lines 606 connected to discharge line 272''' and a second fluid line 608 connected to suction line 610. It should be noted that a two way solenoid valve could be used in the same arrangement if desired. Because solenoid valve 604 is designed to directly vent upper chamber 260''' to suction line 610 during unloading, continuously open vent passage 280 provided in compressor 244 is omitted. Drive shaft 612 of compressor 602 extends outwardly of housing 614 through suitable bearing means 616 and sealing means 618 and is adapted to be connected to a suitable external power source such as an automobile engine via a conventional pulley and V-belt arrangement or the like.

In operation, the external power source will continuously drive drive shaft 612 thereby effecting continuous orbital movement of orbiting scroll 268'''. When system conditions indicate cooling is required, solenoid valve 604 will be positioned by suitable control means to place chamber 260''' in fluid communication with suction line 610 thereby relieving any separating force resulting therefrom and enabling chamber 262''' which is supplied with intermediate pressure fluid via passage 266''' to generate a biasing force which, with the biasing force resulting from discharge pressure fluid acting on the surface of non-orbiting scroll member 258''' in passage 254''', will bias non-orbiting scroll member 258''' into sealing engagement with orbiting scroll member 268'''. When system requirements have been met, compressor 602 will be unloaded by actuation of solenoid valve 604 to a position in which chamber 260''' is placed in fluid communication with discharge line 272''' thereby resulting in the creation of a separating force which will operate to move non-orbiting scroll member axially out of sealing engagement with orbiting scroll member 268'''. Cyclic control of compressor 602 may be achieved in the same manner as described above thus eliminating the need for a clutch when such a system is utilized in an automotive application.

While the previous embodiments have all been directed to the use of the fluid being compressed to effect unloading of the respective compressors, the present invention may also accomplish such unloading by the use of other types of force generating means to effect axial movement of one or the other of the two scroll members. Embodiments illustrating such arrangements are shown and will be described with reference to FIGS. 32 through 34.

Figure 32:
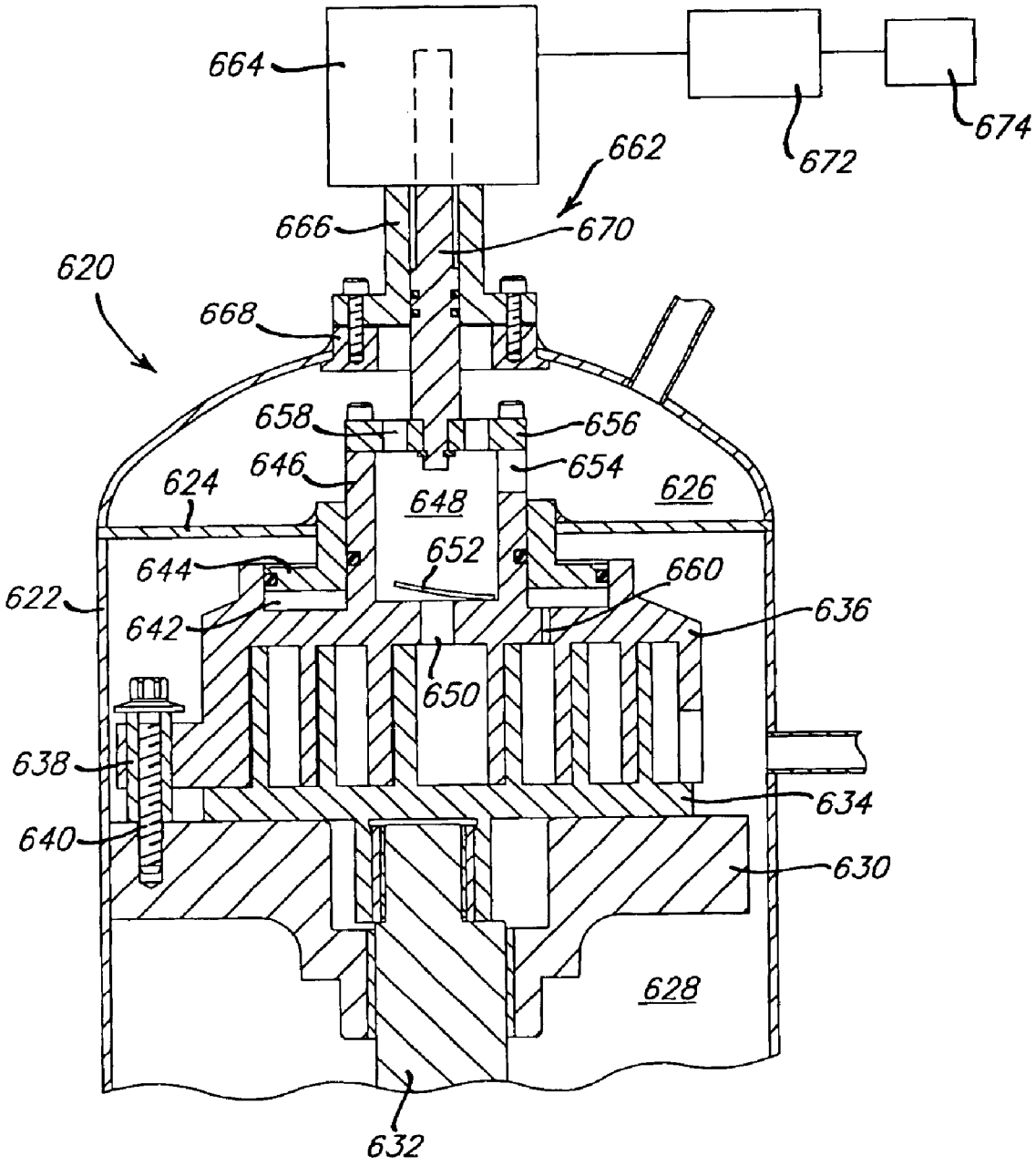
FIGS. 32 through 34 are fragmentary section views of additional embodiments of scroll-type compressors in accordance with the present invention.

Referring first to FIG. 32, there is shown a hermetic compressor 620 which includes a housing 622 having a plate 624 operative to separate the interior thereof into a discharge chamber 626 and a lower portion 628 at suction pressure. A bearing housing 630 is secured within shell 622 and rotatably supports a crankshaft 632 which is drivenly connected to orbiting scroll member 634. A non-orbiting axially movable scroll member 636 is mounted on bearing housing 630 by means of bushings 638 and fasteners 640 such that scroll member 636 is slidably movable along bushings 638 but is restrained from circumferential or radial movement. Non-orbiting scroll member 636 includes a pressure biasing chamber 642 in the upper surface into which one end of ring shaped flanged member 644 projects. The other end of flanged member 644 is secured to plate 624. A cylindrical portion 646 of non-orbiting scroll member 636 projects upwardly through ring shaped flanged member 644 into discharge chamber 626 to define a discharge passage 648 extending upwardly from discharge port 650 via discharge check valve 652. A plurality of circumferentially spaced radial openings 654 are provided adjacent the upper end of portion 646 to place passage 648 in fluid communication with discharge chamber 626. A cover plate 656 is secured to the upper end of portion 646 and also includes openings 658 therein to allow passage of discharge fluid into discharge chamber 626. Non-orbiting scroll member 636 also includes a passage 660 extending from a compression pocket at intermediate pressure to biasing chamber 642 whereby intermediate pressure fluid may be supplied to chamber 642 to axially bias non-orbiting scroll member 636 into sealing engagement with orbiting scroll 634 during normal fully loaded operation. Of course, this intermediate pressure biasing force will be aided by discharge pressure acting against the upper surfaces of non-orbiting scroll 636.

In this embodiment, an unloading mechanism 662 is provided which includes a suitable force applying actuator 664 supported on a cylindrical flanged support member 666 which in turn is sealingly secured to a fitting 668 provided on the top of shell 622. An actuator shaft 670 extends downwardly through member 666 and fitting 668 and has its lower end connected to cover plate 656. Actuator 664 may be any suitable type force applying capable of exerting a pulling force on non-orbiting scroll 636 such as for example an electrically actuated solenoid, a pneumatic or other fluid actuated piston and cylinder device or any other type of mechanical, magnetic, electromechanical, hydraulic, pneumatic, gas or spring type device. Operation of actuator will be controlled by a suitable control module 672 in response to sensed system conditions sensed by appropriate sensor 674.

As noted above, under fully loaded operating conditions, intermediate pressure fluid in chamber 642 will cooperate with discharge pressure fluid in passage 648 to bias non-orbiting scroll member 636 into sealing engagement with orbiting scroll member 634. When system conditions indicate unloading is desired, control module 672 will effect operation of actuator 644 to exert a separating force on non-orbiting scroll member 636 thereby moving it out of sealing engagement with orbiting scroll member. When fully loaded operation is to be resumed, actuator 664 will be deactuated thereby enabling the biasing force from intermediate pressure chamber 642 and discharge pressure in passage 648 to again move non-orbiting scroll member 636 into sealing engagement with orbiting scroll member 634. Actuator 664 will be designed to enable rapid cyclic operation so as to enable cyclical loading and unloading of compressor 620 in the same manner as described above.

Figure 33:
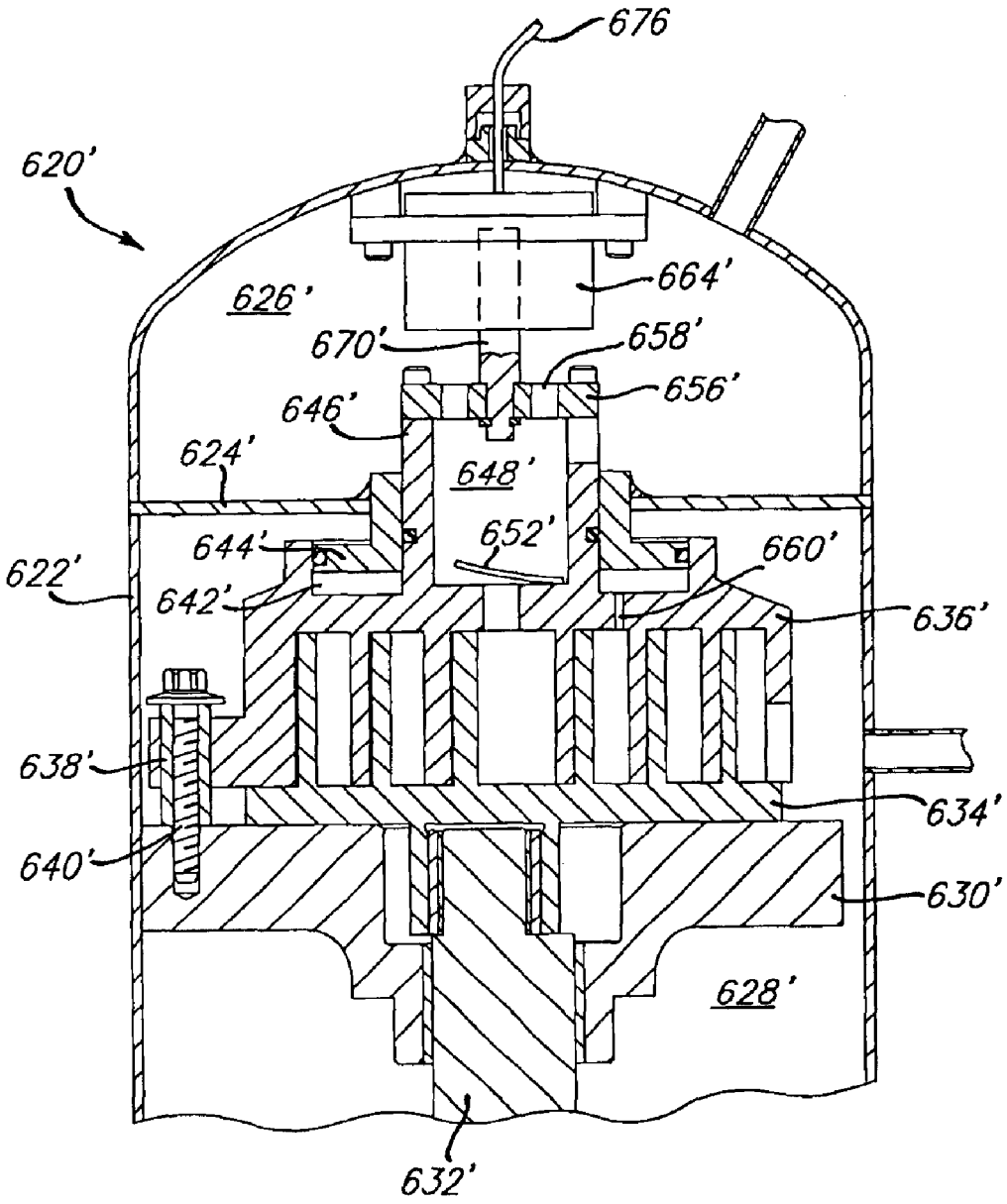

FIG. 33 shows a modified version of the embodiment of FIG. 32 wherein like portions are indicated by the same reference numbers primed. In this embodiment, actuator 664' is located, within housing 622' with actuating connections 676 extending outwardly therefrom. In all other respects, compressor 620' will operate in the same manner as that described above with reference to FIG. 32.

Figure 34:
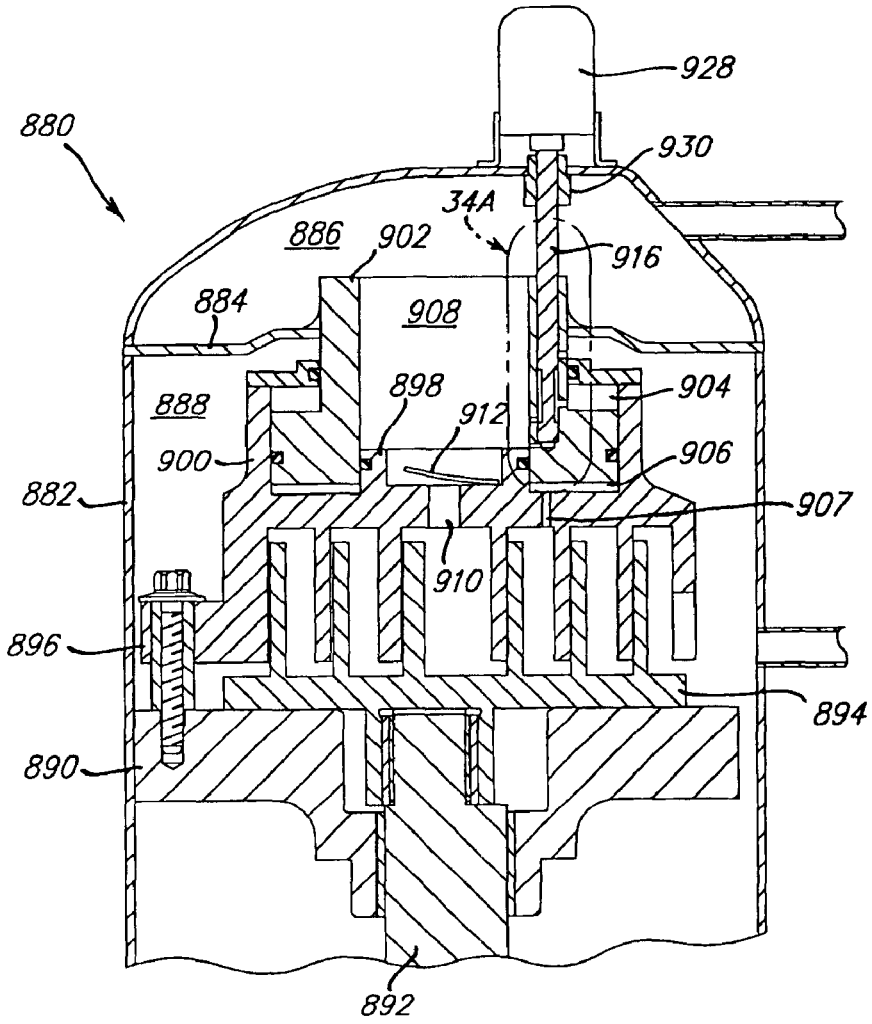

Referring now to FIG. 34, there is shown a hermetic compressor 880 which combines certain features employed in the compressors of FIGS. 4 and 33. Compressor 880 includes an outer shell 882 having a plate 884 which separates the interior thereof into an upper discharge chamber 886 and a lower chamber 888 at suction pressure. A main bearing housing 890 is disposed in lower chamber 888 and serves to rotatably support a drive shaft 892 which is drivenly connected to an orbiting scroll member 894 also supported on main bearing housing 890. A non-orbiting scroll member 896 is axially movably secured to main bearing housing 890 and includes a cavity at the upper end thereof defined by radially inner and outer cylindrical projections 898, 900 respectively. A flanged cylindrically shaped member 902 is sealingly secured to plate 884 and extends downwardly between and movably sealingly engages projections 898 and 900 to divide the cavity into an upper separating chamber 904 and a lower intermediate pressure biasing chamber 906. A passage 907 in non-orbiting scroll 896 operates to place biasing chamber 906 in fluid communication with a fluid pocket undergoing compression and at a pressure intermediate suction and discharge. The interior of member 902 cooperates with projection 898 to define a discharge gas flowpath 908 extending from discharge port 910 to discharge chamber 886 via discharge check valve 912.

Figure 34A:
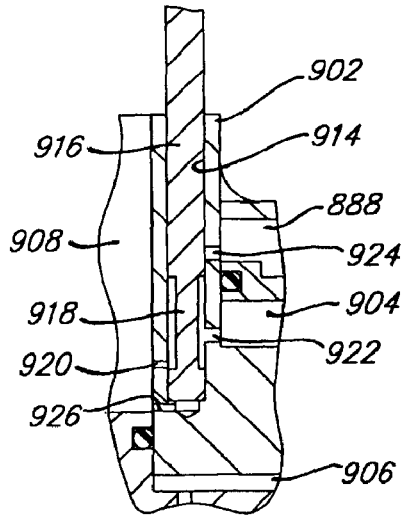
FIG. 34A is an enlarged fragmentary view of the valving arrangement shown in FIG. 34 and enclosed within circle 34A.

As best seen with reference to FIG. 34A, an axially extending bore 914 is provided in member 902 within which a valve member 916 is axially movably disposed. Valve member 916 includes a reduced diameter portion 918 adjacent the lower end thereof which, when valve member is in a first position, operates to place separating chamber 904 in fluid communication with discharge pressure fluid in passage 908 via radially extending passages 920 and 922 and when in a second position, to place separating chamber 904 in fluid communication with suction pressure fluid in area 888 via radially extending passages 922 and 924. Additionally, a radial vent passage 926 extends outwardly from the bottom of bore 914 to discharge passage 908 to facilitate movement of valve member 916 therein.

As shown, valve member 916 extends axially upwardly through discharge chamber 886 and outwardly through shell 882 and is coupled to a suitable actuator 928 secured to shell 882 and which operates to move it between the first and second positions noted above. A fitting 930 surrounds valve member 916 as it passes through shell 882 and contains suitable seals to prevent fluid leakage from discharge chamber 886. Actuator 928 may be any suitable device having the ability to reciprocate valve member 916 between the noted first and second positions including, for example, a solenoid or any other electrical, electromechanical, mechanical, pneumatic or hydraulically actuated device. It should also be noted that actuator may, if desired, be mounted within the interior of shell 882.

Under full load operation, intermediate fluid pressure in biasing chamber 906 in cooperation with discharge pressure acting against the surface of non-orbiting scroll member 896 in passage 908 will bias non-orbiting scroll member 896 axially into sealing engagement with orbiting scroll 894. At this time, valve member 916 will be in a position to place separating chamber 904 in fluid communication with area 888 at suction pressure via passage 922 and 924. In order to unload compressor 880, actuator 928 will operate to move valve member 916 to a position in which it places separating chamber 904 in fluid communication with discharge pressure fluid in passage 908 via passages 920 and 922 thereby pressurizing chamber 904. The force resulting from pressurization of chamber 904 will move non-orbiting scroll out of sealing engagement with orbiting scroll member 894 to thereby unload compressor 880. In order to reload compressor 880, actuator 928 operates to enable valve 916 to move back to its initial position in which the discharge pressure in chamber 904 will be vented to area 888 which is at suction pressure via passages 922 and 924 thereby enabling intermediate pressure in chamber 906 and discharge pressure fluid in passage 908 to move non-orbiting scroll back into sealing engagement with orbiting scroll 894. Cyclical time pulsed actuation of actuator 928 will thus enable the capacity of compressor 880 to be modulated in substantially the same manner as described above.

Figure 35:
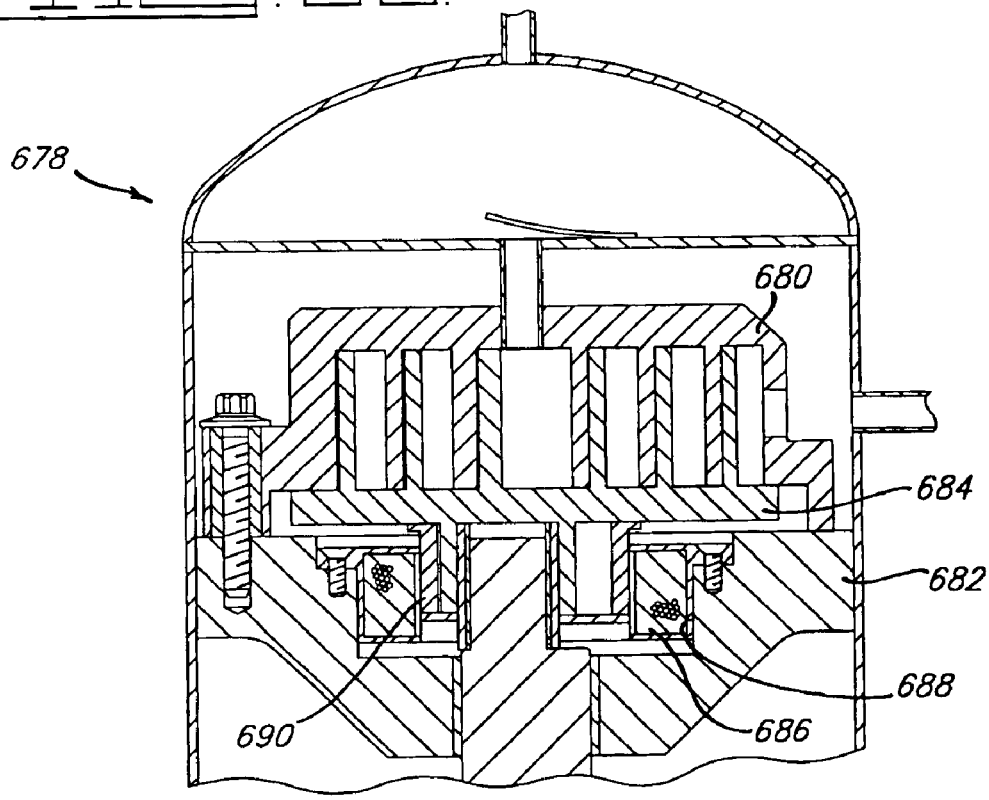
FIG. 35 is a fragmentary section view of a further embodiment of a scroll-type compressor in accordance with the present invention.

FIG. 35 shows a further variation of the embodiments shown in FIGS. 32 and 33. In this embodiment, compressor 678 includes a non-orbiting scroll 680 which is fixedly mounted to bearing housing 682 and orbiting scroll member 684 is designed to be axially movable. Compressor 678 includes a suitable force applying means 686 in the form of an annular electromagnetic coil secured to bearing housing 682 in a well 688 provided therein in underlying relationship to orbiting scroll member 684. A suitable magnetically responsive member 690 is positioned within force applying means 686 and bears against the undersurface of orbiting scroll member 684. In this embodiment, actuation of force applying means 686 operates to exert an axially upwardly directed force on orbiting scroll member 684 thereby urging it into sealing engagement with non-orbiting scroll member 680. Unloading of compressor 678 is accomplished by deactuating force applying means 686 thus relieving the biasing force generating thereby and allowing the separating force from the fluid under compression to move orbiting scroll member 684 out of sealing engagement with orbiting scroll member 680. Cyclic time pulsed loading and unloading may be easily accomplished by controlling force applying means 686 in substantially the same manner as described above.

It should be noted that while compressor 678 has been described utilizing an electromagnetic force applying means, other suitable force applying means may be substituted therefor including mechanical, magnetic, electromechanical, hydraulic, pneumatic, gas or mechanical spring type devices.

The prior embodiments of the present invention have all been directed to various means for effecting unloading by axial separation of the respective scroll members. However, the present invention also contemplates accomplishing unloading by radial separation of the flank surfaces of the scroll wraps thereby providing a leakage path between the compression pockets. Embodiments illustrating this method of unloading are shown and will be described with reference to FIGS. 36 through 44.

Figure 36:
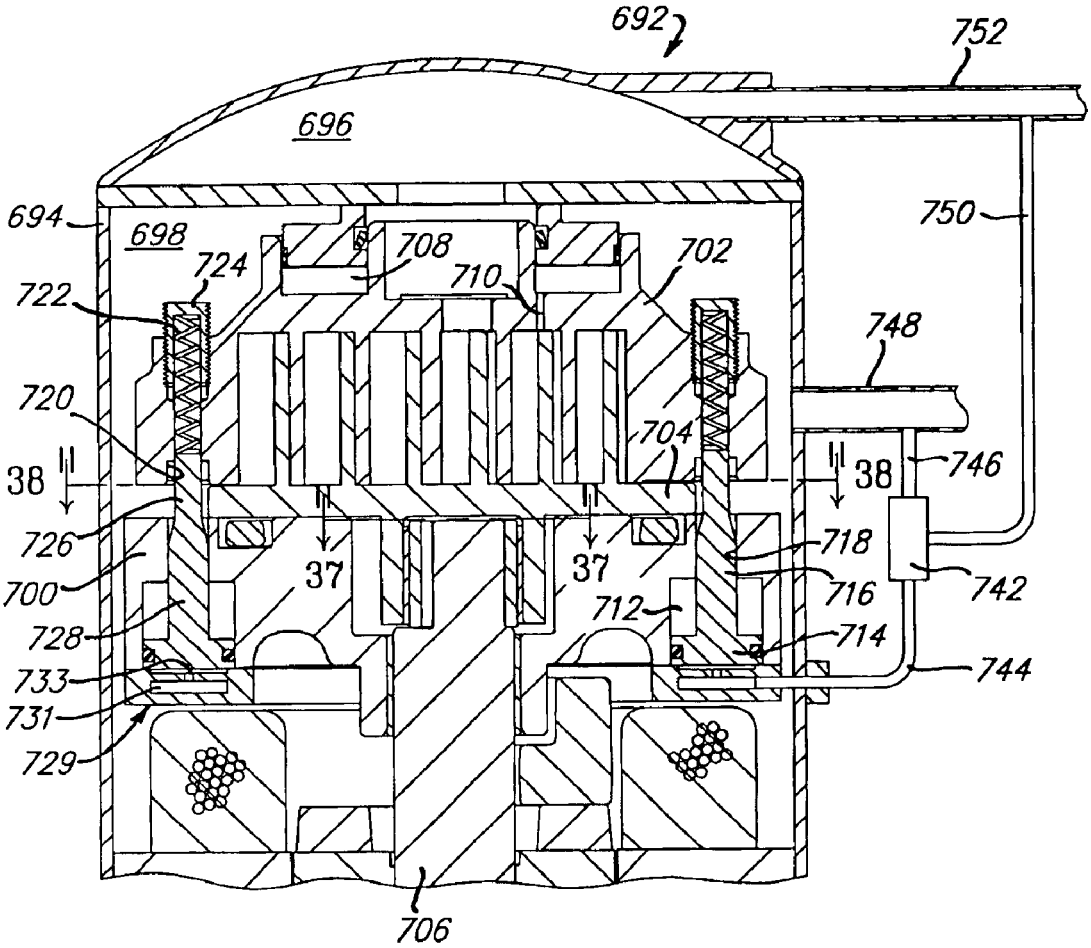
FIG. 36 is also a fragmentary section view of yet a further embodiment of the present invention showing an arrangement for radially unloading of the compressor in accordance with the present invention.

Referring now to FIG. 36, a compressor incorporating radially directed unloading is shown being indicated generally at 692. Compressor 692 is generally similar to the previously described compressors and includes an outer shell 694 having a discharge chamber 696 and lower chamber 698 at suction pressure. A bearing housing 700 is supported within shell 694 and has a non-orbiting scroll member 702 axially movably secured thereto and an orbiting scroll 704 supported thereon which is adapted to be driven by crankshaft 706. An intermediate pressure biasing chamber 708 is provided at the upper end of non-orbiting scroll member 702 which is supplied with intermediate pressure fluid from a compression pocket via passage 710 to thereby axially bias non-orbiting scroll member into sealing engagement with orbiting scroll member 704.

Bearing housing 700 includes a plurality of substantially identical circumferentially spaced chambers 712 within each of which a piston 714 is movably disposed. Each piston 714 includes a pin 716 projecting axially upwardly therefrom, through opening 718 in the upper surface of bearing housing 700 and into corresponding axially aligned opening 720 provided in non-orbiting scroll member 702. A spring 722 is provided in each of the openings 720 and extends between a cylindrical spring retainer 724 secured to non-orbiting scroll 702 and the upper end of each of the pins 716 and serves to exert an axially downwardly directed biasing force thereon. As shown, each of the pins 716 includes an upper portion 726 of a first diameter and a lower portion 728 of a greater diameter. Pins 716 are positioned in surrounding relationship to the periphery of orbiting scroll 704. An annular manifolding assembly 729 is secured to the lower portion of main bearing 700 and closes off the lower end of respective chambers 712. Manifolding assembly 729 includes an annular passage 731 from which respective axially extending passages 733 open upwardly into each of the chambers 712.

Figure 37:
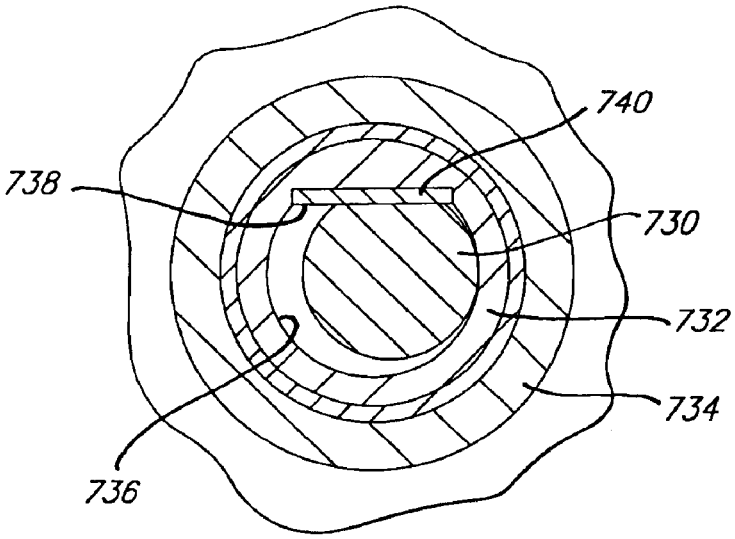
FIG. 37 is a section view of the crank pin and drive bushing employed in the embodiment of FIG. 36, the section being taken along lines 37—37 thereof.
Figure 38:
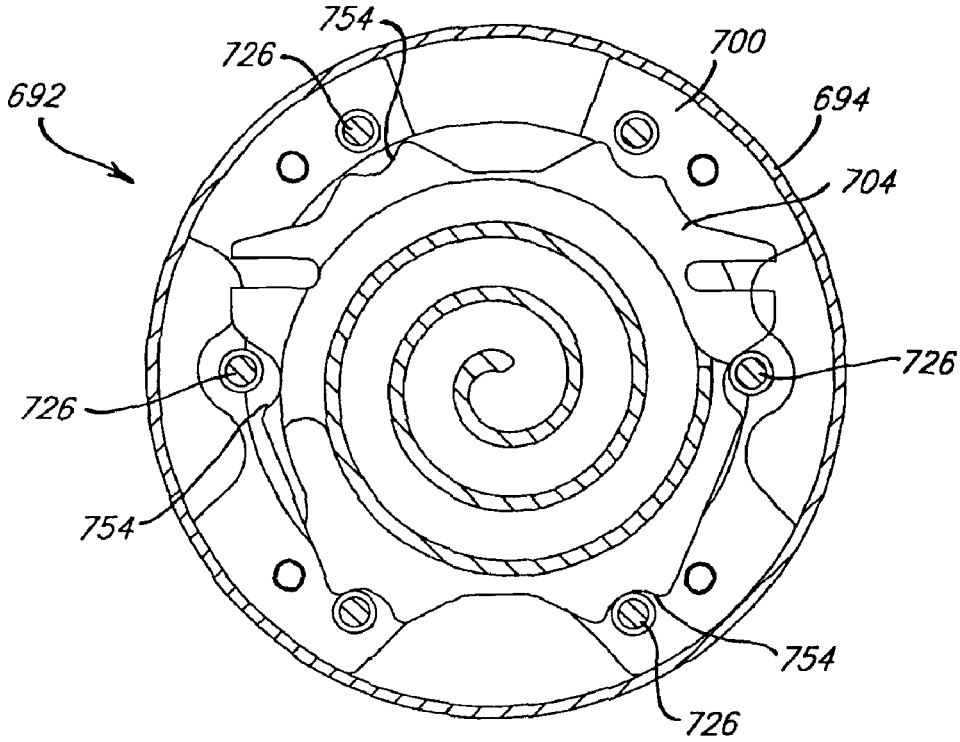
FIG. 38 is a section view of the embodiment shown in FIG. 36, the section being taken along lines 38—38 thereof.

As best seen with reference to FIG. 37, eccentric pin 730 of crankshaft 706 is drivingly connected to orbiting scroll member by means of a bushing 732 rotatably disposed within hub 734 provided on orbiting scroll 704. Bushing 732 includes a generally oval shaped opening 736 having a flat 738 along one side thereof which is adapted to receive eccentric pin 730 which also includes a flat 740 engageable with flat 738 through which the driving forces are transmitted to orbiting scroll 704. As shown, opening 736 is sized such that bushing and associated orbiting scroll 704 may move relative to each other such that the orbiting radius through which orbiting scroll moves may be reduced from a maximum at which the flank surfaces of the scroll wraps are in sealing engagement with each other to a minimum distance at which the flank surfaces are spaced from each other.

Compressor 692 also includes a three way solenoid valve 742 having a fluid line 744 connected to annular passage 731, a second fluid line 746 connected to suction line 748 and a third fluid line 750 connected to discharge line 752.

Figure 39:
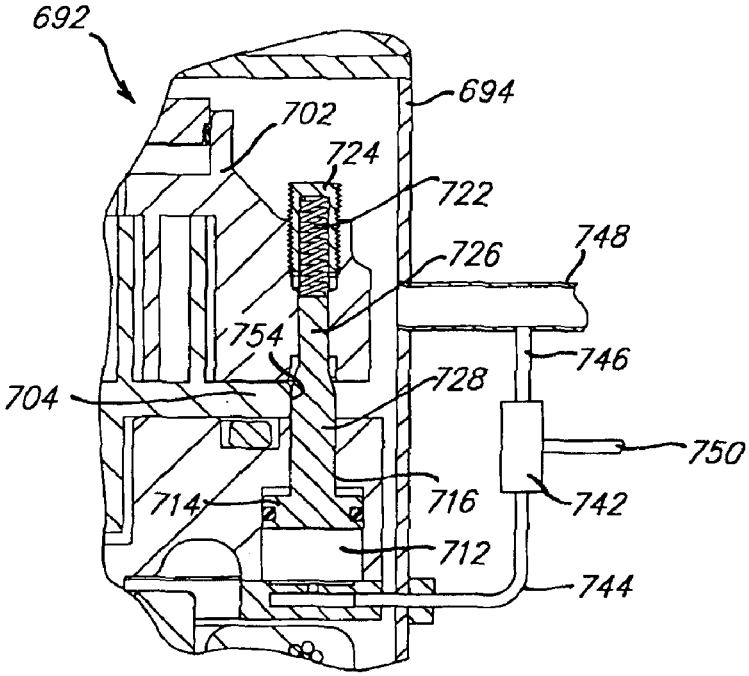
FIG. 39 is a view similar to that of FIG. 36 but showing the compressor in an unloaded condition.

Under fully loaded operation, solenoid valve 742 will be in a position so as to place each of the chambers 712 in fluid communication with suction line 748 via passages 733, passage 731, and fluid lines 744 and 746. Thus, each of the pistons and associated pins will be held in a lowered positioned by springs 722 whereby orbiting scroll member will be free to orbit at its full maximum radius. As axially movable non-orbiting scroll 702 is biased into sealing engagement with orbiting scroll 704 by biasing chamber 708, compressor 692 will operate at full capacity. In order to unload compressor 692, solenoid valve will be actuated so as to place discharge line 752 in fluid communication with annular chamber 731 which in turn will pressurize each of the chambers 712 with discharge pressure fluid to urge each of the pistons 714 and associated pins 716 to move axially upwardly to a fully raised position as shown in FIG. 39. Because the force of the discharge pressure fluid acting on the respective pistons 714 will not be sufficient to overcome the forces urging the orbiting scroll radially outwardly, pins 716 will move upwardly sequentially as the orbiting scroll moves away therefrom. Once all of the pins have moved upwardly, the large diameter portion 728 of pins 716 will be in a position to engage the arcuate cutouts 754 provided around the periphery of orbiting scroll member 704 as best seen with reference to FIG. 38 thereby causing the orbiting radius of orbiting scroll member 704 to be reduced to a minimum at which the flank surfaces thereof are no longer in sealing relationship and the compressor is fully unloaded. It should be noted that the pins 716 will be circumferentially spaced such that at least two adjacent pins will be in engagement with corresponding cutouts 754 throughout the orbit of orbiting scroll member 704. When loaded operation is to be resumed, solenoid valve will be returned to a position in which chamber 712 is vented to suction line 748 via passages 733, 731 and fluid lines 744 and 746 thereby allowing springs 722 to bias each of the pins 716 and associated pistons 714 downwardly to a position in which reduced diameter portion 726 of the respective pins is positioned in radially spaced relationship to cutouts 754 and orbiting scroll 704 is able to resume its full orbital radius and full capacity compression will resume.

Figure 40:
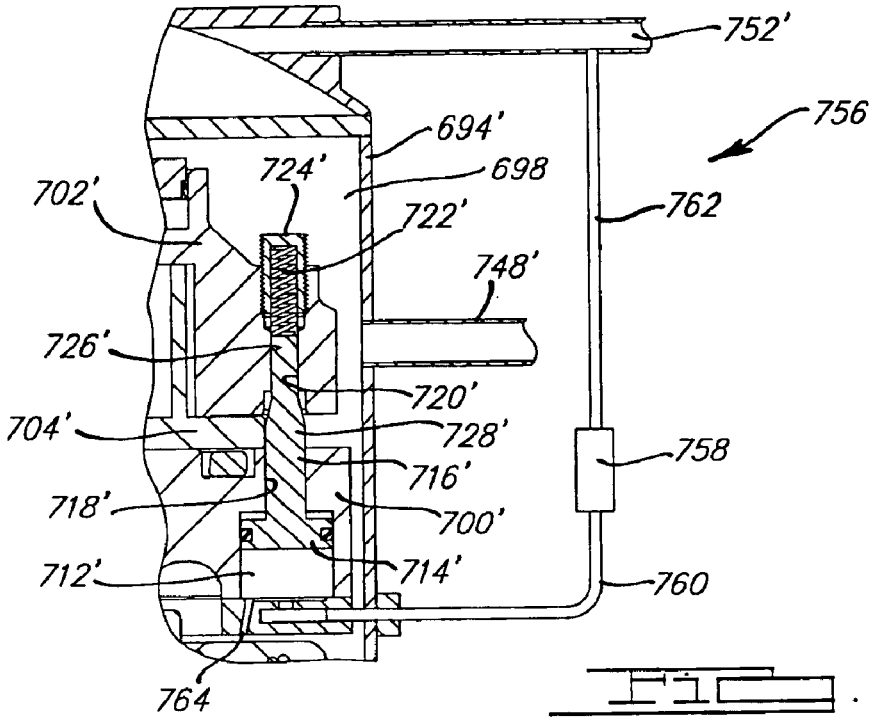
FIG. 40 is a fragmentary section view showing a modified version of the embodiment of FIG. 36, all in accordance with the present invention.

FIG. 40 shows a modified version of the embodiment of FIGS. 36 through 39 at 756 wherein a two way solenoid valve 758 is utilized having fluid lines 760 and 762 connected to chamber 712 and discharge line 752' respectively. In this embodiment, each of the chambers 712 includes a passage 764 at the lower end thereof that is in continuous communication with lower portion 698' of shell 694' which is at suction pressure. Thus, each of the chambers 712' will be continuously vented to suction. To unload compressor 756, solenoid valve is opened thereby placing each of the chambers 712' in fluid communication with discharge pressure fluid from discharge line 752' and biasing each of the pistons 714' into a raised position. The remaining portions of compressor 756 are substantially identical to those of compressor 692 and accordingly are indicated by the same reference numbers primed. Similarly, the operation of compressor 756 will in all other respects be substantially identical to that of compressor 692.

Figure 41:
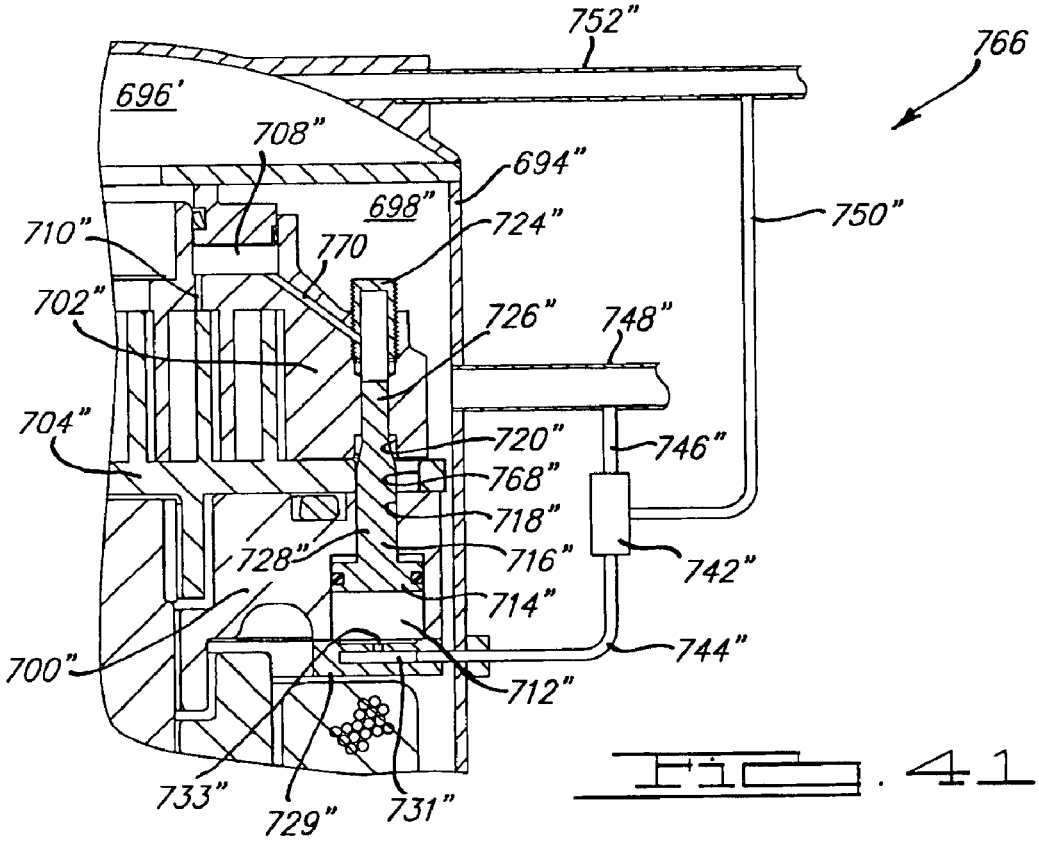
FIG. 41 is a fragmentary section view showing a portion of a scroll-type compressor incorporating another embodiment of the radial unloading arrangement of FIG. 36, all in accordance with the present invention.
Figure 42:
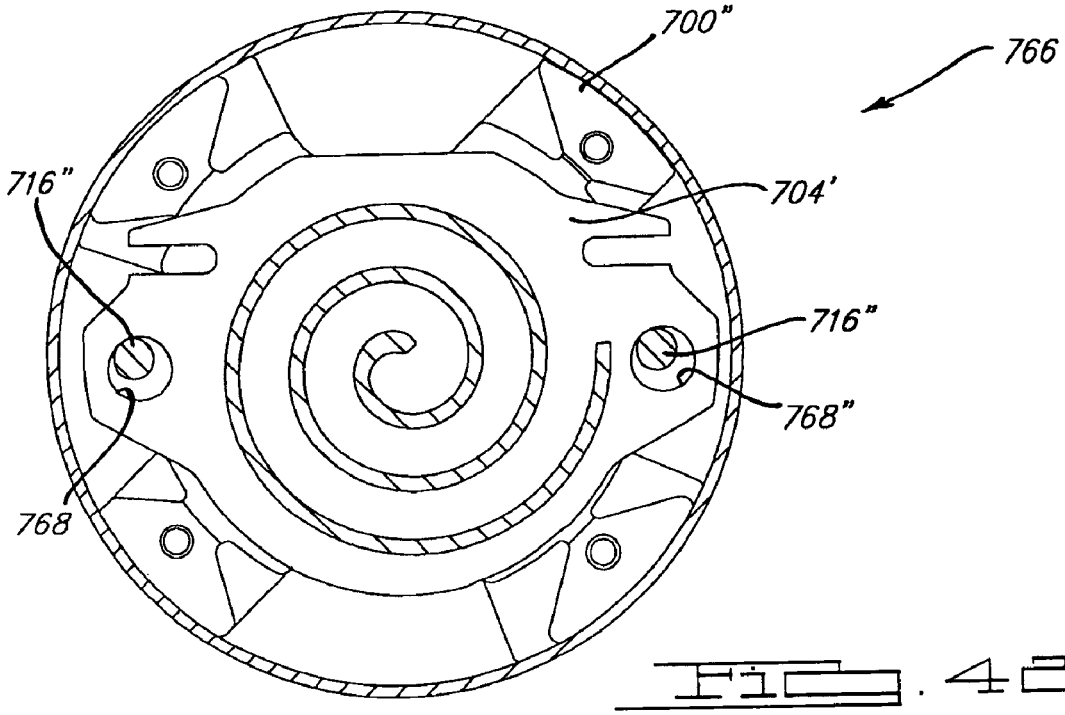
FIG. 42 is a section view similar to that of FIG. 38 but showing the embodiment of FIG. 41.

A further modification of the embodiments shown in FIGS. 36 through 40 is shown in FIGS. 41 and 42 at 766. In this embodiment, cutout portions 754 are deleted and two circular openings 768 are provided in lieu thereof. Likewise, only two pins 716" are provided. The diameter of circular openings 768 relative to the reduced diameter portion 726" of pins 714" will be such that there will be a slight clearance therebetween when orbiting scroll member 704" is orbiting at its maximum orbiting radius. When the larger diameter portion 728" of pins 716" are moved into holes 768, the orbiting radius of orbiting scroll 704" will be reduced to a minimum thus interrupting the sealing relationship between the flank surfaces of the scroll wraps.

Additionally, in this embodiment, springs 722 have been replaced by an intermediate pressure biasing engagement including a passage 770 in scroll member 702" extending from intermediate pressure biasing chamber 708" into the upper end of member 724". Thus, pins 716" will be biased to a lowered position by means of intermediate fluid pressure. In all other respects the construction and operation of compressor 766 will be substantially identical to compressor 692 and hence corresponding portions have been indicated by the same reference numbers used in FIG. 35 double primed.

Figure 44:
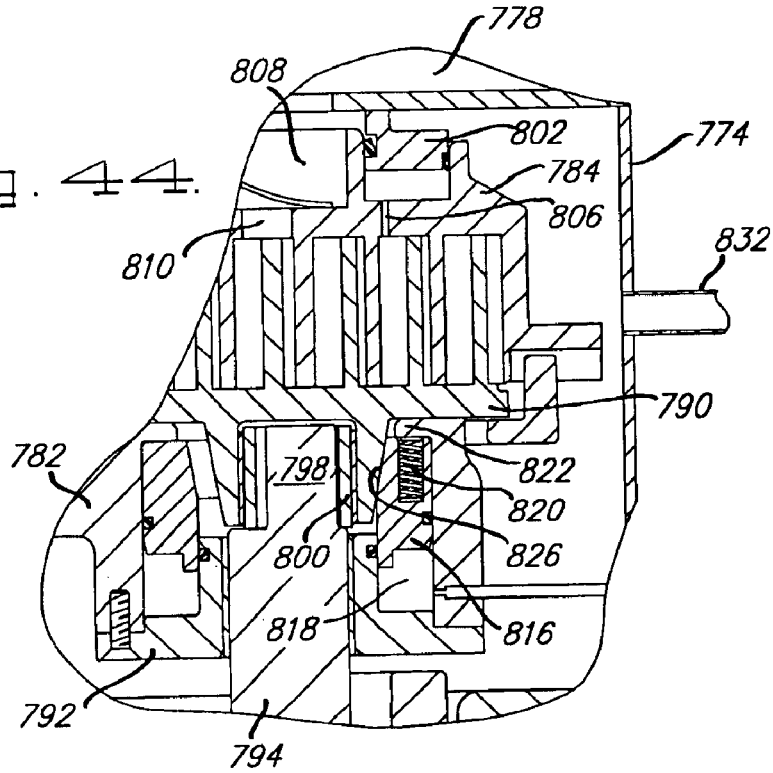
FIG. 44 is a view of a portion of the embodiment shown in FIG. 43 in an unloaded condition.
Figure 43:
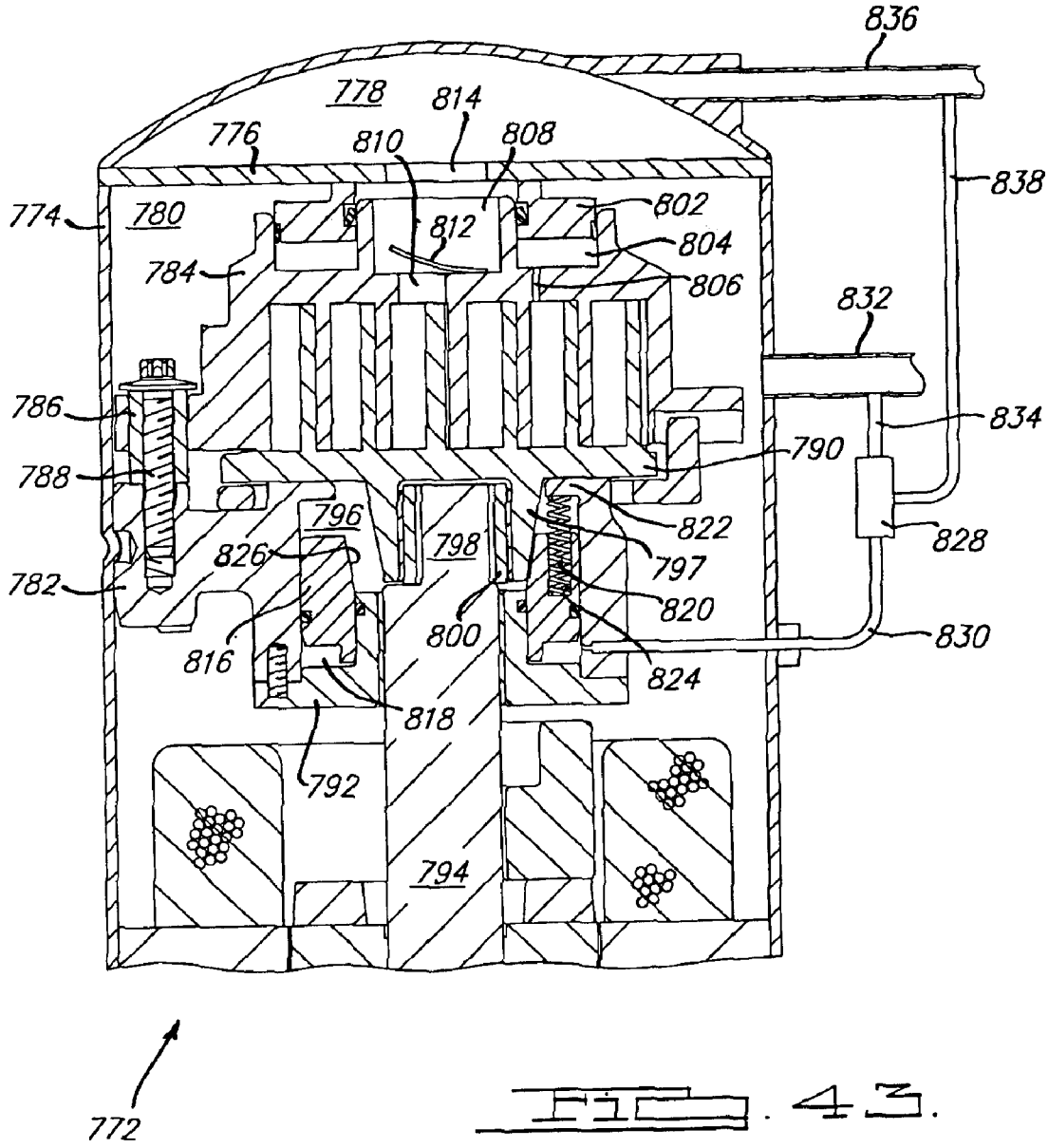
FIG. 43 is a fragmentary section view showing yet another embodiment of the present invention.

Another arrangement for radially unloading a scroll-type compressor is shown in FIGS. 43 and 44. Compressor 772 is generally similar in construction to compressor 692 and includes an outer shell 774 having a partition plate 776 dividing the interior thereof into an upper discharge chamber 778 and a lower portion 780 at suction pressure. A main bearing housing is secured within lower portion 780 and includes a first member 782 to which axially movable non-orbiting scroll member 784 is secured by means of bushings 786 and fasteners 788 and which also axially supports orbiting scroll member 790. A second member 792 of main bearing housing is secured to the lower end of member 782, rotatably supports a driving crankshaft 794 and together with first portion 782 and orbiting scroll member 790 defines a substantially closed cavity 796. Orbiting scroll member 790 includes a center hub 797 having a conically shaped outer surface which is adapted to drivingly mate with an eccentric pin 798 provided on crankshaft 794 via a drive bushing 800 disposed therebetween. Pin 798 and drive bushing 800 are substantially identical to that shown in FIG. 37 and allow for variation in the orbiting radius of orbiting scroll member 790 between a maximum at which the flank surfaces of the wraps are in sealing engagement and a minimum at which the flank surfaces of the wraps are spaced apart.

Non-orbiting scroll member 784 includes a cavity at the upper end thereof in which a floating seal member 802 is disposed to define an intermediate pressure biasing chamber 804 which is supplied with fluid under compression at a pressure between suction and discharge via passage 806 to thereby axially bias non-orbiting scroll member 784 into sealing engagement with orbiting scroll member 790. The upper end of floating seal 802 sealingly engages plate 776 and cooperates with non-orbiting scroll member 784 to define a discharge fluid flow path 808 from discharge port 810 to discharge chamber 778 via discharge check valve 812 and opening 814 in plate 776.

A piston member 816 is axially movably disposed within cavity 796 and includes suitable seals to thereby define a sealed separating chamber 818 at the lower end of cavity 796. A plurality of springs 820 extend from a radially inwardly extending flange portion 822 of member 782 into suitable wells 824 provided in piston member 816 and serve to bias piston member 816 axially downwardly away from hub portion 797. Additionally, piston member 816 includes a conically shaped radially inwardly facing surface 826 at the upper end thereof which is adapted to engage and is complementary to the outer conical surface of center hub 797.

As shown, a three way solenoid valve 828 is also provided which is connected to separating chamber 818 via fluid line 830, to suction line 832 via fluid line 834 and to discharge line 836 via fluid line 838. It should be noted, however, that a two way solenoid valve connected only to suction could be substituted for three way solenoid 828. In such a case, a bleed hole from the bottom chamber 818 through member 792 opening into area 780 would be required to vent discharge pressure fluid in somewhat similar manner to that described with reference to FIG. 38.

Under full load operation, solenoid valve 828 will be in a position so as to place separating chamber 818 in fluid communication with suction line 832 via fluid lines 830 and 834 thereby maintaining chamber 818 at substantially suction pressure. The action of springs 820 will maintain piston member in its axially lowered position as shown in FIG. 41 at which conical surface 826 thereof will be slightly spaced from the outer conical surface of hub 796 of orbiting scroll member 790.

When unloading is desired, solenoid valve 828 will be actuated to a position to place discharge line 836 in fluid communication with separating chamber 818 via fluid lines 838 and 830 thereby pressurizing chamber 818 to substantially discharge pressure. The biasing force resulting from this pressurization of chamber 818 will operate to move piston 816 axially upwardly overcoming the biasing force of springs 820 and moving conical surface 826 into engagement with the outer conical surface of hub 796 of orbiting scroll member 790. Continued upward movement of piston 816 to a position as shown in FIG. 44 will result in conical surface 826 reducing the orbiting radius of orbiting scroll member 790 such that the flank surfaces of the wraps thereof are no longer in sealing engagement with the flank surfaces of the non-orbiting scroll member and further compression of fluid ceases. In order to resume compression, solenoid valve is actuated to a position to vent chamber 818 to suction line 832 via fluid lines 830 and 834 thereby enabling springs 820 to bias piston member 816 into its lowered position as shown in FIG. 43.

It should be noted that while compressor 772 has been shown as including springs 820 to bias piston 816 axially downwardly, it may be possible to delete these biasing members in some applications and to rely on the axial component of the force exerted on piston 818 by the engagement of conical surface 826 with the conical surface on hub 796 to cause movement of piston member away from orbiting scroll member 790. Additionally, solenoid valve 828 is intended to be controlled in a cyclical manner by means of a control module and associated sensors (not shown) in response to varying system conditions in substantially the same manner as described above with respect to the other embodiments.

It should also be noted that the features incorporated in the various embodiments described above should not be viewed as being restricted to use only in that embodiment. Rather, features of one embodiment may be incorporated into another embodiment in addition to or in lieu of the specific features disclosed with respect to that other embodiment. For example, the discharge check valve provided on the outer shell of some of the embodiments may be substituted for the discharge check valve provided adjacent the discharge port in other embodiments or vice versa. Likewise, the suction control module disclosed for use with the embodiment of FIGS. 19 and 21 may also be incorporated into other embodiments. Further, while in many embodiments, the solenoid valve and associated fluid lines have been shown as positioned outside of the shell, they may be located within the shell if desired.

In each of the above embodiments, it is intended that the orbiting scroll continue to be driven while the compressor is in an unloaded condition. Obviously, the power required to drive the orbiting scroll member when the compressor is unloaded (no compression taking place) is considerably less than that required when the compressor is fully loaded. Accordingly, it may be desirable to provide additional control means operative to improve motor efficiency during these periods of reduced load operation thereof.

Figure 45:
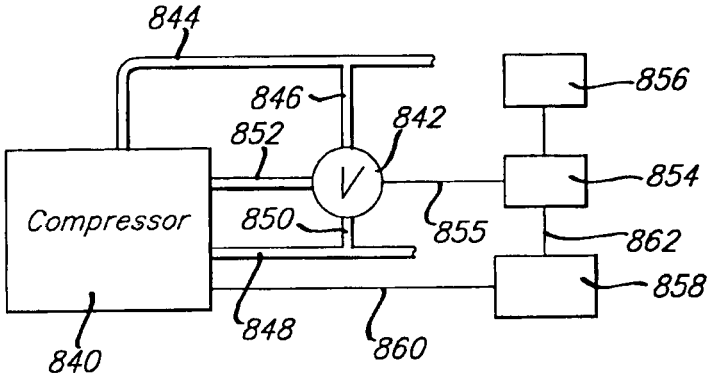
FIG. 45 is a schematic showing a means for reducing motor power consumption during periods when the compressor is operating in an unloaded condition in accordance with the present invention.

Such an embodiment is shown schematically in FIG. 45 which comprises a motor compressor 840 having a solenoid valve 842 connected to discharge line 844 via fluid line 846 and a suction line 848 via fluid line 850 and being operative to selectively place a compressor unloading mechanism in fluid communication with either the suction line or discharge line via fluid line 852. Solenoid valve 842 is intended to be controlled by a control module 854 via line 855 in response to system conditions sensed by sensors 856. As thus far described, the system represents a schematic illustration of any of the embodiments described above, it being noted that solenoid valve 842 could be a two way solenoid valve in lieu of the three way solenoid valve arrangement shown. In order to improve efficiency of the driving motor during reduced load operation, a motor control module 858 is also provided which is connected to the compressor motor circuit via line 860 and to control module 854 via line 862. It is contemplated that motor control module 858 will operate in response to a signal from control module 854 indicating that the compressor is being placed in an unloaded operating condition. In response to this signal, motor control module will operate to vary one or more of the compressor motor operating parameters to thereby improve its efficiency during the period of reduced load. Such operating parameters are intended to include any variably controllable factors which affect motor operating efficiency including voltage reduction or varying the running capacitance of the motor for example. Once control module 854 signals motor control module 858 that the compressor is being returned to fully loaded operation, motor control module will then operate to restore the affected operating parameters to maximize motor efficiency under full load operation.

The above described compressor unloading arrangements are particularly well suited to provide a wide range of capacity modulation in a relatively inexpensive and effective manner and to maximize the overall efficiency of the system as compared to prior capacity modulation arrangements. However, under some operating conditions such as those encountered when condenser inlet pressure is at a reduced level, it may be desirable to reduce the compression ratio of the compressor to avoid over-compression of the refrigerant at certain levels of system capacity reduction.

Figure 46:
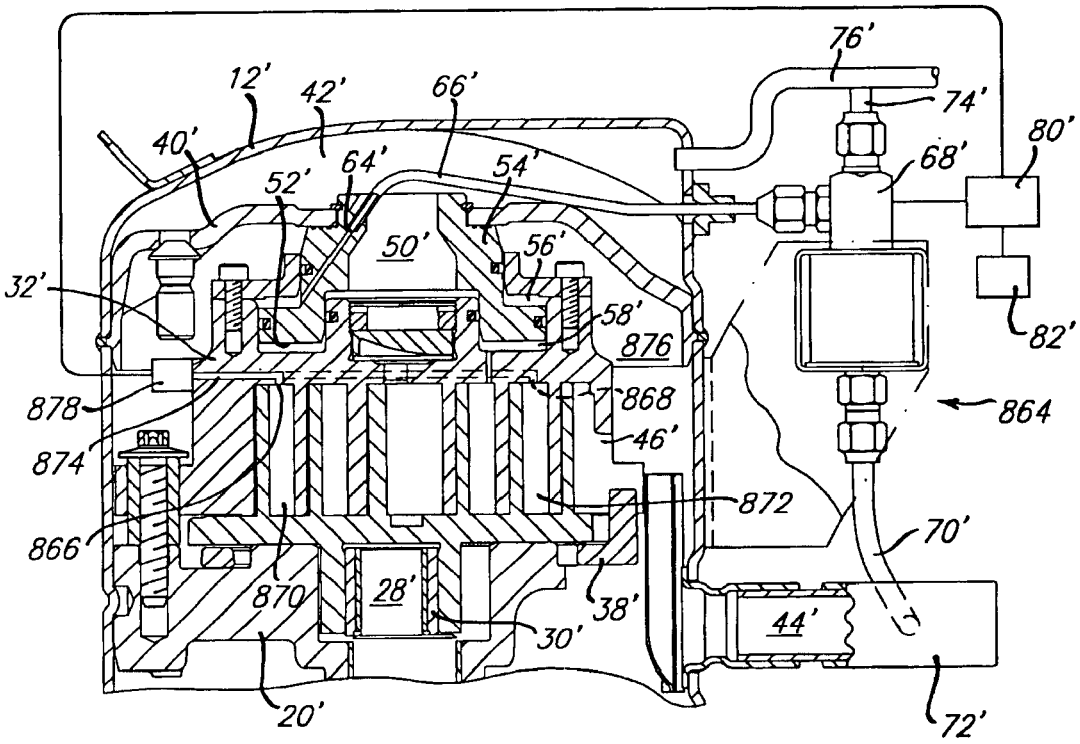
FIG. 46 is a section view of a compressor incorporating both cyclical scroll wrap separation and delayed suction unloading, all in accordance with the present invention.

FIG. 46 illustrates a compressor 864 which incorporates both the advantages of a cyclical or pulsed unloading as described above with means for reducing the compression ratio of the compressor so as to thereby increase the ability of the compressor to maximize efficiency under any operating conditions. Compressor 864 is substantially identical to compressor 10 shown in and described with reference to FIG. 1 except as noted below and accordingly like portions thereof are indicated by the same reference numbers primed.

Compressor 864 includes a pair of ports 866, 868 in non-orbiting scroll member 32' which open into compression pockets 870, 872 respectively. Ports 866 and 868 communicate with a passage 874 opening outwardly through the outer periphery of non-orbiting scroll member 32' into the lower area 876 of shell 12' which is at suction pressure. Suitable valve means 878 are provided to selectively control communication of ports 866, 868 with area 876. Preferably, ports 866, 868 will be located in an area such that they will begin to be in communication with the respective compression pockets prior to the compression pockets being sealed off from the suction fluid supply from area 876.

In operation, when it is determined that a reduction in compressor capacity is desired, a determination will also be made from the system operating conditions if the compressor is operating in an over-compression mode or an under-compression mode. If it is determined that an over-compression mode is present, initial capacity reduction will most efficiently be carried out by opening valve means 878 which will thus place pockets 870, 872 in fluid communication with area 876 of compressor 864 which is at suction pressure. The effect of opening valve 878 is thus seen as reducing the operating length of the wraps as compression does not begin until the respective pockets are closed off from the supply of suction gas. As the volume of the pockets when they are closed off when ports 866, 868 are open to area 876 is less than if ports 866, 868 were closed, the compression ratio of the compressor is reduced. This then will eliminate or at least reduce the level of over-compression. If additional capacity reduction is required after ports 866, 868 have been opened, the cyclic pulsed unloading of compressor 864 may be initiated in the same manner as described above.

If it is initially determined that the compressor is operating either in an under-compression mode or a point between an under and over-compression mode, reducing the compression ratio thereof will only result in decreased efficiency. Therefore, under these conditions, the cyclic pulsed unloading of compressor 864 will be initiated in the same manner as described above while valve means 878 and hence ports 866, 868 remain in a closed position.

In this manner, the overall efficiency of the system may be maintained at a high level regardless of the operating conditions being encountered. It should be noted that while FIG. 46 shows the delayed suction method of capacity modulation incorporated with the embodiment of FIG. 1, it may also be utilized in conjunction with any of the other embodiments disclosed herein. Also, while the delayed suction method of capacity modulation illustrated shows only the use of a single step provided by a single set of ports, it is possible to incorporate multiple steps by providing multiple ports any number of which may be opened depending on the system operating conditions. Also, the specific valving and porting arrangement shown should be considered exemplary only as there exist many different arrangements by which capacity modulation may be achieved via a delayed suction approach. Any number of these known delayed suction approaches may be utilized in place of the arrangement shown. It should also be noted that the arrangement for controlling motor efficiency under reduced load conditions as described with reference to FIG. 45 may also be incorporated into the embodiment of FIG. 46.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A scroll-type machine comprising:

a first scroll member having an end plate and a first spiral wrap extending therefrom;

a second scroll member having an end plate and a second spiral wrap extending therefrom, said first and second scroll members being positioned with said first and second spiral wraps interleaved with each other;

a structure for supporting said first and second scroll members for relative orbital movement therebetween whereby said first and second spiral wraps define moving fluid pockets therebetween;

a drive member for driving said first scroll member to effect said relative orbital movement between said first and second scroll members;

said first and second scroll members being movable between a first normal operating relationship in which sealing surfaces of said first and second scroll members are in sealing relationship to close off respective ones of said moving fluid pockets and a second relationship wherein at least one of said sealing surfaces of said first and second scroll members are spaced apart to define a leakage path between said moving fluid pockets; and a force applying structure independent of said drive member and actuatable to apply a force to one of said scroll members to move said scroll member between said first relationship in which said scroll machine operates at substantially full capacity and said second relationship in which said scroll machine operates at substantially zero capacity while said drive member continues to operate whereby the capacity of said compressor is modulated;

*wherein said force applying structure is operated to allow movement of said one of said first and second scroll members into said first relationship for a first predetermined time period and to allow movement of said one scroll member into said second relationship for a second predetermined period of time.*

2. A scroll-type machine as set forth in claim 1 wherein said force applying structure is operated in a time pulsed manner to modulate the capacity of said compressor.

3. A scroll-type machine as set forth in claim 2 wherein said force applying structure includes an actuator directly connected to the other of said first and second scrolls, said actuator being operative to move said other of said first and second scrolls between said first and second operational relationships.

4. A scroll-type machine as set forth in claim 3 wherein said actuator is a fluid operated piston and cylinder.

5. A scroll-type machine as set forth in claim 3 wherein said actuator is a solenoid device.

6. A scroll-type machine as set forth in claim 2 wherein said scroll-type machine includes a discharge flow path for conducting compressed fluid from said compressor and a check valve located within said flow path to prevent reverse flow of said compressed fluid.

7. A scroll-type machine as set forth in claim 3 wherein said actuator is electrically operated.

8. A scroll-type machine as set forth in claim 1 further comprising a control module operatively connected to said force applying structure and at least one sensor, said control module being operative to actuate said force applying structure in response to a signal from said sensor.

9. A scroll-type machine as set forth in claim 1 wherein said force applying structure includes a fluid pressure chamber operative to apply said force to said one of said first and second scroll members.

10. A scroll-type machine as set forth in claim 9 wherein said fluid pressure chamber operates to apply a force to move said one of said first and second scroll members.

11. A scroll-type machine as set forth in claim 10 wherein said force acts in an axial direction.

12. A scroll-type machine as set forth in claim 11 wherein said force applying structure includes a passage for supplying a pressurized fluid from said compressor to said pressure chamber.

13. A scroll-type machine as set forth in claim 12 further including a valve for controlling flow through said passage, said valve being operative to vent said pressurized fluid from said pressure chamber to thereby enable said first and second scrolls to move between said first and second relationship.

14. A scroll-type machine as set forth in claim 13 wherein said valve is a solenoid operated valve.

15. A scroll-type machine as set forth in claim 13 wherein said valve is fluid pressure operated.

16. A scroll-type machine as set forth in claim 12 wherein said force applying means includes a passage for venting said pressurized fluid from said chamber.

17. A scroll-type machine as set forth in claim 16 wherein said pressurized fluid acts on said one of said first and second scrolls.

18. A scroll-type machine as set forth in claim 17 wherein said pressurized fluid operates to urge said one of said first and second scrolls into said first operating relationship.

19. A scroll-type machine as set forth in claim 17 wherein said pressurized fluid operates to urge said one of said first and second scrolls into said second operating relationship.

20. A scroll-type machine as set forth in claim 16 wherein said pressurized fluid acts on the other of said first and second scroll members.

21. A scroll-type machine as set forth in claim 10 wherein said force acts in a radial direction.

22. A scroll-type machine as set forth in claim 21 wherein said force operates to reduce the radius of relative orbital movement.

23. A scroll-type machine as set forth in claim 1 wherein said first scroll member rotates about a first axis and said second scroll member rotates about a second axis offset from said first axis.

24. A scroll-type machine as set forth in claim 1 wherein said second scroll member is non-rotatably axially movably supported on said fixed support structure.

25. A scroll-type machine as set forth in claim 1 wherein said force applying structure includes an actuator directly connected to the other of said first and second scrolls, said actuator being operative to move said other of said first and second scroll members between said first and second operational relationships.

26. A scroll-type machine as set forth in claim 1 wherein said force applying structure utilizes fluid from said moving fluid pockets to apply said force.

27. A scroll-type machine comprising:

a first scroll member having an end plate and a first spiral wrap extending therefrom;

a second scroll member having an end plate and a second spiral wrap extending therefrom, said first and second scroll members being positioned with said first and second spiral wraps interleaved with each other;

a support structure for supporting said first and second scroll members for relative orbital movement therebetween whereby said first and second spiral wraps define moving fluid pockets therebetween;

a drive shaft rotatably drivingly coupled to said first scroll member to effect said relative orbital movement between said first and second scroll members;

a drive motor connected to said drive shaft;

control means associated with said motor;

said first and second scroll members being movable between a first normal operating relationship in which sealing surfaces of said first and second scroll members are in sealing relationship to close off respective ones of said moving fluid pockets and a second relationship wherein at least one of said sealing surfaces of said first and second scroll members are spaced apart to define a leakage path between said moving fluid pockets; and a force applying structure independent of said drive shaft and actuatable to apply a force to one of said scroll members to move said scroll members between said first relationship in which said scroll machine operates at substantially full capacity and said second relationship in which said scroll machine operates at substantially zero capacity while said drive shaft continues to rotate whereby the capacity of said compressor is modulated;

said control means being operative to control an operating parameter of said motor when said first and second scroll members are in said second relationship to thereby improve the operating efficiency of said motor.

28. A scroll-type machine as set forth in claim 27 wherein said operating parameter is the voltage applied to said motor.

29. A scroll-type machine as set forth in claim 27 wherein said operating parameter is the running capacitance of said motor.

30. A scroll-type machine comprising:

a first scroll member having a first end plate and a first spiral wrap provided thereon;

a second scroll member having a second end plate and a second spiral wrap provided thereon, said first and second scroll members being positioned for relative orbital movement with said first and second spiral wraps interleaved with each other to define moving fluid pockets;

a drive shaft drivingly connected to said first scroll member;

a power source operative to rotatably drive said drive shaft to thereby effect relative orbital movement between said first and second scroll members; and force applying structure independent of said drive shaft for effecting axial movement of one of said first and second scroll members between a first relationship in which said first and second scroll members are in a sealing relationship to thereby define moving fluid pockets whereby said scroll-type machine operates at substantially full capacity and a second relationship in which said first and second scroll members are axially separated sufficiently to place said fluid pockets in communication with each other whereby said scroll-type machine operates at substantially zero capacity so that the capacity of said compressor is modulated;

*wherein said force applying structure is operated to allow movement of said one of said first and second scroll members into said first relationship for a first predetermined time period and to allow movement of said one scroll member into said second relationship for a second predetermined period of time.*

31. A scroll-type machine as set forth in claim 30 wherein said drive shaft continues to drive said first scroll member during axial movement of said one scroll member.

32. A scroll-type machine as set forth in claim 30 wherein said force applying structure includes a fluid pressure chamber and a first passage for placing said chamber in communication with a source of pressurized fluid, said pressurized fluid operating to exert a force on said one of said first and second scroll members to urge said one scroll member into one of said first and second relationships.

33. A scroll-type machine as set forth in claim 32 wherein said force applying structure includes a second fluid passage for venting pressurized fluid from said chamber.

34. A scroll-type machine as set forth in claim 33 wherein said force applying structure includes a valve for controlling flow of pressurized fluid from said chamber.

35. A scroll-type machine as set forth in claim 34 wherein said force from said pressurized fluid acts to urge said one scroll into said second relationship.

36. A scroll-type machine as set forth in claim 35 wherein said pressurized fluid is at substantially discharge pressure.

37. A scroll-type machine as set forth in claim 36 wherein said force from said pressurized fluid acts on said second scroll member.

38. A scroll-type machine as set forth in claim 37 wherein said first passage extends between said chamber and said valve, said second passage extends between said valve and an area at substantially suction pressure and a third fluid passage extends between said valve and a supply of pressurized fluid at substantially discharge pressure, said valve being operative to selectively place said first passage in fluid communication with said second passage and said third passage.

39. A scroll-type machine as set forth in claim 38 wherein said chamber is defined in part by said second scroll member and in part by a second member.

40. A scroll-type machine as set forth in claim 39 wherein said second member defines in part a second chamber, said machine including a fourth passage operative to supply a pressurized fluid to said second chamber to thereby urge said second scroll member axially into said first relationship.

41. A scroll-type machine as set forth in claim 40 wherein said second member is rotatably driven by said drive shaft.

42. A scroll-type machine as set forth in claim 40 wherein said second member is stationary.

43. A scroll-type machine as set forth in claim 39 wherein said second member includes a stop surface to limit axial movement of said second scroll member.

44. A scroll-type machine as set forth in claim 33 wherein said force applying structure further includes a valve operative to control fluid flow through said first and second passages.

45. A scroll-type machine as set forth in claim 44 wherein said chamber is defined in part by said second scroll member and a second member.

46. A scroll-type machine as set forth in claim 45 wherein said first and second passages are provided in said second member.

47. A scroll-type machine as set forth in claim 46 wherein said valve is movably disposed in said second member and includes an actuator for moving said valve to a position in which said chamber is placed in fluid communication with a low pressure area of said machine via said second passage and a second position in which said chamber is placed in fluid communication with a source of high pressure fluid.

48. A scroll-type machine as set forth in claim 47 wherein said actuator is electrically operated.

49. A scroll-type machine as set forth in claim 48 wherein said actuator is a solenoid device.

50. A scroll-type machine as set forth in claim 47 wherein said actuator is operated by pressurized fluid.

51. A scroll-type machine as set forth in claim 32 wherein said first passage is provided in the end plate of said one of said scrolls.

52. A scroll-type machine as set forth in claim 51 wherein said first passage places said chamber in fluid communication with a pressurized fluid to thereby urge said one scroll member into said first relationship.

53. A scroll-type machine as set forth in claim 51 further comprising a second passage extending between said chamber and a low pressure area of said machine, and a valve disposed along said second passage to control fluid flow therethrough.

54. A scroll-type machine as set forth in claim 53 wherein said one scroll member is said first scroll member and said chamber is defined by said first end plate and a main bearing housing.

55. A scroll-type machine as set forth in claim 54 further comprising an annular seal between said main bearing housing and said first end plate.

56. A scroll-type machine as set forth in claim 55 further comprising springs extending between said main bearing housing and said first end plate to aid in urging said first scroll member into said first relationship.

57. A scroll-type machine as set forth in claim 30 wherein said force applying structure is directly connected to said one of said scroll members.

58. A scroll-type machine as set forth in claim 57 wherein said force applying structure includes an actuator operative to axially reciprocate a shaft, one end of said shaft being secured to said one scroll member.

59. A scroll-type machine as set forth in claim 58 wherein said actuator is electrically operated.

60. A scroll-type machine as set forth in claim 58 wherein said actuator is operated by fluid pressure.

[61. A scroll-type machine as set forth in claim 30 wherein said force applying structure is operated to allow movement of said one of said first and second scroll members into said first relationship for a first predetermined time period and to allow movement of said one scroll member into said second relationship for a second predetermined period of time.]

62. A scroll-type machine as set forth in claim [61] *30* further comprising sensors for sensing operating conditions and providing a signal indicative thereof to a control module, said control module being operative to vary the capacity of said scroll machine by controlling the duration of said first and second time periods in accordance with said sensed conditions.

63. A scroll-type machine as set forth in claim [61] *30* wherein said first predetermined time period is fixed and said second predetermined time period is varied.

64. A scroll-type machine as set forth in claim [61] *30* wherein said first predetermined time period is varied and said second predetermined time period is fixed.

65. A scroll-type machine as set forth in claim [61] *30* wherein the sum of said first and second time periods is a constant.

66. A scroll-type machine as set forth in claim 30 wherein said force applying structure utilizes fluid from said moving fluid pockets to apply said force.

67. A scroll-type machine comprising:

a first scroll member having a first end plate and a first spiral wrap provided thereon;

a second scroll member having a second end plate and a second spiral wrap provided thereon, said first and second scroll members being positioned for relative orbital movement with said first and second spiral wraps interleaved with each other to define moving fluid pockets;

a drive shaft drivingly connected to said first scroll member;

a driving motor operative to rotatably drive said drive shaft to thereby effect relative orbital movement between said first and second scroll members;

a motor controller operatively connected to said motor;

force applying structure for effecting axial movement of one of said first and second scroll members between a first relationship in which said first and second scroll members are in a sealing relationship to thereby define moving fluid pockets whereby said scroll machine operates at substantially full capacity and a second relationship in which said first and second scroll members are axially separated sufficiently to place said fluid pockets in communication with each other whereby said scroll machine operates at substantially zero capacity so that the capacity of said compressor is modulated, said force applying structure being operated to allow movement of said one of said first and second scroll members into said first relationship for a first predetermined time period and to allow movement of said one scroll member into said second relationship for a second predetermined period of time; and sensors for sensing operating conditions and providing a signal indicative thereof to a control module, said control module being operative to vary the capacity of said scroll machine by controlling the duration of said first and second predetermined time periods in accordance with said sensed conditions;

said motor controller being operative to vary at least one operating parameter of said motor in response to a signal from said control module that said first and second scroll members are in said second relationship to thereby improve the operating efficiency of said motor during said second predetermined time periods.

68. A scroll-type compressor comprising:

a hermetic shell having a partition separating the interior thereof into a discharge chamber and a suction chamber;

a suction line opening into said suction chamber;

a discharge line opening out of said discharge chamber;

a bearing housing supported within said shell;

a first scroll member disposed within said suction chamber and having a first end plate and a first spiral wrap provided on said end plate, said first scroll member being supported on said bearing housing;

a second scroll member disposed within said suction chamber and having a second end plate and a second spiral wrap provided thereon, said first and second wraps being interleaved so as to define moving fluid pockets therebetween which decrease in size as they move from a radially outer position to a radially inner position, said second scroll member being axially movably secured to said bearing housing, said second scroll member including a central discharge port and an annular cavity surrounding said discharge port;

a drive shaft drivingly coupled to said first scroll member;

a flanged member secured to said partition and including a portion extending into said cavity and separating said cavity into a biasing chamber and a separating chamber;

a first passage in said second end plate for placing said biasing chamber in communication with a fluid pocket at a pressure between suction and discharge to thereby axially bias said second scroll member into sealing relationship with said first scroll member;

a second passage for selectively placing said separating chamber in communication with fluid at discharge pressure to thereby axially move said second scroll member away from said first scroll member to unload said compressor; and a valve for controlling fluid flow through said second passage.

69. A scroll-type compressor as set forth in claim 68 wherein said valve is actuated in a time pulsed manner to cyclically load and unload said compressor whereby the capacity of said compressor may be modulated between substantially zero and one hundred percent.

70. A scroll-type compressor as set forth in claim 69 further including a third fluid passage extending from said valve and to an area of at substantially suction pressure, said valve being operable to a position to place said separating chamber in fluid communication with said area at suction pressure to vent said separating chamber.

71. A scroll-type compressor as set forth in claim 70 wherein said valve is positioned within said flanged member.

72. A scroll-type compressor as set forth in claim 69 wherein said drive shaft extends outwardly of said shell.

73. A scroll-type compressor comprising:

an outer shell;

a bearing housing supported within said outer shell;

a first scroll member movably supported on said bearing housing and having a first end plate and a first spiral wrap positioned thereon;

a second scroll member secured to said bearing housing and having a second end plate and a second spiral wrap provided thereon, said first and second scroll members being positioned in interleaved relationship;

a drive shaft rotatably supported by said bearing housing and operative to drive said first scroll member in orbital movement whereby said first and second scroll members define moving fluid pockets which decrease in size as they move radially inwardly;

a suction line for supplying fluid at suction pressure to said compressor;

a discharge line for discharging compressed fluid at discharge pressure from said compressor;

a biasing chamber defined between said first end plate and said bearing housing;

a first passage in said first end plate for supplying a pressurized fluid to said biasing chamber to thereby bias said first scroll member into sealing relationship with said second scroll member;

a second passage communicating between said biasing chamber and an area at suction pressure to vent pressurized fluid from said biasing chamber whereby fluid pressure within said moving fluid pockets will move said first scroll member axially away from said second scroll member thereby unloading said compressor;

a valve in said second passage to control fluid flow therethrough to thereby selectively control unloading of said compressor and modulate the capacity thereof.

74. A scroll-type compressor as set forth in claim 73 wherein the interior of said shell is at discharge pressure.

75. A scroll-type compressor as set forth in claim [74] *73* further comprising an annular seal extending between said bearing housing and said first end plate to seal said biasing chamber from the interior of said shell.

76. A scroll-type compressor as set forth in claim 75 further comprising a second annular seal extending between said bearing housing and said first end plate, said biasing chamber being defined between said annular and second annular seals.

77. A scroll-type compressor comprising:

an outer shell;

a bearing housing supported within said outer shell;

a first scroll member movably supported on said bearing housing and having a first end plate and a first spiral wrap positioned thereon;

a second scroll member secured to said bearing housing and having a second end plate and a second spiral wrap provided thereon, said first and second scroll members being positioned in interleaved relationship;

a drive shaft rotatably supported by said bearing housing and operative to drive said first scroll member in orbital movement whereby said first and second scroll members define moving fluid pockets which decrease in size as they move radially inwardly;

a suction line for supplying fluid at suction pressure to said compressor;

a discharge line for discharging compressed fluid at discharge pressure from said compressor;

a biasing chamber defined between said first end plate and said bearing housing;

a first passage in said first end plate for supplying a pressurized fluid to said biasing chamber to thereby bias said first scroll member into sealing relationship with said second scroll member;

said second scroll member including an annular cavity;

a piston movably disposed within said cavity and operative to move said first scroll member axially away from said second scroll member;

a second passage for supplying pressurized fluid to said annular cavity to move said piston;

valve means for selectively controlling fluid flow through said second passage to thereby selectively unload said compressor.

78. A scroll-type compressor as set forth in claim 77 further including a third fluid passage connected between said valve and an area of said compressor at suction pressure, said valve being operable to vent said annular cavity to thereby enable said biasing chamber to move said first scroll member into sealing engagement with said second scroll member.

79. A scroll-type machine comprising:

a first scroll member having an end plate and a first spiral wrap upstanding therefrom;

a second scroll member having an end plate and a second spiral wrap upstanding therefrom, said first and second scroll members being positioned with said first and second spiral wraps interleaved with each other;

a motor drivingly connected to said first scroll member;

a structure for supporting said first and second scroll members for relative orbital movement therebetween whereby said first and second spiral wraps define moving fluid pockets;

a capacity modulation device for reducing the capacity of said compressor from a predetermined maximum and to provide a signal indicative of said capacity reduction; and a motor controller operative to vary an operating parameter of said motor in response to said signal from said capacity modulation device to thereby improve the efficiency of said motor while said capacity of said compressor is reduced.

80. A scroll-type machine as set forth in claim 79 wherein said capacity modulation device is operated in a time pulsed manner to vary the capacity of said compressor.

81. A scroll-type machine as set forth in claim 80 wherein said capacity modulation device includes a force applying structure actuatable to apply a force to one of said first and second scroll members to effect relative movement between a first relationship in which sealing surfaces of said first and second scroll members are in sealing relationship to close off respective ones of said moving fluid pockets and a second relationship in which at least one of said sealing surfaces of said first and second scroll members are spaced apart to define a leakage path between said moving fluid pockets.

82. A scroll-type machine as set forth in claim 79 wherein said motor controller operates to vary the voltage applied to said motor.

83. A scroll-type machine as set forth in claim 79 wherein said motor controller operates to vary the load applied to said motor controller.

84. A scroll-type machine comprising:

a first scroll member having an end plate and a first spiral wrap extending therefrom;

a second scroll member having an end plate and a second spiral wrap extending therefrom, said first and second scroll members being positioned with said first and second spiral wraps interleaved with each other;

a structure for supporting said first and second scroll members for relative orbital movement therebetween whereby said first and second spiral wraps define moving fluid pockets therebetween which decrease in size as they move to a radially inner position to compress a fluid therein;

a drive shaft rotatably drivingly coupled to said first scroll member to effect said relative orbital movement between said first and second scroll members;

said first and second scroll members being movable between a first normal operating relationship in which sealing surfaces of said first and second scroll members are in sealing relationship to close off respective ones of said moving fluid pockets and a second relationship wherein at least one of said sealing surfaces of said first and second scroll members are spaced apart to define a leakage path between said moving fluid pockets; and a force applying structure using said compressed fluid from said fluid pockets to apply a force to one of said scroll members to move said scroll members between said first relationship in which said scroll machine operates at substantially full capacity and said second relationship in which said scroll machine operates at substantially zero capacity while said drive shaft continues to rotate whereby the capacity of said compressor is modulated.

85. A scroll-type machine as set forth in claim 84 wherein said force applying structure is operated in a time pulsed manner to modulate the capacity of said compressor.

86. A scroll-type machine as set forth in claim 85 wherein said scroll-type machine includes a discharge flow path for conducting compressed fluid from said compressor and a check valve located within said flow path to prevent reverse flow of said compressed fluid.

87. A scroll-type machine as set forth in claim 85 wherein said scroll machine includes a driving motor and a motor controller operatively connected to said motor, said motor controller being operative to vary at least one operating parameter of said motor in response to a signal from said control module that said first and second scroll members are in said second relationship to thereby improve the operating efficiency of said motor during said second predetermined time periods.

88. A scroll-type machine as set forth in claim 84 wherein said first scroll member rotates about a first axis and said second scroll member rotates about a second axis radially offset from said first axis.

89. A scroll-type machine comprising:

a first scroll member having an end plate and a first spiral wrap extending therefrom;

a second scroll member having an end plate and a second spiral wrap extending therefrom, said first and second scroll members being positioned with said first and second spiral wraps interleaved with each other;

a support structure for supporting said first and second scroll members for rotational movement about radially offset axis;

a drive member for rotatably driving said first scroll member to effect relative orbital movement between said first and second scroll members whereby said first and second spiral wraps define moving fluid pockets therebetween;

said first and second scroll members being movable between a first normal operating relationship in which sealing surfaces of said first and second scroll members are in sealing relationship to close off respective ones of said moving fluid pockets and a second relationship wherein at least one of said sealing surfaces of said first and second scroll members are spaced apart to define a leakage path between said moving fluid pockets; and a force applying structure independent of said drive member and actuatable to apply a force to one of said scroll members to move said scroll members between said first relationship in which said scroll machine operates at substantially full capacity and said second relationship in which said scroll machine operates at substantially zero capacity while said drive shaft continues to rotate whereby the capacity of said compressor is modulated;

*wherein said force applying structure is operated to allow movement of said one of said first and second scroll members into said first relationship for a first predetermined time period and to allow movement of said one scroll member into said second relationship for a second predetermined period of time.*

90. A scroll-type machine comprising:

a first scroll member having an end plate and a first spiral wrap extending therefrom;

a second scroll member having an end plate and a second spiral wrap extending therefrom, said first and second scroll members being positioned with said first and second spiral wraps interleaved with each other;

a fixed support structure for supporting said first and second scroll members for relative orbital movement therebetween whereby said first and second spiral wraps define moving fluid pockets therebetween which decrease in size as they move from a radially outer position to a radially inner position to compress a fluid in said pockets;

a drive shaft rotatably drivingly coupled to said first scroll member to effect said relative orbital movement between said first and second scroll members;

said first and second scroll members being movable between a first normal operating relationship in which sealing surfaces of said first and second scroll members are in sealing relationship to close off respective ones of said moving fluid pockets and a second relationship wherein at least one of said sealing surfaces of said first and second scroll members are spaced apart to define a leakage path between said moving fluid pockets;

a force applying structure utilizing said compressed fluid from said moving fluid pockets to apply a force to one of said scroll members to move said scroll members between said first relationship in which said scroll machine operates at substantially full capacity and said second relationship in which said scroll machine operates at substantially zero capacity while said drive shaft continues to rotate whereby the capacity of said compressor is modulated, and said force applying structure including a biasing chamber, a fluid passage for providing said compressed fluid to said biasing chamber, a valve for selectively controlling fluid flow through said passage and a vent passage for venting pressurized fluid from said biasing chamber.

91. A scroll-type machine as set forth in claim [84] *90* wherein said vent passage is in open communication to a low pressure area of said scroll-type machine.

92. A scroll-type machine as set forth in claim [84] *90* wherein said valve operates in a time pulsed manner to cyclically pressurize said biasing chamber.

93. A scroll-type machine as set forth in claim [86] *92* wherein said biasing chamber operates to bias said one scroll toward said second position.

94. A scroll-type machine as set forth in claim [87] *93* further comprising a second biasing chamber and a second fluid passage for providing fluid from said moving fluid pockets to said second biasing chamber.

95. A scroll-type machine as set forth in claim [88] *94* wherein said second biasing chamber operates to bias said one scroll member toward said first position.

96. A scroll-type machine comprising:

a first scroll member having an end plate and a first spiral wrap extending therefrom;

a second scroll member having an end plate and a second spiral wrap extending therefrom, said first and second scroll members being positioned with said first and second spiral wraps interleaved with each other;

a drive member for driving said first scroll member to effect said relative orbital movement between said first and second scroll members; and a force applying structure independent of said drive member and actuatable to apply a force to one of said scroll members to move said scroll members between a first relationship in which said scroll machine operates at substantially full capacity and a second relationship in which said scroll machine operates at substantially zero capacity while said drive shaft continues to rotate whereby the capacity of said compressor is modulated;

*wherein said force applying structure is operated to allow movement of said one of said first and second scroll members into said first relationship for a first predetermined time period and to allow movement of said one scroll member into said second relationship for a second predetermined period of time.*

97. A scroll-type machine comprising:

a first scroll member having an end plate and a first spiral wrap extending therefrom;

a second scroll member having an end plate and a second spiral wrap extending therefrom, said first and second scroll members being positioned with said first and second spiral wraps interleaved with each other;

a drive member for driving said first scroll member to effect said relative orbital movement between said first and second scroll members; and a force applying structure independent of said drive member and actuatable to apply a force to one of said scroll members in a time pulsed manner to move said scroll members between a first relationship in which said scroll machine operates at a first capacity and a second relationship in which said scroll machine operates at reduced capacity while said drive member continues to rotate whereby the capacity of said compressor is modulated;

*wherein said force applying structure is operated to allow movement of said one of said first and second scroll members into said first relationship for a first predetermined time period and to allow movement of said one scroll member into said second relationship for a second predetermined period of time.*

98. A scroll-type machine as set forth in claim 97 further comprising:

a drive motor for driving said drive member;

a control associated with said drive motor, said control being operative to control an operating parameter of said motor when said first and second scroll members are in said second relationship to thereby improve the operating efficiency of said motor.

[99. A scroll-type machine as set forth in claim 97 wherein said force applying structure is operated to allow movement of said one of said first and second scroll members into said first relationship for a first predetermined time period and to allow movement of said one scroll member into said second relationship for a second predetermined period of time.]

100. A scroll-type machine as set forth in claim [99] *97* further comprising sensors for sensing operating conditions and providing a signal indicative thereof to a control module, said control module being operative to vary the capacity of said scroll machine by controlling the duration of said first and second time periods in accordance with said sensed conditions.

101. A scroll-type machine comprising:

a first scroll member having an end plate and a first spiral wrap extending therefrom;

a second scroll member having an end plate and a second spiral wrap extending therefrom, said first and second scroll members being positioned with said first and second spiral wraps interleaved with each other;

a structure for supporting said first and second scroll members for relative orbital movement therebetween whereby said first and second spiral wraps define moving fluid pockets therebetween;

a drive member for driving said first scroll member to effect said relative orbital movement between said first and second scroll members;

said first and second scroll members being movable between a first normal operating relationship in which sealing surfaces of said first and second scroll members are in sealing relationship to close off respective ones of said moving fluid pockets and a second relationship wherein at least one of said sealing surfaces of said first and second scroll members are spaced apart to define a leakage path between said moving fluid pockets;

a force applying structure actuatable in a time pulsed manner to apply a force to one of said scroll members to move said scroll member between said first relationship in which said scroll machine operates at substantially full capacity and said second relationship in which said scroll machine operates at substantially zero capacity while said drive member continues to operate; and control means to control the ratio of the time said one scroll member is in said first relationship to the time said one scroll member is in said second relationship whereby the capacity of said compressor is modulated.

102. A scroll-type machine as set forth in claim 101 wherein said control means controls the time said one scroll member is in said first relationship and the time said scroll member is in said second relationship in response to operating conditions in a manner to maximize the efficiency of said compressor in addition to modulating the capacity of said compressor.

*103. A scroll-type machine comprising:*

*a first scroll member having an end plate and a first spiral wrap extending therefrom;*

*a second scroll member having an end plate and a second spiral wrap extending therefrom, said first and second scroll members being positioned with said first and second spiral wraps interleaved with each other;*

*a structure for supporting said first and second scroll members for relative orbital movement therebetween whereby said first and second spiral wraps define moving fluid pockets therebetween;*

*a drive member for driving said first scroll member to effect said relative orbital movement between said first and second scroll members;*

*said first and second scroll members being movable between a first normal operating relationship in which sealing surfaces of said first and second scroll members are in sealing relationship to close off respective ones of said moving fluid pockets and a second relationship wherein at least one of said sealing surfaces of said first and second scroll members are spaced apart to define a leakage path between said moving fluid pockets;*

*a force applying structure independent of said drive member, including a biasing chamber, and actuatable to apply a force to one of said scroll members to move said scroll member between said first relationship in which said scroll machine operates at substantially full capacity and said second relationship in which said scroll machine operates at substantially zero capacity while said drive member continues to operate whereby the capacity of said compressor is modulated; and*

*a vent passage for venting pressurized fluid from said biasing chamber.*

*104. A scroll-type machine as set forth in claim 103 further comprising a valve for selectively controlling fluid flow from said biasing chamber.*

*105. A scroll-type machine as set forth in claim 103 further comprising a valve disposed in said vent passage for selectively controlling fluid flow from said biasing chamber.*

*106. A scroll-type machine as set forth in claim 90 wherein said valve is disposed in said vent passage.*

*107. A scroll-type machine comprising:*

*a first scroll member having an end plate and a first spiral wrap extending therefrom;*

*a second scroll member having an end plate and a second spiral wrap extending therefrom, said first and second scroll members being positioned with said first and second spiral wraps interleaved with each other;*

*a drive member for driving said first scroll member to effect said relative orbital movement between said first and second scroll members;*

*a force applying structure independent of said drive member and actuatable to apply a force to one of said scroll members to move said scroll members between a first relationship in which said scroll machine operates at substantially full capacity and a second relationship in which said scroll machine operates at substantially zero capacity while said drive shaft continues to rotate whereby the capacity of said compressor is modulated; and*

*a spring engaging said second scroll member and operable to move said second scroll member away from said first scroll member.*

*108. A scroll-type machine as set forth in claim 107 wherein said spring is operable to unload said compressor by biasing said scroll members to said second position.*

*109. A scroll-type machine as set forth in claim 107 further comprising a bearing housing supporting said first scroll member and said second scroll member, said spring mounted between said bearing housing and said second scroll member.*

*110. A scroll-type machine as set forth in claim 1 further comprising sensors for sensing operating conditions and providing a signal indicative thereof to a control module, said control module being operative to vary the capacity of said scroll machine by controlling the duration of said first and second time periods in accordance with said sensed conditions.*

*111. A scroll-type machine as set forth in claim 1 wherein said first predetermined time period is fixed and said second predetermined time period is varied.*

*112. A scroll-type machine as set forth in claim 1 wherein said first predetermined time period is varied and said second predetermined time period is fixed.*

*113. A scroll-type machine as set forth in claim 1 wherein the sum of said first and second time periods is a constant.*

*114. A scroll-type machine as set forth in claim 89 further comprising sensors for sensing operating conditions and providing a signal indicative thereof to a control module, said control module being operative to vary the capacity of said scroll machine by controlling the duration of said first and second time periods in accordance with said sensed conditions.*

*115. A scroll-type machine as set forth in claim 89 wherein said first predetermined time period is fixed and said second predetermined time period is varied.*

*116. A scroll-type machine as set forth in claim 89 wherein said first predetermined time period is varied and said second predetermined time period is fixed.*

*117. A scroll-type machine as set forth in claim 89 wherein the sum of said first and second time periods is a constant.*

*118. A scroll-type machine as set forth in claim 96 further comprising sensors for sensing operating conditions and providing a signal indicative thereof to a control module, said control module being operative to vary the capacity of said scroll machine by controlling the duration of said first and second time periods in accordance with said sensed conditions.*

*119. A scroll-type machine as set forth in claim 96 wherein said first predetermined time period is fixed and said second predetermined time period is varied.*

*120. A scroll-type machine as set forth in claim 96 wherein said first predetermined time period is varied and said second predetermined time period is fixed.*

*121. A scroll-type machine as set forth in claim 96 wherein the sum of said first and second time periods is a constant.*

*122. A scroll-type machine as set forth in claim 97 wherein said first predetermined time period is fixed and said second predetermined time period is varied.*

*123. A scroll-type machine as set forth in claim 97 wherein said first predetermined time period is varied and said second predetermined time period is fixed.*

*124. A scroll-type machine as set forth in claim 97 wherein the sum of said first and second time periods is a constant.*

* * * * *